United States Patent [19]
Barnhart et al.

[11] Patent Number: 4,768,188
[45] Date of Patent: Aug. 30, 1988

[54] OPTICAL DEMAND ASSIGNED LOCAL LOOP COMMUNICATION SYSTEM

[75] Inventors: Andrew W. Barnhart, Gaithersburg; Anders A. Eklof, Poolesville, both of Md.

[73] Assignee: Hughes Network Systems, Inc., Germantown, Md.

[21] Appl. No.: 824,942

[22] Filed: Feb. 3, 1986

Related U.S. Application Data

[63] Continuation of Ser. No. 380,327, May 20, 1982, abandoned.

[51] Int. Cl.$^4$ ............................................... H04J 3/16
[52] U.S. Cl. ........................................ 370/80; 370/84; 370/95
[58] Field of Search ...................... 370/85, 56, 80, 95, 370/86, 89, 84, 71, 3, 4, 1

[56] References Cited

U.S. PATENT DOCUMENTS

| | | | |
|---|---|---|---|
| 3,213,201 | 10/1965 | Flood et al. | 370/99 |
| 3,921,137 | 11/1975 | McClearn | 370/89 |
| 3,961,139 | 6/1976 | Bowman et al. | 370/89 |
| 4,006,465 | 2/1977 | Cross et al. | 364/200 |
| 4,237,553 | 12/1980 | Larsen | 370/89 |
| 4,271,506 | 6/1981 | Broc et al. | 370/89 |
| 4,413,338 | 11/1983 | Renoulin et al. | 370/89 |
| 4,549,291 | 10/1985 | Renoulin et al. | 370/89 |

*Primary Examiner*—Douglas W. Olms
*Attorney, Agent, or Firm*—Pollock, Vande Sande & Priddy

[57] ABSTRACT

A distributed, demand access local loop telephone system is disclosed. An optical fiber, or fibers, connect a central office and a plurality of remote units which are located near subscriber populations. Communications on the fiber is by high speed digital data stream which is comprised of a plurality of bit multiplexed PCM channels, each of bandwidth equivalent to a VF channel or greater. The remote units are connected to the subscriber equipment (e.g. telephones or other data sources/sinks) by subscriber dedicated links (e.g. wire pairs or other cabling), and the remote units may be added, subtracted, or moved along the fiber path to reconfigure the overall system. Because of the demand access nature, the fiber bandwidth can be dynamically redistributed among the remote access units at high speed and controlled at the central office. The topology of the system can also be reconfigured, within limits, from a central site. The system is T1 compatible, the data stream being the resultant of a plurality of T1 streams, and means is provided at the remote units for extracting and inserting one or more VF equivalent channels in any desired number up to and including an entire T1 equivalent group.

29 Claims, 23 Drawing Sheets

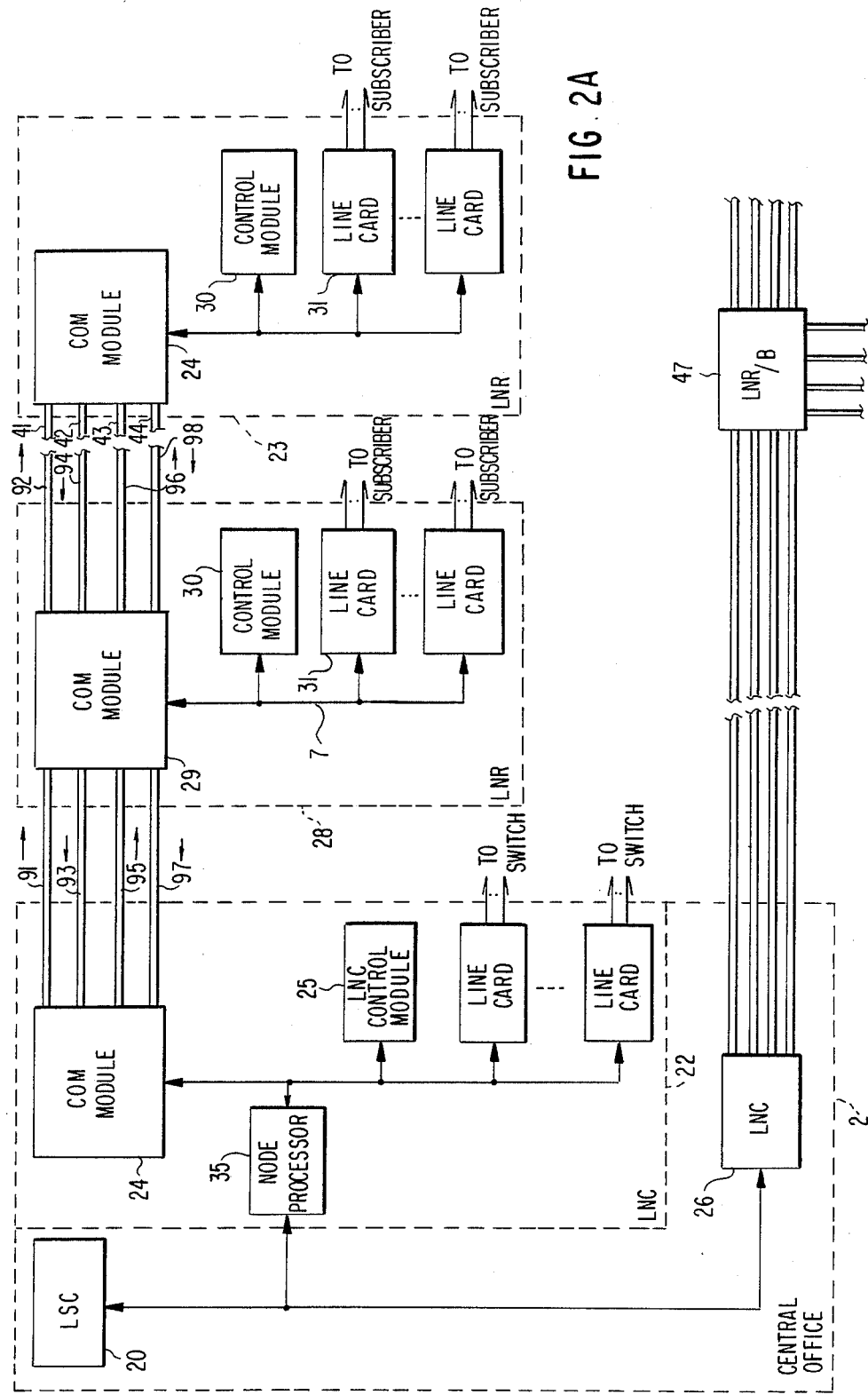

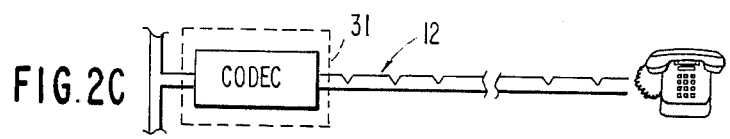
FIG. 2C
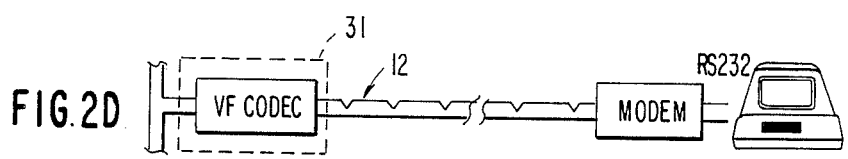
FIG. 2D
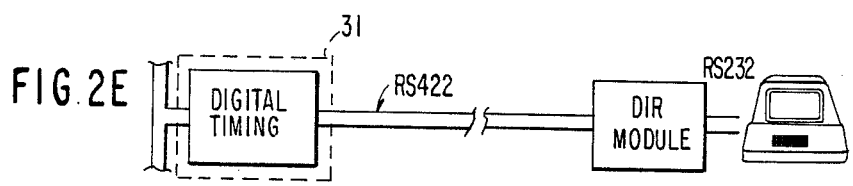
FIG. 2E
FIG. 3
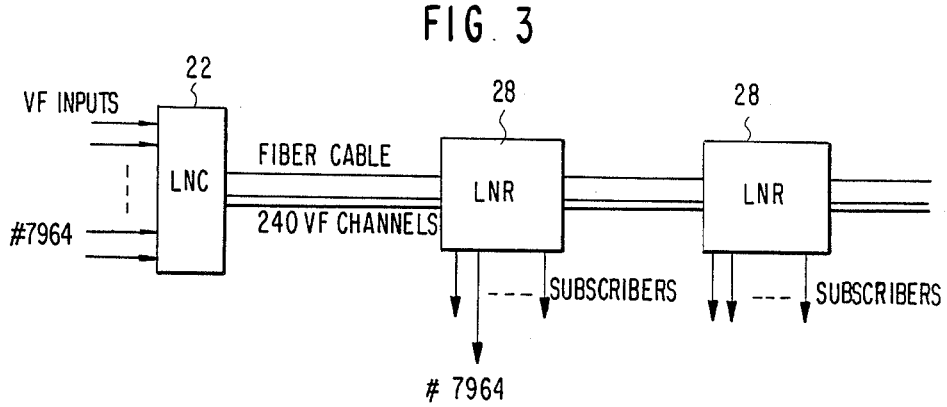
FIG. 4
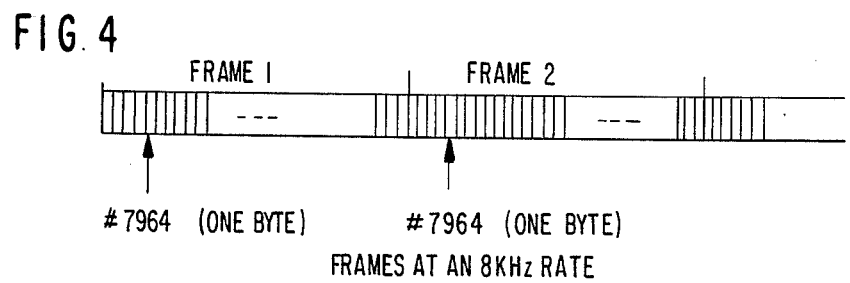
FRAMES AT AN 8KHz RATE (1) 240 VF CHANNELS PER FIBER PAIR
(2) APPROXIMATELY 1440 LINES PER FIBER PAIR USING DEMAND ASSIGNMENT:
    LNC·LNR (DEPENDENT ON TRAFFIC LOAD)

(118) 240 VF CHANNELS PER FIBER PAIR
(131) UP TO 240 TRUNKS PER FIBER PAIR (LESS SYSTEM COMMUNICATION CHANNEL)
(132) INBAND OR SEPARATE SIGNALLING CHANNEL

TI TRANSPORT FORMAT

| FRAME NO. | BIT NUMBER |||||||| 9 THROUGH 200 |
|---|---|---|---|---|---|---|---|---|---|
| | 1 | 2 | 3 | 4 | 5 | 6 | 7 | 8 | |
| 1 | | | | | | | $S_1$ | | |
| 2 | | | | | | | $S_1$ | | |
| 3 | | | IN ALL FRAMES: ||||| $S_1$ | | |
| 4 | | | 1 = BLANK ||||| $S_1$ | | |
| 5 | | | 2 = LOOP LOCK ||||| $S_1$ | | |
| 6 | | | 3 = RLB ALARM ||||| $V_1$ | | |
| 7 | | | 4 = LOCAL FAULT ||||| $S_2$ | | |
| 8 | | | 5 = LOCAL TEST ||||| $S_2$ | | |
| 9 | | | 6 = LOGIC 1 ||||| $S_2$ | | |
| 10 | | | | | | | $S_2$ | | |
| 11 | | | | | | | $S_2$ | | |
| 12 | | | | | | | A | $V_2$ | |

$S_1$ = FIVE BIT MAJORITY VOTED STUFF CODE FOR $V_1$
$S_2$ = FIVE BIT MAJORITY VOTED STUFF CODE FOR $V_2$
THREE OR MORE LOGIC 1 MEANS A TI DATA BIT IS INSERTED
THREE OR MORE LOGIC 0 MEANS A BLANK BIT IS INSERTED
A = ASYNCHRONOUS TI MARKER. 1 = ASYCHRONOUS
TFA MODULES HAVE A=0, $S_1$ = 0, $S_2$ = 1

FIG. 7

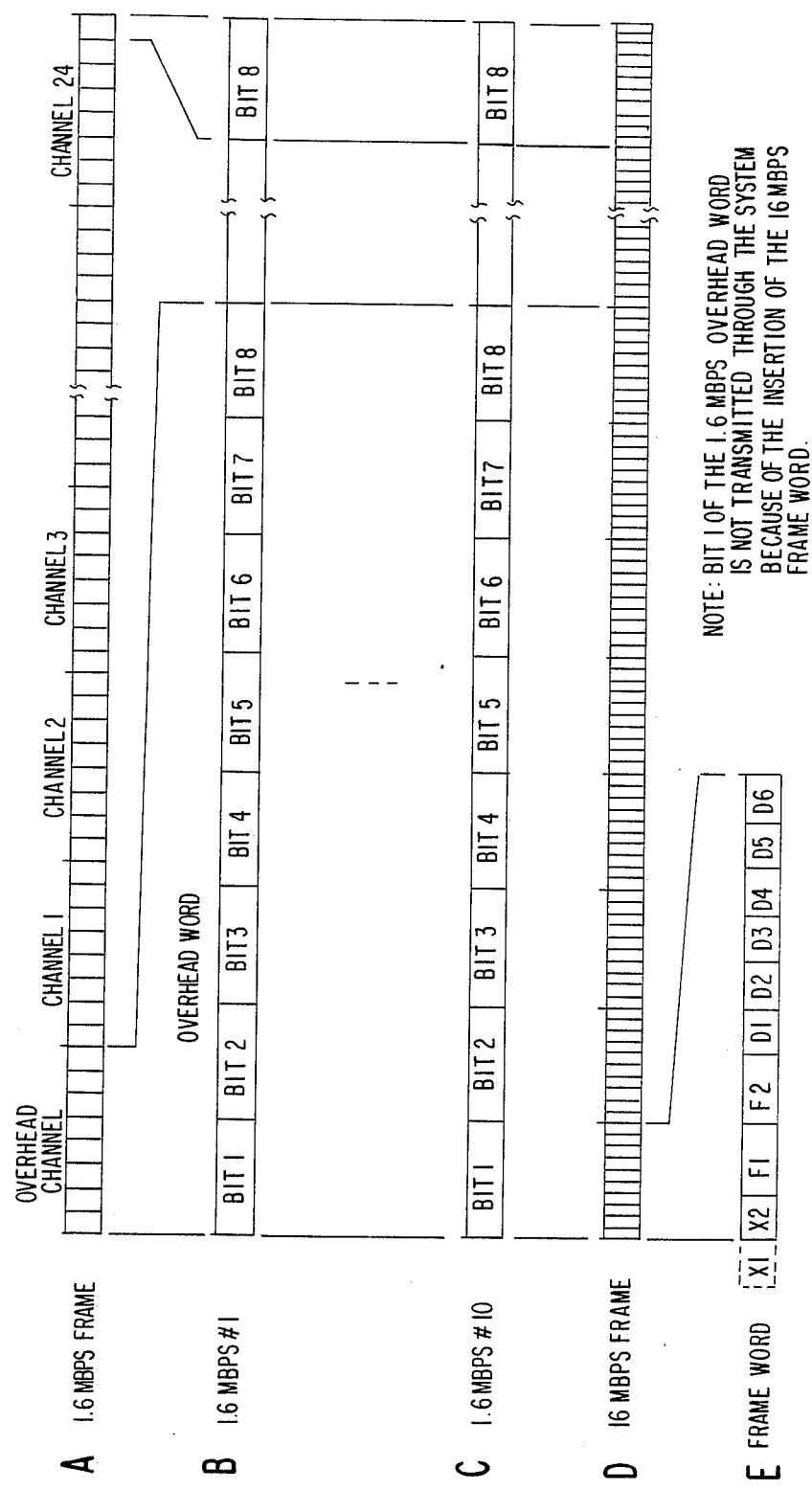

PFX MODULE

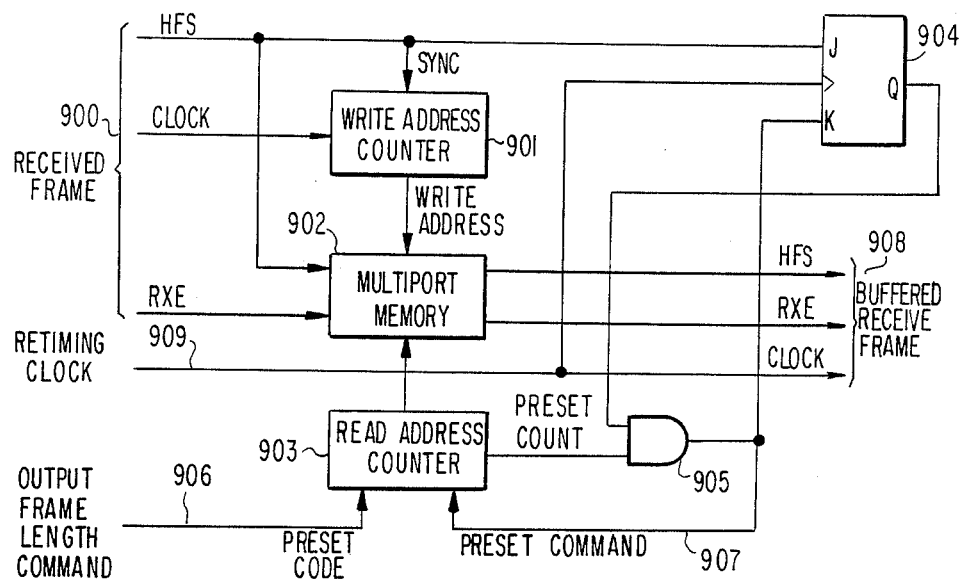
FIG. 19  ELASTIC BUFFER
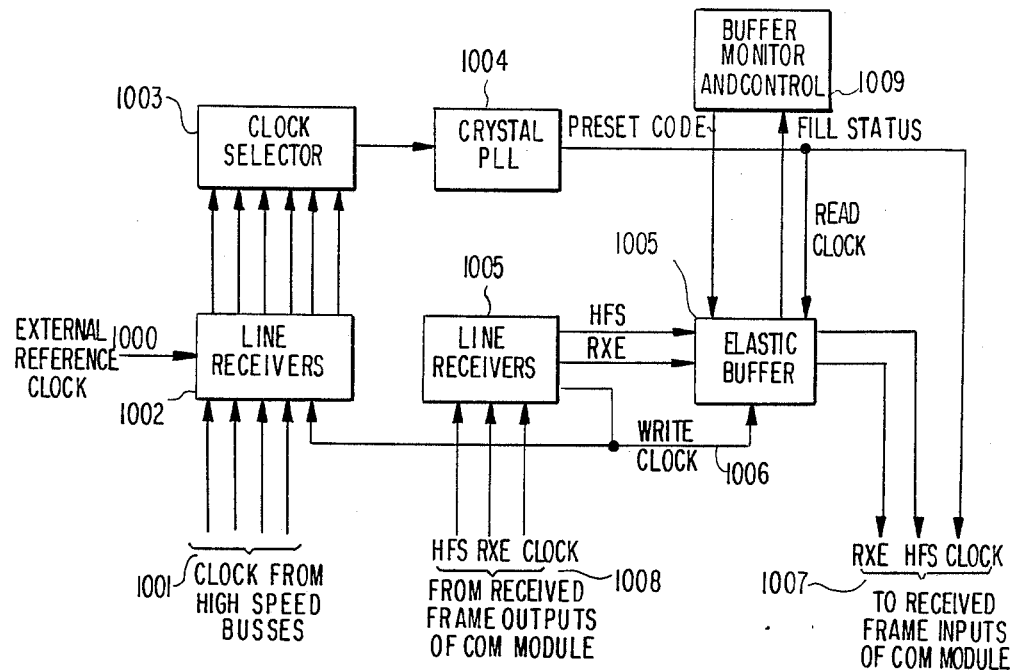
FIG. 20  ELASTIC BUFFER MODULE

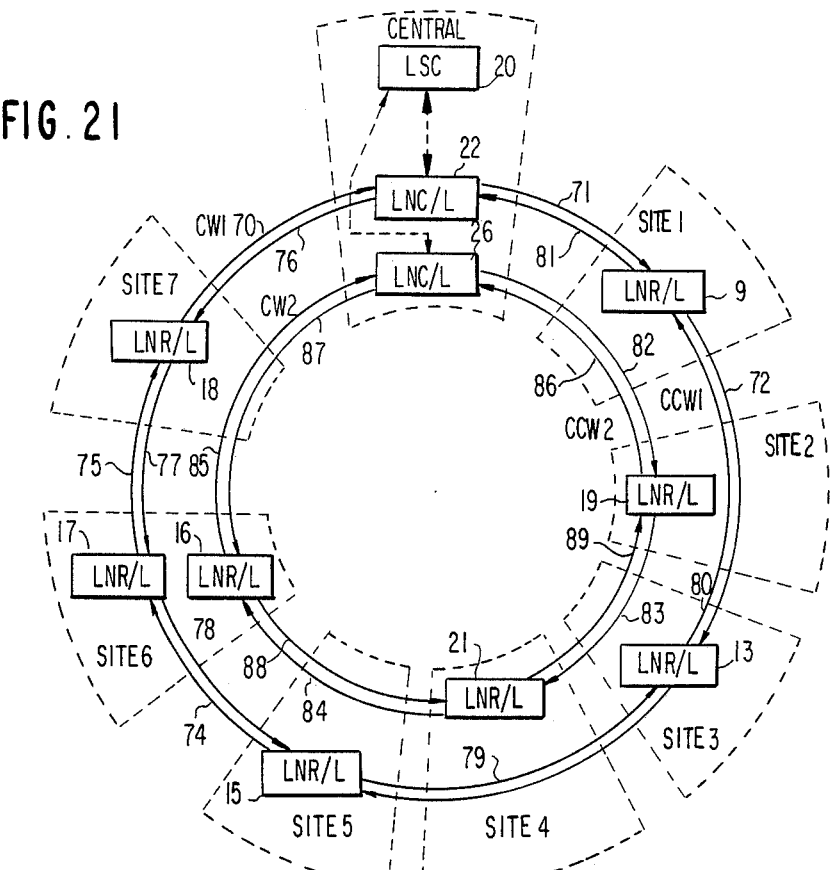

OPTICAL DEMAND ASSIGNED LOCAL LOOP COMMUNICATION SYSTEM

This is a continuation of co-pending application Ser. No. 380,327 filed on May 20, 1982 now abandoned.

DESCRIPTION

TECHNICAL FIELD

The present invention is directed to a local loop telephone system, and more particularly to a distributed, demand access local loop system.

BACKGROUND ART

In the conventional local loop telephone arrangement, each telephone in the loop is connected to the central office by a pair of copper wires. More specifically, a group of feeder wires is initially laid along a primary route, and telephones are connected to the feeder wires by distribution wires at various locations along the feeder wires, as required.

Local telephone companies expend a great deal of time and effort in deciding how much feeder wire to initially lay (i.e., how many wire pairs in the feeder), and over how long a distance. Projected population growth, creation of new housing and office developments, and new types of service which may be required in the future are some of the factors which are considered in this complex long-range planning determination. Since the cost of returning to install new wire at a later date may be greater than the cost initially installing more wire, the tendency is to initially install well beyond present requirements. However, copper wire is expensive, and wire which is ultimately unused represents economic waste.

The present invention provides a new local loop telephone system which to a large extent eliminates or minimizes the need for telephone company planning of the above-mentioned type or at least is so much more flexible that the need for precise planning is eliminated. Thus, the present invention provides a distributed, demand accessed system in the local loop wherein communication between the central office and remote units placed near subscriber populations is effected on an optical fiber. The combination of the optical communications mode and the demand accessing techniques of the invention result in a system of substantial communications capacity with the flexibility to adapt to dynamically shifting bandwidth requirements and easily lends itself to meeting long-term trends in the growth of capacity requirements.

The exciting possibilities for the use of optical fibers in communications systems has led to a wealth of prior art dealing with optical fiber communications systems. In the main, those systems have attempted to milk the last ounce of bandwidth from the optical fiber by using multiple optical carriers or space divisions techniques, decidedly different from that which is disclosed in this application. In this regard, see the following U.S. Patents:

| U.S. Pat. No. | Inventor |
| --- | --- |
| 3,566,127 | Hafner |
| 3,633,034 | Uchida et al |
| 3,633,035 | Uchida et al |
| 3,851,167 | Levine |
| 3,883,217 | Love et al |

-continued

| U.S. Pat. No. | Inventor |
| --- | --- |
| 3,986,020 | Kogelnik |
| 3,995,155 | Hutcheson et al |
| 4,002,896 | Davies et al |
| 4,002,898 | Milton |
| 4,017,149 | Kao |
| 4,027,153 | Kach |
| 4,062,618 | Steensma |
| 4,089,584 | Polczynski |
| 4,145,109 | Nelson |
| 4,154,501 | Fischer |
| 4,161,650 | Caouette et al |
| 4,166,946 | Chown et al |
| 4,210,803 | Ih |
| 4,211,920 | Wakabayashi |
| 4,211,929 | Tamburelli |
| 4,215,269 | Kuhn |
| 4,223,216 | Quick et al |
| 4,225,753 | Chown et al |
| 4,227,075 | Holland |
| 4,227,260 | Vojvodich et al |
| 4,232,385 | Hara et al |
| 4,234,970 | Beasley et al |
| 4,236,243 | Davies et al |
| 4,237,550 | Steensma |
| 4,247,956 | Christiansen et al |
| 4,267,590 | Bosotti |
| 4,302,835 | McMahon |
| 4,326,298 | Fromm et al |

Furthermore, see "Lightwave Communications" by W. S. Boyle in the August 1977 issue of *Scientific American*, pp. 40 et seq; "Fiber Optic Communication - A Technology Coming of Age" by S. D. Personick appearing in the *IEEE Communications Society Magazine*, March 1978, pp. 12 et seq; "An Integrated Network Using Fiber Optics (INFO) for the Distribution of Video, Data and Telephony in Rural Areas" by Toms in *IEEE Transactions on Communications*, Vol. COM-26, No. 7, July 1978, pp. 1037 et seq; "Subscriber-Loop Digital Transmission Using Opto-Electronic Transmitters and Receivers" by Gorohov et al appearing in the *IEEE Transactions on Communications*, Vol. COM-27, No. 3, March 1979, pp. 629 et seq; "Digital Transmission Building Blocks" by S. D. Personick appearing in the *IEEE Communications Magazine*, January 1980, pp. 27 et seq; "Fiber Optic Transmission Link Analysis" by Campbell et al appearing in the *Proceedings of the Society of Photo-Optical Instrumentation Engineers*, Vol. 224, 1980, pp. 12 et seq; "Optical Channels in Distributed Processing" by Inbar in *SPIE*, Vol. 224 (1980), pp. 57 et seq; "A Rural Integrated Distribution Trial With Fiber Optics" by Kachulak appearing in the *IEEE Communications Magazine*, January 1981, pp. 36 et seq; "Toward Local Network Digitalization: The View from Japan" by Habara et al appearing in *IEEE Transactions on Communications*, Vol. COM-28, No. 7, July 1980, pp. 956 et seq. and "Loop Evolution - Its Dynamics and Driving Forces" by Homayoun in *IEEE Transactions on Communications*, Vol. COM-28, No. 7, July 1980, pp. 976 et seq.

Although there is a wealth of literature dealing with fiber optic communciations, the general application is to high capacity trunk routing. Personick concludes "[F]ibers are best suited for high density routes of sufficient length to justify the multiplexing cost and the high capacity."

At least one exception is Fromm et al. However, Fromm et al do not address multiplexing or concentration which are important features of the invention, as will be explained below.

In contrast to the prior art, the invention comprises a multi-access demand access distributed local loop in which in a preferred embodiment a fiber light media serves to connect an exchange with subscriber locations.

Using the invention, the telephone company can make an initial installation which is based on the total capacity which is ultimately expected rather than trying to plan with precision how much copper wire to lay for the foreseeable future. Since, with the invention, a small amount of fiber replaces a large amount of copper, in the conventional system, (fiber is much cheaper than copper), and since bandwidth can be dynamically reassigned, substantial amounts of excess capacity can be initially installed while still remaining economic. For example, with the system of the invention, a single fiber pair typically services over 1400 telephones which in a conventional local loop system would need to be serviced by 1400 separate wire pairs from the central office to the individual instruments.

The following example will provide an indication of the improvement afforded by the invention. If, for example, a requirement is seen to ultimately serve 1000 subscribers in an area served by a two mile-long feeder, the telephone company could, reasonably install one mile of 1000 pair feeder and 500 pair feeder for the second mile. If demand grows evenly, when fully loaded the feeder would be reasonably proportioned. However, it is simple to conceive of a situation wherein the entire demand developed in the first mile, leaving a 500 pair feeder entirely unused. Alternatively, if the entire demand was located in the second mile, a supplemental 500 pair feeder is required for the second mile. While these are simplified examples, the same problems are met in day-to-day telephone planning. With the present invention, a single two mile fiber satisfies future demand. Since bandwidth can by dynamically allocated, the single fiber can support 1000 subscribers in any distribution over the feeder without requiring mechanical changes, laying additional physical facilities or manual reconfiguration thereof.

Another disadvantage of the conventional local loop system is that the copper wire used is by itself a relatively low bandwidth medium, and the system can essentially only be used for telephone service, but not for higher bandwidth requirement service such as video. When such service is required, for example for teleconferencing or for the installation of a stock quotation system, it is necessary to prepare special facilities for each application.

In the future, it is believed that high bandwidth requirement applications such as teleconferencing will be in greater demand than in the past, and the installation of coaxial cable or other special facilities between the central office and the subscriber represents an important inconvenience and unwanted expense.

In accordance with a feature of the present invention, a subscriber can be assigned any (reasonable) desired bandwidth, so that video or other high bandwidth requirement service is possible without the necessity of additional installations or modifications. The optical communications medium used is inherently high bandwidth, and communication on the fiber is by a high speed data stream which is comprised of a number of communication channels, each of which is equivalent to a voice frequency (VF) channel. A subscriber requesting bandwidth may be assigned any required number of such channels up to the entire bandwidth of the high speed data stream, so that the subscriber's bandwidth needs are met.

The invention thus provides an optical, distributed, demand accessed local loop telephone system. In the prior art, it is believed that limited forms of bandwidth distribution techniques have been used in the local loop in connection with remote concentrators. See "Research Model for Time-Separation Integrated Communication" by H. E. Vaughan in *Bell System Technical Journal*, Vol. 38, No. 4, pp 909–932 (July 1959) and U.S. Pat. No. 4,230,913 for a description of a modern concentrator.

Typically, concentrators were used in a star configuration, i.e., plural remote concentrators were coupled to a central office over a dedicated concentrator link for each concentrator. Thus, it was necessary to predetermine the concentrator bandwidth limits which could not be exceeded without accomplishing physical changes in the concentrator or its dedicated link. In contrast, the remote access unit of the invention is coupled in a fiber loop or in series along a fiber feeder so that each remote access unit has access to the entire bandwidth of the fiber.

While remote concentrators are an improvement over the exclusive use of wire pairs they (1) do not entirely eliminate the necessity for accurate demand forecasting nor do they (2) eliminate the need for dedicated wire pairs between concentrator and subscriber. Accurate forecasting is still necessary to determine concentrator capacity and this capacity is typically fixed.

Employing a concentrator of relatively high capacity compared to initial demand in an attempt to reduce cost of expansion still represents economic waste due to the high cost of such concentrators. While the length of wire pairs from concentrator to subscriber can theoretically be reduced without limit, in practice the reduction of wire pair length is accompanied by multiplication of the number of concentrators. Again, because of concentrator cost, the length of wire pairs between concentrator and subscriber has been substantial.

In contrast, the low cost of the remote units of the present invention coupled with their ability to handle the entire fiber bandwidth (or capacity) is a substantial improvement over the use of concentrators.

A particularly significant advantage of the optical fiber transmission medium is the high bandwidth or data rate capability. For example a 16 Mbps pulse stream is used in a preferred embodiment. However, the same high rate means a reduced tolerance to jitter, i.e., the pulse width in the 16 Mbps stream is on the order of 60 nsec. This means that a jitter of ±30 nsec or greater can cause loss of data if the data must be referenced to an external clock such as may be required when synchronous processing is required. Furthermore, it is well known that jitter will accumulate at each of a plurality of nodes or retiming locations and thus the jitter is directly related to the length of the transmission link. This could be an intolerable situation absent some technique for rendering jitter manageable.

OBJECTS OF THE INVENTION

It is, therefore, an object of the invention to provide a local loop telephone system which minimizes telephone company long-range planning.

It is a further object of the invention to provide a local loop telephone system which minimizes the need for secondary and tertiary installations of copper pair, coaxial cable or other communication media.

It is still a further object of the invention to provide a local loop telephone system which can be flexibly adapted to changing subscriber population patterns after initial installation either on a dynamic basis or to meet long-term growth trends.

It is still a further object of the invention to provide a digital local loop telephone system which is fully compatible with the conventional T1 and voice frequency (VF) formats.

It is still a further object that a common transmission means be provided for connecting local population concentrations which does not require intervening electronic repeatering or support.

It is a further object of the invention to provide a practical technique for jitter management so as to render feasible the mixing of short and/or long transmission links with substantially identical equipment.

It is another object of the invention to provide a multiplexed link in which add/drop is effected on a VF circuit, multiple VF circuit, entire T1 group basis with no need for demultiplexing through different stages.

It is a further object to arrange for interconnection of different, substantially separate transmission links in a straight-forward equipment conserving manner.

The above objects are accomplished by providing an optical, distributed, demand access local loop telephone system. An optical fiber or fibers communicates between the central office (or conventional exchange) and a plurality of remote access units which are located near subscriber populations. The remote access units are connected to subscriber equipment (e.g. telephones for example) by subscriber dedicated links (typically wire pairs or other higher bandwidth links). Remote access units may be added, subtracted, or moved along the fiber path to reconfigure the overall system to meet long-term growth trends.

Communications on the fiber is effected by a high speed digital data stream which is comprised of a plurality of bit multiplexed PCM channels, each of which may be a voice-frequency (VF) equivalent. The data stream is the resultant of a multiple of T1 streams, and means is provided at the remote access units for extracting and inserting data from and to any one or more VF equivalent channels up to and including an entire T1 group.

Because of the multiplexing technique used to multiplex the data stream on the fiber, it is relatively simple to drop or add these channels either singly or in groups. Thus a group of such channels of a sufficient number can be used to service a high bandwidth demand subscriber such as a video application. So long as the interfacing equipment and subscriber dedicated links are of sufficient bandwidth, switching one VF equivalent channel or 100 (representing a VF application or a video application) requires no more effort or equipment.

In order to effect this simplified add/drop capability, careful attention to timing is critical. On a single fiber pair (one out from a central station, the other in to a central station) timing jitter is expected, and this jitter will increase as the number of remotes and the length of the fiber increases. Without correction the jitter would prevent use of this simple add/drop when more than 5 to 10 remotes are needed. However, we use an elastic buffer at one or more remotes to reclock incoming data with the outgoing clock. In this fashion, timing jitter can be kept within acceptable bounds.

For control of bandwidth allocation a processor, located at a central office, communicates with processors at each of the remote access units. Communications between a processor at the central office and processor at a remote access unit is on one of the VF equivalent channels, which is designated as the control channel.

In addition to processors, the remote access units also include line cards connected to subscriber equipment (typically a telephone instrument) nearby the remote unit. The line cards are polled by the associated (remote) processor and when a demand for service (typically an off-hook condition) is detected, this information is relayed to the processor at the central office, requesting a channel assignment. The processor at the central office maintains a table of in use and available channels, and when it locates an idle channel, the idle channel is assigned to the user. Similarly, when going on-hook a corresponding message is again communicated to the processor at the central office which effects tear-down of the channel assignment.

The multiplexed stream includes a repetitive framing pattern to define the beginning of each successive frame. A unique framing pattern is provided at the beginning of each high speed frame to enable instantaneous detection of the frame beginning without monitoring a number of successive frames, as is frequently the case in the prior art.

The framing pattern is two consecutive bits of alternating polarity, each 1½ clock cycles in length. This causes a logic transition to occur at the trailing edge of the clock, instead of at the leading edge, as is normally the case. Means are provided for adjusting the timing of the frame which does not introduce errors in communications.

To account for a variety of different geographical distributions, the fiber may have the topology of a loop (in which there is a common node at beginning and end) or line (connecting at least two geographically remote nodes), or hub (radiating from one node). Still other topologies are useful. For example, the line topology may be modified so the nodes at each end of the line are co-located. This gives the outward appearance of a loop but, for example, switching the traffic may be effected at the co-located nodes. The modular nature of the remote access unit simplifies topology selection and implementation. For the hub topology, a single remote access unit (the end unit) has two uni-directional links, both connected upstream. This requires one interface module with an opto-electronic and electro-optic transducer. Timing on the outbound link is derived from the inbound link. Each of the other access units has two identical interface modules, one for upstream, and one for the downstream path (where a path is made up of plural unidirectional links of a common direction and the intervening access units). Finally the extreme upstream end includes equipment similar to the end access unit. Each remote access unit includes one or more line cards which serve to interconnect the attached subscriber(s) to a bus system providing a path to the interface module(s) at the access unit. This allows any subscriber visibility of all traffic and access to transmission, on any path. That is, the subscriber can receive from upstream or downstream and transmit on the same or a different path. Accordingly, the access unit provides both a concentration (multiplexing) function as well as a switching function.

A loop topology is nothing more than a hub in which the interface modules of both end units are co-located and the line cards have access to interface modules of either unit.

Adding further paths to the system requires only adding an interface module per path and augmenting the bus system as required. Regardless of the form, there may be intermediate nodes which comprise a branch, at which two fibers converge/diverge.

Diverging is a simple matter of either duplicating the frame on both diverging legs, or extracting from the frame a portion thereof for each of the diverging legs. Converging fibers must be handled differently. Since data frames returning from two branches into which the data has been split on the way out, will normally be misaligned, some alignment apparatus is required to effect the synchronous merging which is preferred (as will be disclosed). In accordance with the invention, timing on one of the diverging legs is controlled such that the timing on one converging leg is synchronous with the other converging leg at the branch point. In this condition the two converging legs can be wire "ORed" together and the resultant is transmitted onto the central.

This illustrates but one of the points at which attention is required to timing considerations. By the use of this and allied techniques, disclosed herein, two or more converging megabit rate streams can be rendered synchronous. With such plural synchronous streams, switching is vastly simplified. For example, to interconnect two otherwise separate fiber systems, each operating at nominally the same clock rate, but wherein the clocks are actually somewhat different, once a synchronous condition is achieved, a first 2 for 1 multiplexer can select channels from inbound streams in both fibers and make up a composite outbound stream for a first system while a second 2 for 1 multiplexer can select channels from the same inbound streams and make up a different composite outbound stream for the second system. So long as neither outbound stream exceeded its capacity and the channels used in the inbound stream were mutually exclusive, switching is reduced to a pair of multiplexers.

The same techniques, when used with a time slot interchanger (TSI) can remove the requirement that inbound channels must be exclusively assigned to one or the other system.

The ultimate in switching capability is provided by using a time slot interchanger (TSI) and fiber bus for each system. With such equipment there is non-blocking interconnectivity among all systems wherein the switching action occurs in the various TSI's.

This is especially attractive in that the multiplexing and time slot interchanging can be done without demultiplexing the TDMA stream, thus eliminating the necessity for many thousands of line cards at a central office.

BRIEF DESCRIPTION OF THE DRAWINGS

The invention will be better understood by referring to the accompanying drawings in which like reference characters identify identical apparatus, and in which:

FIG. 2A is a block diagram of a hub mode overview of an embodiment of the present invention;

FIGS. 2C, 2D and 2E represent, respectively, interfacing a conventional telephone, digital terminal and modem and direct digital terminal;

FIG. 3 is a simplified drawing of an embodiment of the invention, and illustrates the relationship between remote subscribers and inputs at the LNC 22;

FIG. 4 is a timing diagram which illustrates the equivalent communications channels which are present on the fiber;

FIG. 7 is a tabular diagram illustrating the T1+ format;

FIG. 8 is a diagram illustrating the high-speed data frame format and the manner in which the frame is assembled;

FIG. 19 is a block diagram of the elastic buffer circuit, which performs high-speed bit alignment used in jitter reduction;

FIG. 20 is a block diagram of the elastic buffer module, which provides for system timing and resynchronization;

FIG. 21 is an overview of an embodiment of the invention in a loop topology;

FIG. 22 is a detailed block diagram of frame comparator 609 (FIG. 16); and

DESCRIPTION OF PREFERRED EMBODIMENTS

System Overview

Figure 1:
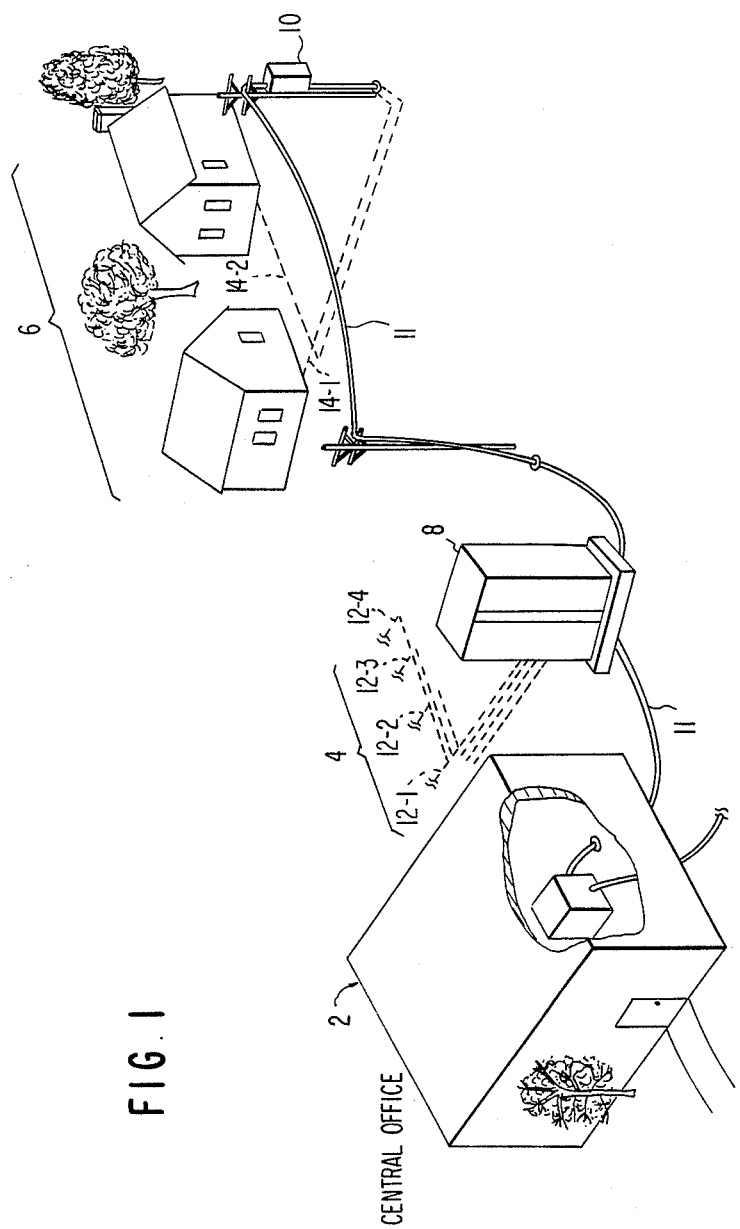
FIG. 1 is a pictorial representation of a physical embodiment of the present invention.

FIG. 1 is an illustration of a physical overview of the invention as applied to a local loop telephone system. Referring to FIG. 1, a central office 2, and subscriber populations 4 and 6 are pictorially depicted. A plurality of remote access units, shown as 8 and 10 in the figure are located near subscriber populations, and are connected to the central office by a single working fiber optic path pair 11, while each of the remote access units is connected to a number of telephones or other signal sources in its immediate area by a pair of copper wires or other types of subscriber dedicated links 12-1, 12-2, 12-3, 12-4, 14-1 and 14-2. The configuration of the invention is thus unlike the conventional local loop system, in which it is necessary to run a separate pair of wires from the central office to each telephone in the system. The subscriber signal sources may include any electronic communicating machine such as video terminals, facsimile equipment, word processors, duplicating equipment, printing equipment, or the like. The connection between subscriber equipment and remote access unit 8 may comprise any suitable medium such as coaxial cable or the like, if necessary to support the subscriber equipment.

A high speed optical pulse stream comprised of a plurality of bit interleaved communications channels is arranged to travel on the fiber optic path, and for each call (or connection), each telephone (or other source) is assigned a channel on a demand assigned basis. Typically, the path pair 11 includes upstream and downstream paths and a bidirectional call requires a channel assignment on each path. The assignment of a channel is made by equipment at the central office and is communicated to the remote access units, which monitor the status of subscribers, and execute channel assignments. The information provided by the telephone instruments or other sources is pulse code modulated (PCM), if necessary, and inserted in the assigned channel for transmission. As will be described in greater detail below, the combination of the optical transmission and demand assigned TDMA allows a large number of subscribers to be served on a single fiber optic path pair.

FIG. 2A is a block diagram of a central site (or exchange) and several typical remote access units. The primary components of the system are the system controller (LSC) 20 and the network controllers (LNC) 22, 26 which are located at the central office 2, and the remote units (LNR) 28 and 23, mentioned above which are distributed near subscriber populations. The system controller 20 exercises general control functions over the network controllers, while each network controller, such as controllers 22 and 26, shown in FIG. 2A, controls a plurality of interconnected remote access units serving a different area.

As shown in FIG. 2A, the LNC 22 and LNR 28 are interconnected by optical transmission media comprising uni-directional optical fiber links such as 91, 93, 95 and 97. A link extends from central to remote or remote to remote. The LNR 28 and an adjacent LNR (not illustrated) are interconnected by different links 92, 94, 96 and 98. Finally LNR 23 (the end LNR) terminates the last links 41–44. Defining a downstream direction as away from the central office and an upstream direction as toward that office, we can label links 91 and 95 as downstream links and links 93 and 97 as upstream links. We can also define links 92 and 96 as downstream and 94 and 98 as upstream. This provides for a working pair of fiber links (downstream 91, 92, etc. and upstream 93, 94, etc.) and a similar reserve pair at each remote. Those skilled in the art will recognize that a four fiber cable can be replaced by a lesser number of fibers using different optical or electrical carriers to separate optical signals (frequency division multiplexing) in the same fiber. However, we prefer the use of a four fiber cable, as illustrated. The reserve fiber pair can be on standby for use if a problem develops in the working pair. On the other hand, the two fiber pair can be considered to provide a certain bandwidth which can be allocated between traffic and reserve in any desired ratio, including 100% traffic (i.e. no reserve). As will be explained below, a communication path (upstream or downstream) may comprise plural links. By normally connecting signals or traffic from link 91 to link 92 a downstream path is obtained. An upstream path is effected by connecting signals from link 94 to link 93. Thus, by concatenating links we provide upstream and downstream working paths and a similar reserve pair of paths.

Each pair of fiber links (91, 93—working, and 95, 97—reserve) has a downstream fiber (91 and 95) and an upstream fiber (93 and 97). At each LNR, each fiber path is driven by an LED and another link of the same path drives an optical receiver. The downstream fiber path drives a receiver with signals placed on the fiber by the next upstream LNR or LNC while the same downstream fiber path is driven by an LED. The upstream fiber path is just the opposite, i.e., it drives a receiver with signals transmitted by the adjacent downstream LNR and its LED drives the next upstream link of the fiber path, between the LED and the next upstream receiver (at LNR or LNC). LEDs are preferred for short and moderate inter-remote distances.

For distant rural applications (up to 20 miles or more) laser diodes are used.

A typical remote access unit (LNR) 28 includes a COM module 29, control module 30 and one or more line cards 31 all interconnected by a bus system 7. The COM module 29 includes the opto-electronic and electro-optic interfaces which are shown in more detail in FIG. 2B.

Figure 2B:
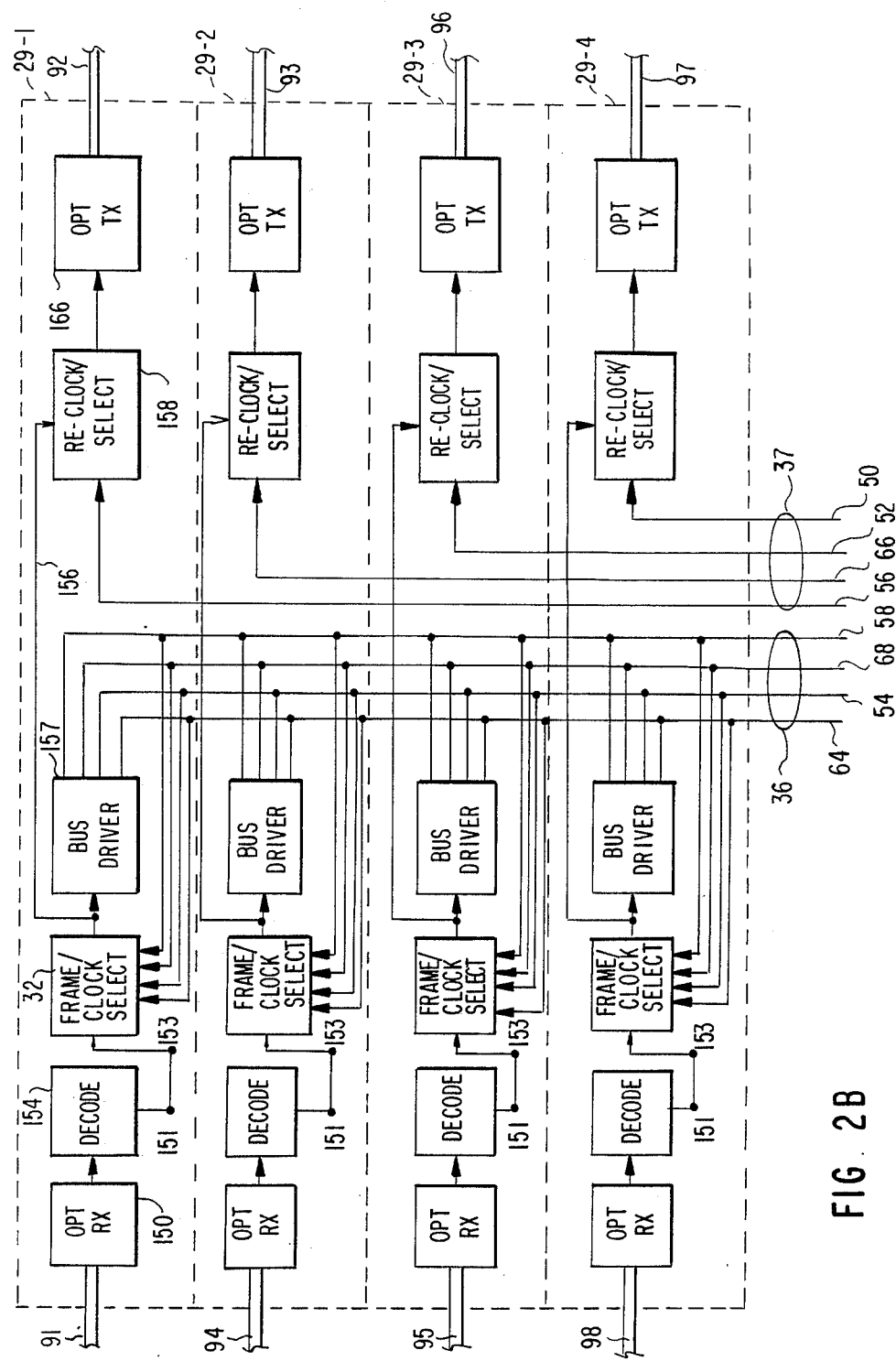
FIG. 2B is a block diagram of a COM module such as 29 of FIG. 2A.

A more detailed block diagram of the COM module 29 is shown in FIG. 2B. The COM module includes one or more COM interfaces such as COM interface 29-1; four such interfaces 29-1 through 29-4 are shown in FIG. 2B. A four path system will have four interfaces per COM module. Since each of the interfaces 29-1 through 29-4 are identical, only COM interface 29-1 will be discussed in detail. As shown in FIG. 2B, the opto-electronic interface is an optical receiver 150 which converts the optical signals on a fiber link to electrical signals. The electrical signals pass through decoder 154 which decodes the sync signal and outputs, in parallel, sync (HFS), clock and data (RXE). All are available at the RCV out terminal 151. Typically the RCV out terminal 151 is directly connected to the RCV in terminal 153 where the signals are provided to the frame/clock select circuit 32. The signals may then be passed to bus driver 157 and to re-clock/select 158. The output of the bus driver 157 is the forward bus sub-system 36 which has a number of parallel bus subsystems (54, 58, 64, 68) usually equal to the number of fiber paths. Thus, the bus driver 157 selects one of the forward bus subsystems, i.e. 64 and places the output of frame/clock select 32 on it. Each forward bus subsystem has separate conductors for clock, HFS, RXE as well as RXI (defined below). In this fashion, the signals received over fiber link 91 are distributed to the line cards 31. Other bus drivers 157 in other interfaces drive other forward bus subsystems (i.e., 54, 68 and 58). The clocking signal from all fiber links are thus present on different ones of the forward bus subsystem. These clock signals form another input to the frame/clock select circuit 32 for reasons to be explained.

The bus system 7 also includes a number of return subsystems, again usually equal to the number of fiber paths intercepted by the remote. Thus, return bus subsystems 50, 52, 66 and 56 are shown, each input to a different re-clock/select circuit 158. Another input to the re-clock/select circuit 158 is the received data via conductors 156. The re-clock/select circuit 158 passes to the electro-optic transmitter 166 either the received data from conductors 156 or signals from return bus subsystems. The signals on the return bus subsystems TXD and TXE are derived from subscriber input via the line cards 31. The return bus subsystem also carries a clock signal which is derived from one of the forward bus subsystems. The re-clock/select circuit 158 also passes subscriber-derived input to the bus driver 157 (this connection is not shown in FIG. 2B) where it (RXI) is placed on the associated forward bus subsystem.

The system controller (LSC) 20 is a computer which is programmed to perform general system functions such as those which are required to allow configuration of the general system hardware and software for specific applications, provide for circuit administration including setting of class marks, initiate tests to detect system faults, maintain information necessary to restore the system in the event of failures, and provide a summary of call processing operations. Thus, the LSC 20 provides supervisory functions but does not directly control traffic.

The network controllers (LNC), e.g. 22, 26 (and particularly the control module 25) communicate with the remote access units 28, 23 on a designated control channel, and oversee the operation of the particular remote access units to which they are connected. Each LNC also includes a COM module 24 which provides the electro-optic interface with the fibers and an LNC node processor 35 which oversees the remote access units, controlling which remote access unit has access to the control channel, and assigning channels to the various remote access units as such units request channels. Also, the node processor 35 maintains a table of in-use and available channels, to which it refers when a new request is made.

Each remote unit (LNR) 28 is comprised of the COM module 29, a control module 30, and a plurality of line cards 31 which are connected to the subscribers' telephones or other signal sources. For example, referring to FIGS. 2A and 2B, remote unit 28 is seen to be comprised of COM module 29, control module 30, and representative line cards 31 which are connected thereto by bus system 7. The COM module 29 interfaces with the downstream and upstream optical fiber links and includes the electro-optical transducers and means for re-timing the communications signal in each direction between receipt and transmission. The LNR control module 30 includes a processor which is connected to the COM module 29 and to each of the line cards 31 in the remote access unit by bus system 7, and its functions are to maintain the line circuit class marks, monitor the status of these line cards, respond to off-hook and ringing conditions, communicate with the LNC 22 to request transmission channels, and after a channel is assigned, ensure that transmission information is inserted into and extracted from the appropriate channel. The control module 30 also monitors the communication status of the COM module 29 and directs system re-timing or alternate path routing should conditions (fault situation) warrant corrective actions.

Each line card 31 is connected to at least one (usually more than one) subscriber, and for each subscriber each card includes a circuit for extracting or inserting a channel from or to the high speed data stream on any selectable one fiber link. In addition, the line card may include circuitry for decoding the PCM data in the extracted channel to outgoing voice frequency and for coding the incoming voice frequency to PCM format, at least for subscribers using voice frequency.

With the embodiment of the invention depicted in FIGS. 2A and 2B, for each line card 31 at the remote units, a complementary line card 31 is present at the LNC. These are controlled by LNC control module 25 which performs the same functions as LNR control module 30. The LNC node processor 35 communicates with the LNC control module 25 on the designated control channel in the same manner as it communicates with the LNR control modules 30. The line cards 31 at the central office may connect to a switch (exchange) located there for the purpose of completing circuits for call connection as requested by subscribers. Accordingly, the local loop, i.e., between central and remote line cards 31 is completely transparent to its users. That is, for example, a voice frequency input at a remote line card is PCM encoded, multiplexed onto a fiber link, extracted from a fiber link, decoded back to voice frequency at the central line card all without noticeable effect to the user.

Timing signals for the high speed data stream on the fiber are generated by a master clock at the LNC, and are looped around at the end LNRs 23. Each LNR includes a means for detecting the beginning of the high speed frame and includes an LNR clock synchronized with the master clock for identifying appropriate bit times for extracting and inserting data.

As illustrated in FIG. 2A, once established, the local loop system of the invention may be used to provide a range of subscriber services without requiring modification or additional wiring at a later time. For example, the local loop will support a conventional telephone (FIG. 2C), a digital terminal interfaced with the system via modem (FIG. 2D), and a digital terminal interfaced directly (FIG. 2E) with the system. With appropriate configuration, the line card 31 may be used to directly interface the digital output of a terminal to the system. Since the invention provides demand assignment of a variable or selectable number of (VF) channels to each subscriber, subscriber services such as video and other services which require relatively large bandwidth may be provided without the necessity of additional wiring. In this respect, each line card 31 is coded or personalized at installation or commanded thereafter to request a predetermined number of channels, corresponding to the bandwidth required by the subscriber service which it is interfaced to. This is a salient advantage of the invention, since conventional local loop systems do not possess sufficient bandwidth to provide video or other high bandwidth requirement service, which means that when such service is necessary or desirable, separate coaxial cable must be laid to provide it. As will be described hereinafter, the embodiment of the invention described herein uses a line card which is personalized for the bandwidth served or required. After reading the description, however, it will be apparent to those skilled in the art that the bandwidth served may be selectable by suitable signaling without physical modification.

FIGS. 3 and 4 illustrate the equivalent channel structure of the system. In this regard, FIG. 3 is a simplified version of FIG. 2A, and in particular denotes a specific subscriber (#7964) and shows line circuit locations for this subscriber both at the remote access unit 28 and at the LNC 22. While FIG. 3 implies a channel from central to remote (by the arrow direction), the invention typically provides a bi-directional channel, made up of a uni-directional channel on each of upstream and downstream fiber paths. FIG. 4 is a timing diagram, and shows a plurality of repetitive frames (in either upstream or downstream fiber path), each of which is divided into a number of channels or time slots. The time slot assigned to line circuit #7964 is shown and is seen to occur at the same time in each frame relative to the beginning of the frame. Each voice frequency channel or slot, in a preferred embodiment, has 1 byte of information per frame, meaning that when a circuit or subscriber is assigned to a channel it is given access to one byte of transmission per frame. In the preferred embodiment of the invention, each frame is divided into 24 VF channels plus some overhead information for frame alignment purposes, and the frames repeat at an 8 kHz rate.

It should be apparent that the use of a 64 Kbps bandwidth as the channel unit is convenient but not essential, other bandwidths (larger or smaller) could be chosen as the unit channel. In addition, as will be explained a subscriber can be served with one or more unit channels depending on the subscriber's requirements. Furthermore, subscribers can also be served with a fractional part of a unit channel using conventional sub-multiplexing with appropriate modifications to the appropriate line cards.

The frame structure (FIG. 4) is based on the T1 format, to which overhead bits are added. The resultant format is designated as T1+, and contains the basic T1 format therein. The high speed data stream, which is transmitted on the fiber path, is a bit interleaved version of the equivalent channel structure shown in FIG. 4. This data stream is created by interleaving the bits of the respective channels of a plurality (10, for example) of T1+ streams, thus providing a fiber transmission capacity of, for example, 240 VF channels.

As will be described in greater detail below, means are provided for extracting and inserting individual voice channels (or multiple voice channels) directly from and to the high speed data stream at the remote units. Additionally, entire T1 streams can be inserted and extracted at the remote units.

It should be appreciated that while the preferred embodiment of the invention is being described in connection with the use of 240 channels at a data rate of 16.00 Mbps per fiber path (fiber capacity and rate), these are illustrative, and the invention may employ a different number of channels and/or data rates. However by using the T1+ format and then bit interleaving multiple T1+ stream we preserve the channel time slot relative to frame sync so that it can be easily added or dropped as will be explained. Changing the fiber rate can be accommodated by similar changes to the number of interleaved streams. For example a 8 Mbps fiber rate, with five (rather than 10) bit interleaved streams allows us to maintain the desirable T1+ format. Use of the format allows ready T1 transport without equipment changes. Similar effect can be produced if the fiber rate is increased as should be apparent.

Demand Access and Concentration

Figure 5:
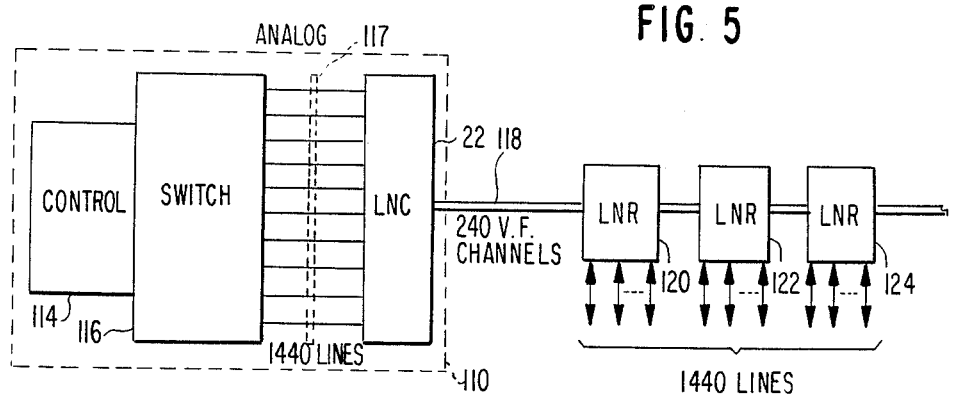
FIG. 5 is a simplified diagram of an embodiment of the invention and illustrates the reduction of channels which is achieved by the demand access feature of the invention, having VF line interface at the central office.

FIG. 5 illustrates how the demand assigned feature of the invention enables a large number of subscribers to be served by a single fiber path. Referring to FIG. 5, network controller (LNC) 22 is typically located at class 5 central office 110 and controls communication on fiber cable 118 with a plurality of remote units including units 120, 122 and 124. The fiber cable 118 has at least one upstream and one downstream fiber path; it may also have a reserve path pair. As mentioned in connection with the description of FIG. 4, in the preferred embodiment each fiber path carries 240 voice channels in one direction. By assigning these channels to telephones only when requested by particular instruments, that is when particular telephones go off-hook or are ringing, the 239 channels (one is reserved for the control channel) can be made to serve a multiple of 239 telephones. The suggested traffic criteria is to load a fiber path pair to the point where it would have a 0.2% blocking probability. Using a Poisson traffic distribution and based on a trunk group size of 239 channels, the rated capacity is 199 Erlangs. For a busy hour loading of 5.0 CCS/hr., the system of the present invention provides a line circuit capability of 1440 per fiber pair.

Any channel available on the fiber path may be assigned to and remote access unit on the fiber path which demands a channel. Thus, the traffic from all remotes is concentrated onto a single transmission medium.

The primary purpose of the reserve fiber path pair is to serve as an alternate transmission medium should there be a failure in the working pair, thus avoiding an interruption of service. A salient feature of this invention is that the reserve fiber path pair can also handle overflow calls: Using the above traffic criteria, it is expected that for 1 out of 500 call requests during the busy hour, the working fiber path pair would be fully assigned. Using the overflow capability, further call requests are not blocked but can be placed on the reserve fiber path pair. Thus, the reserve fiber path pair can serve as an alternate transmission medium on a call-by-call basis.

FIG. 5 illustrates an embodiment of this invention which is interfaced to an existing analog central office 110 on a VF line basis. The network controller (LNC) 22 is provided with VF subscriber line interface cards 31 which have a plurality of subscriber line outputs, each output of which is assigned to a specific subscriber and is wired to the appropriate position on the main distribution frame 117 leading to the central office switch 116. In this embodiment the exemplary 1440 subscribers are each assigned one position on a line card 31 at a remote and one position on a different line card 31 at the central office 110.

Figure 6:
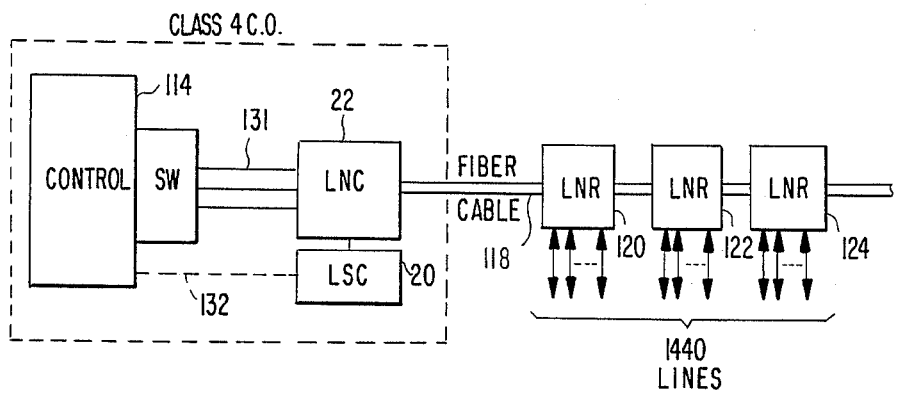
FIG. 6 is a simplified diagram of an embodiment of the invention and illustrates the reduction of channels which is achieved by the demand access feature where the traffic is interfaced with the central office in concentrated form.

The system can also work into a modern digital office employing common channel signaling, for this case FIG. 6 illustrates the preferred interfacing. In the case of FIG. 6, the LNC 22 is provided with ten T1 interface ports 131; each T1 port provides 24 trunk circuits for a total of 239 VF channels (plus the control channel). An additional connection 132 is provided to convey the signaling information for the 239 circuits between the digital office control 114 and the LNC 22. This embodiment greatly reduces the amount of equipment required at the central office for both the network controller and the digital switch. In the example illustrated in FIG. 5, to serve 1440 subscribers, 1440 VF ports are required at the network controller (LNC) and another 1440 VF ports are required at the digital switching equipments 116-117. The 1440 portsat the LNC and at the switching equipments 116-117, as illustrated in FIG. 6, are replaced by 10 T1 ports 131 in the network controller (LNC) and an additional 10 T1 ports in the digital switch, plus the common signaling channel 132. Of course 1440 VF ports are still required for the subscribers distributed among the remotes (LNR). Thus, FIG. 5 requires 4320 ports for 1440 subscribers, each subscriber requires a single port at the associated remote, a port at the LNC22 and at the switch. The FIG. 6 embodiment requires the same 1440 ports at the LNR's but only 10 T1 ports at LNC 22 and at the switch for a total of 1460 ports. While the T1 port is, of course, more complicated than a VF port, the difference in required ports (2860) clearly indicates the economics provided by FIG. 6.

Another salient feature of this invention is that the same field equipment, consisting of the fiber cable and the remote units (LNR), can be used for either of the central office interfaces illustrated in FIGS. 5 and 6. The field equipments do not need to be replaced if an office is to be converted from analog to digital operation, saving considerable expense and inconvenience.

System Control and Communications

Referring to FIG. 2A, the LNC node processor 35, the LNR control module 30 and LNC local control module 25 are arranged to control the system in response to changing line status conditions such as off-hook, ringing and administrative commands. These equipments perform functions necessary to establish and maintain calls, arrange for communication between themselves on a designated control channel, provide local control and status monitoring of line cards, periodically refresh line card registers, and communicate with the LSC 20. The LSC 20 is arranged to provide visibility of internal system status to operational personnel, allow configuration of the general system hardware and software for specific applications, provide means for circuit administration, and to provide other desired functions including traffic monitoring and testing of the system.

To permit communication of control information between the LNC 22 and LNR control modules 30, one VF channel in each fiber path is dedicated as a control channel. The LNC node processor 35, all LNR control modules 30 as well as the LNC local control module 25 on a fiber path may be connected in a party line circuit on this channel. The node processor 35 is arranged to coordinate access to the control channel by monitoring all transactions and polling the LNR control modules 30 to inform each one when it may use the channel. Each processor or control module (25, 30, 35) is arranged to hear the transmission of all others, so that one LNR control module 30 may talk to another merely by addressing its location on the control channel. As will be explained below this may require an intermediate control module 30 to transmit in two directions. On the other hand, the remote control modules 30 may be provided with information respecting the relative location of each other control module so the appropriate fiber path can be selected for transmission. Alternatively, other conventional protocols may be used to order communications on this party line.

The hardware port at each LNR control module 30 checks the transmitted address of a message on the control channel against its own, and responds when it has a match. When a message is intended for more than one control module, a special broadcast address is used which stimulates all control modules to inspect the message. Error control is provided on all transactions by generating and detecting a 16-bit polynomial check sum, and returning a positive acknowledgement to the sender upon correct receipt. Acknowledgements are sent by a control module at its poll time, and retransmissions due to lack of acknowledgement are made at the next poll time of the sender. For multi-destination messages, the sender retains a count of the total number of destinations involved, and checks the number of received acknowledgements against this total. If all acknowledgements have not been received by the next polling cycle, the message is retransmitted and the procedure repeated.

The LSC 20 communicates with all control modules (25, 30) on a particular fiber path through the node processor 35 at the LNC for that path, with the node processor 35 acting as a store-and-forward relay for messages to or from the other control modules (LNC local 25 and LNR 30).

Circuit Routing and Switching

This invention also provides that command of the circuits for voice or data may be established directly between any remotes on the same fiber path; for example, a "hot" line between police and fire departments. With this invention, these circuits do not need to be routed through the LNC 22 or the central switch. This is effected by simply permanently (or semi-permanently) assigning one or a pair of VF channels between different LNRs for the attached subscribers. Thus, subscriber X is always "connected" to subscriber Y. The referred to connection is implemented in node processor 35 (or LSC 20) by associating the port addresses of the subscribers X and Y. When either goes off hook, the associated control module 30 signals control module 25, via the control channel, that the subscriber is off hook. The message is passed on to the node processor 35 which in return assigns a free channel to both subscribers and initiates ringing of the on-hook subscriber. When the on-hook subscriber goes off-hook the call connection is made. The particular channels which are assigned is random and based on the identification of a free channel when the off-hook status is recognized. The "hot" line connection is implemented by ringing subscriber Y when subscriber X goes off hook and commanding the subscribers X and Y to listen to the channels assigned to the transmission of subscribers Y and X, respectively.

However, switched connections can also be made without use of a central office switch (116 or 114 in FIGS. 5 and 6). To effect this function the LSC 20 must be enhanced to handle automatic call routing, a dialed digit absorber is added to LNC 22 and the interface of FIG. 6 is used. The dialed digits, detected at LNC 22, are forwarded to LSC 20 where a determination is made as to whether or not the call is directed to a subscriber on the fiber path or not. If it is the LSC 20 translates the dialed digits to the port number (requiring a memory reference) and a free channel is assigned to calling and called subscriber with directions for the called subscriber to "listen" to the calling subscriber's channel and vice versa. If the call destination is external to the area served by the fiber paths, a direct outward dialed call will be placed to the dial network using one of the standard protocols. Other modern telephone features can be provided with the system of this invention by adding ancillary hardware and/or software modules. As will also be described below a call which is internal to a particular LNR can be handled without assigning either subscriber a channel on the fiber path for the voice exchange.

The embodiment of the invention, described immediately above, constitutes a distributed, integrated-services, digital switching network. As such, it brings the services out of the central office more directly to the subscriber populations.

In the present state-of-the-art, digital remote units and their host unit comprise a star network, with attendant service and resource allocation restrictions. The remotes of this invention, however, may be placed as best serves the subscriber needs and concentrations, connected by a common transmission means in such topology as may be convenient.

Call Processing

Channel assignments are made on a demand assigned, multiple access basis. For outgoing calls, the sequence of events, and functions performed by the LNRs and LNC is typically as follows:

When a subscriber goes off-hook, initiating a call, a loop interface circuit in the subscriber line circuit contained in line card 31 changes state, and the change in state is detected by A/B signaling logic, which records a status bit. This bit is detected by the LNR control module 30 which periodically polls all line card status registers. Upon detection of the off-hook condition, the control module 30 sends a message on the control channel to the node processor 35 at the LNC 22 requesting a channel assignment. As mentioned, the node processor 35 maintains a table of busy and idle slots (channels), and when an idle time slot is found, the LNC node processor 35 sends a message on the control channel to the originating remote control module 30 containing the time slot information for each direction of transmission, and sends a second message with the same information to the mirror image local processor 25 in the LNC 22. The LNC control module 25 and the remote control module 30 command their respective line cards to utilize the designated channels (upstream and downstream), thereby establishing a full duplex circuit interface. The local control module 25 in the LNC then commands the line card at the central office to present an off-hook condition to the central office to be repeated to the called subscriber.

As discussed above, if the signal source requesting the channel is a high bandwidth apparatus, such as a video terminal, then the request and the assignment executed is for more than one channel.

While the call is in progress, data destined for the remote is extracted from the assigned channel or channels from the high speed data stream traveling in the downstream direction at the off-hook line card and locally generated data at the remote is inserted in the assigned channel or channels in the high speed data stream traveling in the upstream direction. Similarly, data is extracted at the complementary LNC line card in the upstream direction and inserted in the downstream direction. If desired, the node processor 35 at the LNC may be programmed to independently assign upstream and downstream channels (for requirements such as simplex channels).

While the call is in progress, the originating remote control module 30 monitors for a sufficient on-hook duration and when on-hook occurs, sends an appropriate control message to the LNC node processor 35 identifying the line circuit. The node processor 35 then releases the channel by sending a tear-down control message to the remote control module 30 and the local control module 25. Upon receipt of the tear-down message, the local processor 25 returns the central office interface to an on-hook condition.

For incoming calls, when a ringing voltage is detected by a line card 31 at the central office, a status bit is turned on and is detected by the LNC local control module 25 which polls the LNC line cards in the same fashion as the remote control module 30 polls its line cards. Upon detection, the local control module 25 sends a message to the node processor 35. When an idle time slot is found, the node processor 35 sends a message to the originating local control module 25 containing the time slot information, and sends a second message with the same information to the mirror-image remote control module 30 at the remote unit, establishing a full-duplex circuit. The control module 30 at the remote unit then generates ringing by turning a control bit on and off at appropriate intervals on the subscriber line card 31. If the subscriber does not answer, ringing will continue until the ringing voltage is removed from the LNC 22 line card by the central office. Upon detection of this event, the LNC local control module 25 will send a control message to the remote control module 30 to stop ringing, both line cards will return to an idle status, and the time slot is released. If the subscriber answers by going off-hook, the remote control module 30 detects this condition by polling the line card status and ringing is stopped. The call proceeds as described above, and while in progress, the remote control module 30 monitors for an on-hook condition, as in the case of the outgoing call.

The above call processing scenario was for direct line applications, where the destination of the circuit was predetermined, such as the CO-line interface depicted in FIG. 5 or as the previous 'hot' line example between remotes.

The invention may also provide local-loop digital switching functions. In these cases, the destination is ascertained by assigning a module (i.e., a digit absorber), at the LNC to intercept the destination digits when a subscriber has been observed to go off-hook. A channel is assigned by the node processor 35 for this purpose. The digits are forwarded to the LSC 20 to ascertain if this is a local call. In local calls, the equipment number of destination is retrieved from LSC 20 memory and channel assignments are made directly from the remote where the call originated to the destination remote.

For the purposes of this retrieval a file is maintained by the LSC 20 of equipment number vs telephone number for local subscribers (the dialed digits represent the telephone number). The equipment number is a code which identifies the specific equipment to which a subscriber is connected, it includes the fiber path number, the remote number, the card position number and the circuit number of the line card (if, as is typical, the line card has plural circuits).

For destinations outside of the system, the LSC 20 commands the establishment of a channel between the subscriber and an available trunk-connecting port card (included at the central office, but not illustrated). The required call information, including destination telephone number and source telephone number, is forwarded to the switching network according to a predefined standard protocol.

For incoming calls, the local LNC control module 25 observes an incoming call on a system trunk port card. The destination number is conveyed by a standard protocol to the LSC 20 which retrieves the corresponding destination equipment number. It forwards the circuit commands to the node processor 35. The node processor 35 communicates with the remote control module 30 serving the destination and, if the remote line is not busy, sends messages to both the remote control module 30 and the local control module 25 to establish an available channel between the destination line card circuit and the trunk port card circuit, and to ring the subscriber's phone.

Multiplex Aspects

The present invention is a Time Division Multiplex Demand Assigned Multiple Access (TDM DAMA) system which basically contains a number of 64 kbps digital synchronous data channels (equivalent VF channel) multiplexed together to form a 16.000 Mbps composite stream. The multiplexing is performed in two stages, where the first level consists of generating a 1.600 Mbps stream (T1+), and the second level consists of synchronously interleaving ten such streams on a bit-by-bit basis.

The 1.600 Mbps stream (T1+) has a frame rate of 8000 per second, where each frame contains 25 8-bit words interleaved on a word-by-word basis. Each word represents one channel of 64 kbps data or traffic. Data (or traffic) includes PCM encoded voice. The first word in the frame contains overhead data associated with the 1.600 Mbps stream, while the remaining 24 words can be assigned to subscribers as PCM voice or data channels. The capacity and frame rate of the 1.600 Mbps stream is (aside from the overhead data) therefore the same as for a standard T1 stream.

FIG. 7 shows the 1.600 Mbps frame format in tabular form. As seen in the figure, the 1.600 Mbps stream has both a frame and a multiframe structure. The multiframe consists of a sequence of twelve frames. The only but important distinction between frames is the content of the seventh bit of the overhead word, and in some cases the eighth bit of the overhead word in the twelfth frame.

When used strictly for individual 64 kbps channels, the 1.600 Mbps stream does not require any of the information in the overhead word. Bits 1 through 8 are ignored, while bits 9 through 200 represent the 24 64-kbps channels.

The overhead word is used when the 1.600 Mbps stream contains a T1 stream rather than individual 64 kbps channels. There are two different modes for transporting T1 streams. One mode is asynchronous and in this case bits 8 through 200 of the 1.600 Mbps frame are used as a pipeline of nominally 1.544 Mbps data rate. If the T1 rate exceeds the rate of this pipe, bit 7 of frame 6 can be used as required to transmit T1 bits ("Negative stuff"). If the T1 rate is less than the bit rate of bits 8 through 200, bit 8 of frame 12 can be used to "positive stuff" a blank bit instead of a T1 bit, thus effectively reducing the bit rate of the pipeline.

In this case, bit 7 of the overhead word is used to signal the receiving end in advance regarding the content of the slots marked $V_1$ and $V_2$ in FIG. 7, so that all T1 bits and no stuffed bits are included in the output 1.544 Mbps signal. Asynchronous T1s can be handled by means of T1 Asynchronous (TAS) modules described hereinafter.

The second mode of handling T1 signals is as frame aligned synchronous or plesiochronous streams. In this case, the incoming T1 stream is frame aligned to the 1.600 Mbps stream, and its frame bits are placed in bit 8 of the overhead word. By this means, the channel modules can pick out individual 64 kbps channels from the T1 stream, and the local node can act as a channel bank where each channel module can be programmed to multiplex/demultiplex any one or more of the channels of the T1 stream. This mode of interfacing with T1 streams requires the use of a T1 Frame Alignment (TFA) module, also described hereinafter.

Both TFA and TAS modules make use of bits 2 through 6 for overhead signaling for maintenance functions.

The format of the 16.000 Mbps stream is shown in FIG. 8. Line A shows the format of the 1.600 Mbps frame. Line B shows the same thing with the overhead word expanded. Line C shows the tenth of the ten synchronous and frame aligned 1.600 Mbps streams which form the inputs to the second level multiplexing. Line D shows how the ten streams are interleaved to create the 16.000 Mbps high-speed stream. This stream consists of 200 10-bit words where each word is the result of interleaving a specific bit from each of the 10 1.600 Mbps streams, except the first one, called the frame word. Thus, each of the 200 10 bit words has one bit from each T1+ bit stream. Furthermore, the bit interleaving does not change the relative time of each channel's time slot.

Line E shows the frame word. It normally contains 10 bits occurring where the interleaved bit 1 of the 10 1.600 Mbps streams would be placed. The first bit (X2) of the frame word is normally a blank bit, the only purpose of which is to occupy one bit time. This bit can be omitted, or two such bits can be inserted (X1, X2), to generate a "short" or a "long" frame, respectively. The next following two bits (F1, F2) are each of a length corresponding to one and a half high-speed clock cycles. These bits serve as both frame and multiframe marker for the multiplexed stream.

The one and a half clock cycle length of the F1 and F2 bits and their logic content make it possible to immediately recognize their appearance in the received stream. F1 and F2 always have opposite logic content, which causes a logic transition in the middle of a clock cycle while all other data bits have logic transitions only at the beginning of a clock cycle. The unique position of the F1-F2 logic transition relative to the clock is easily detected and used as a frame marker to identify the position of all other bits in the received stream. Channel modules are aligned to the frame by means of this high speed frame sync (HFS) signal on the high-speed bus.

In frames 1 through 6 (in a preferred embodiment) the logic content of F1F2 is 01, while in frames 7 through 12 the content is 10. The logic content of F2 is extracted and used as a multiframe marker. Multiframe alignment is achieved by channel modules through observation of the logic content of the first two bits of the RXE frame. Before outputting RXE in the Received Frame 151, the Line Decoder (as described below) inserts the logic content of the F2 bit into the first two bits of the RXE frame.

Following the F1F2 bits, the high-speed stream contains six common overhead bits (D1-D6) used for signaling between COM modules (29 or 24). This completes the frame word. All subsequent ten-bit words of the high-speed stream consist of interleaved data from the component 1.600 Mbps streams.

With this frame structure, let us examine how add/-drop is effected for a single VF channel. We assume a selected VF channel is derived from the second of the 10 T1+ bit streams, located as channel 13 in the 24 VF channels of that second T1+ stream. Channel 13 occurs at a fixed time after frame sync (either 1.60 Mbps or 16.00 Mbps). Since the VF channel comes from the second T1+ stream, we start at the 13th channel slot and extract the second bit of each of the eight 10-bit words which start there. This gives us 8 bits/frame or exactly one VF channel. To extract two contiguous VF channels we begin as above but extract the second bit of each of 16 (instead of 8) 10-bit words, giving 16 bits or 2 bytes per frame, i.e. two VF channels. It should be apparent how the procedure may be extended for other bandwidth requirements.

To implement a channel assignment, both a channel number and a fiber path are specified. Specifying a channel number (from 1 to 240) specifies the delay, in bits, from frame sync (HFS) to the first bit and extracting every tenth bit for eight ten bit words extracts a VF channel. By extending the duration (from eight to sixteen words) we can double the extracted bandwidth (to two VF channels) and so on. The bandwidth required by the line card is known from the board type identification 180a and the assigned class mark. For low data rate applications it is possible to extract less than 8 bits per frame, down to and including extracting a single bit per frame, thus allowing up to 8 low-speed channels per VF equivalent channel. As is more particularly described below, each fiber path serving a remote is identified with a particular bus sub-system (64, for example). Accordingly, specifying the particular bus sub-system (to the bus selector of the intended line circuit) specifies from which one of the four fiber paths the 16.000 Mbps stream will be obtained.

When fiber paths are joined, such as at a branch or at a hub, communication between fiber paths can be performed as high speed add/drops of individual channels without going through a demultiplexing/remultiplexing sequence. This greatly simplifies the hardware at the junction, but requires that the frames on the joining fiber paths be perfectly aligned. Three levels of the add/drop function can be performed at fiber path junctions, which are summarized here and given in greater detail in the module description hereinafter.

The simplest one is, in the present invention, performed at fiber branches. In this case, the downstream signal is transmitted on both of the downstream branches, and the two upstream frames are simply summed by means of an OR gate as they join. This function is effected by the branch module (47 in FIG. 2A) described below (see FIG. 16). The OR function requires that a channel which is assigned on either branch must be blocked on the other.

This can be overcome, but even then multifiber junctions require that the time slots not used for interfiber communication are positively blocked from one fiber to the other, so they can be used for different channels on each fiber for intrafiber communication. This function is achieved by a Programmable Fiber Crossconnect (PFX) module as described in greater detail below.

The highest system traffic handling capacity can be achieved by performing a time slot interchange rather than a straight add/drop of interfiber communication channels. This requires memory at the junction to hold data from one fiber until its new time slot occurs on another fiber. The module which performs this task is the Time Slot Interchange (TSI) module, as described below.

TSI modules at a hub center provide this location with the essential switching capability of a digital central office with no other switching equipment.

Direct Channel Access

This invention provides two key operational capabilities: (1) direct fiber path selection, and (2) direct channel selection. Each is done by the individual line circuit (on the line card 31) involved. Each line circuit has direct access to all channels of all fiber paths serving the remote, no intervening multiplex equipments or selective switching equipments are required.

Previous approaches required that demultiplexing of telecommunication circuits be done by stages of equipments. For example, T3 level (45 Mbps) to T2 level (6.2 Mbps), T2 to T1 (1.544 Mbps), and T1 to VF encoded (64 Kbps). Previous approaches also require separate switching equipments to accommodate route diversity and line protection capability. With this invention, the LNR bus 7 (in FIG. 2A) provides the 16 Mbps data stream and recovered timing signals (containing the various communication channels) from all fiber links serving the remote and these are directly presented to each line card 31. Each line circuit in an LNR obtains the specific channel assigned to it from the desired stream, obviating the need for intervening multiplex and switching equipment, and saving on the cost, complexity, and restrictions of use of such equipments.

Each card 31 thus selects the direction of transmission from the remote and therefore the next unit to which a transmission is directed. Means are also provided for the transmit selection of a line circuit to be made independently of the receive selection. This provides for flexible modes of communication, such as: receive only (broadcast reception), transmit in the return direction ("hub" mode), transmit in the through direction ("loop" mode), protection switching, remote-to-remote communication, and alternate central control channels (from auxiliary control nodes or paths).

System Configuration Capability

The particular configuration shown in the embodiment of FIG. 2A is designated the "hub" configuration, and is typically used where a plurality of subscriber areas radiate outwardly from a central location. As shown in the figure, the remote units may be branched so as to serve subscriber populations not located on the main line from the LNC, and, as will be described in greater detail below, special remote units such as LNR/B 47 provide for splitting of the downstream signals at the branch junction locations and, more importantly, merging the returned signals.

It should be understood that arrangements other than the illustrated hub configuration may be used, and are within the scope of the invention. Other examples which may be utilized are the following: a loop configuration in which all of the remote units are connected in a loop arranged for both clockwise and counterclockwise transmission; a node-to-node configuration in which a plurality of remote units are coupled in a serial string along a fiber between two terminating LNCs; and a single LNC which can serve as a PBX or demultiplexer.

A salient feature of this invention is that it may be embodied in these various physical configurations by assembling the modules into the remote units as required and entering the desired network configuration in the LSC. For example, a remote engaging in bidirectional transmission will normally transmit opposite to the direction from which it receives in typical hub topology, whereas this is not true for typical loop topology. This requires the LSC to translate identification of a called party into a direction of transmission (fiber path identification) so the transmitted traffic can be received at the called party's location. For dedicated circuits this is administered by the local control module 30. Thus, a common inventory of modules may be kept for applications of various types of network, and an individual network may be allowed to evolve as best fits the subscriber population.

It is also an important feature of the invention that the functional configuration of a system may be dynamically altered—particularly in response to potential fault modes. For example, if the fiber cable should be severed in a two-fiber path counter-rotating loop, all circuits may be maintained by independently operating in hub mode each of the two pairs of fiber paths extending from the fault to the LSC. Thus, multipath redundancy is obtained in this embodiment with the use of only one pair of fibers in the loop.

FIG. 21 shows a two loop topology, with one bidirectional loop (including paths CW1 and CCW1) serving the central and sites 1, 3, 5, 6 and 7 and the other bidirectional loop (including paths CW2 and CCW2) serving the central and sites 2, 4, and 6. Path CW1 comprises link 70 (site 7 - central), link 71 (central - site 1), link 72 (site 1 - site 3), link 73 (site 3 - site 5), link 74 (site 5 - site 6) and link 75 (site 6 - site 7). One advantage of a loop is that circuit protection is provided without a backup path pair. For example, assume only loop CW1 and CCW1 were present and links 84 and 88 failed. The opened loop still provides complete connectivity through the central site. Assume a subscriber at site 6, connected through LNR 16, was engaged in conversation with a subscriber at site 2, LNR 19. Traffic in the CCW direction passed over links 88 and 89, while CW traffic passed over links 83 and 84. When links 84 and 88 are disabled, these paths are no longer viable. However, traffic can travel from site 6 to site 2 using links 85 and 82 and traffic from site 2 to site 6 can use links 86 and 87. This is possible if traffic can pass the central LNC 22, and it can by appropriate selection of a COM module 29. Thus, a single counter rotating loop path pair provides inherent back up for typical failure modes. Switching traffic from links 88-89 to links 85-82 (and similarly switching traffic from links 83-84 to links 86-87) is effected right at the line card 31 where the transmission path is selected.

Detailed Description of System Modules

Busing Structure

Figure 9A:
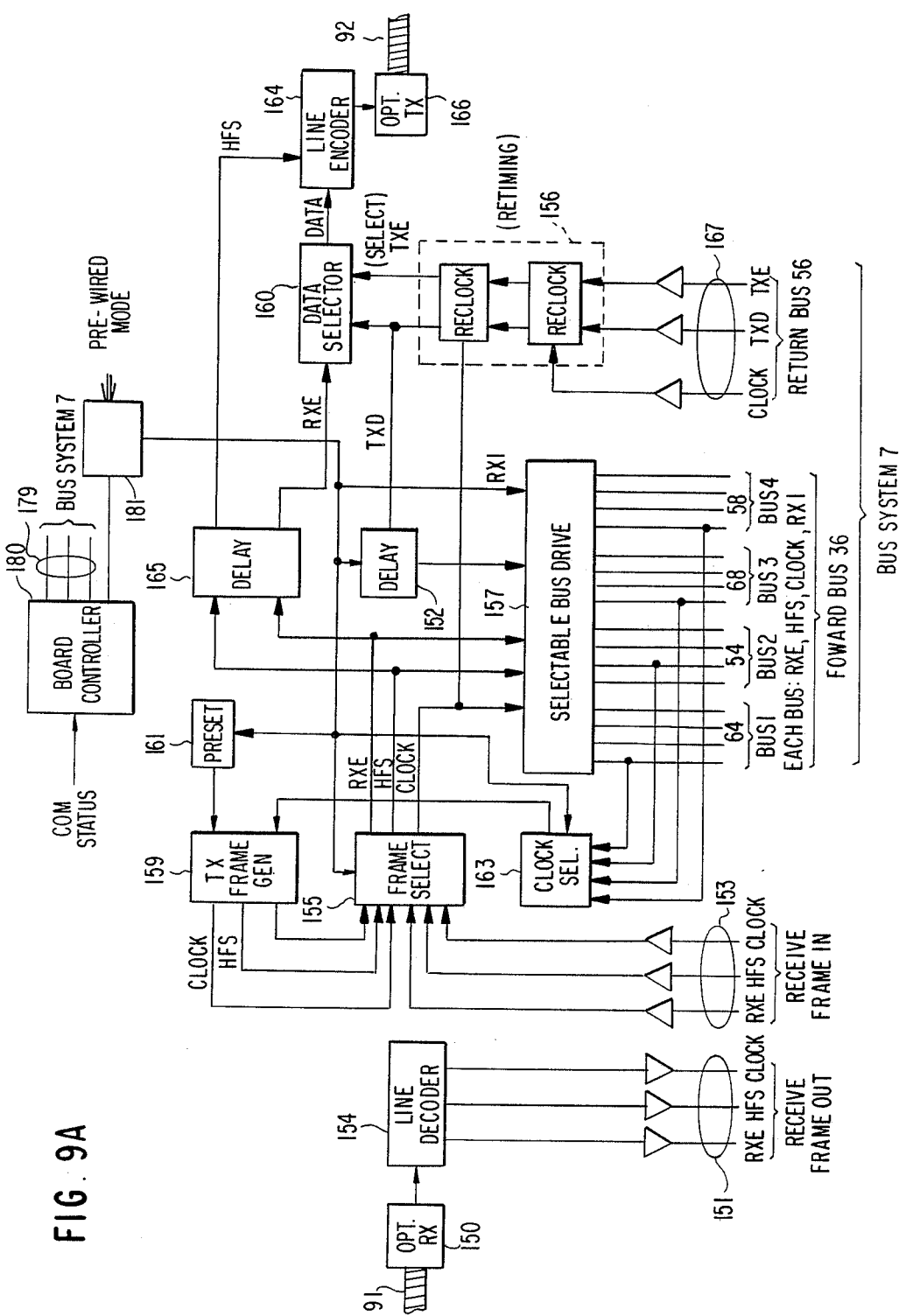
FIG. 9A is a diagram of a COM interface, the component of a COM module which is employed in interfacing to the optical signal on a fiber link.
Figure 9B:
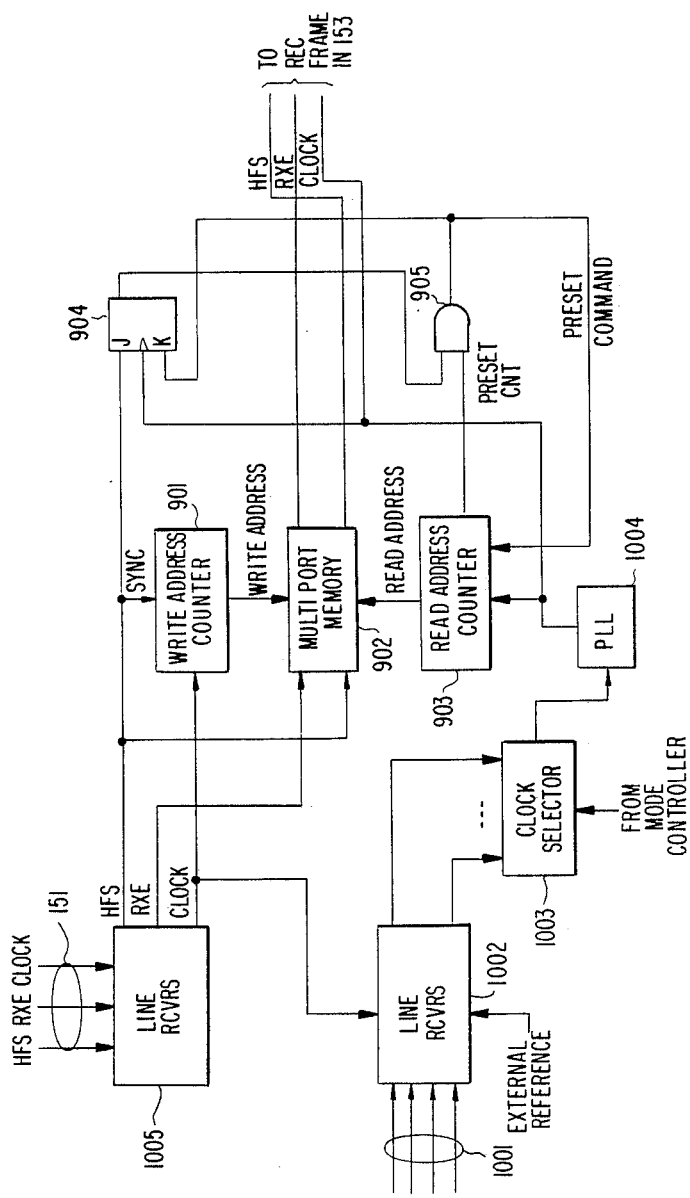
FIG. 9B is a diagram illustrating the retiming equipment at some remote locations and connected to a COM interface.
Figure 9C:
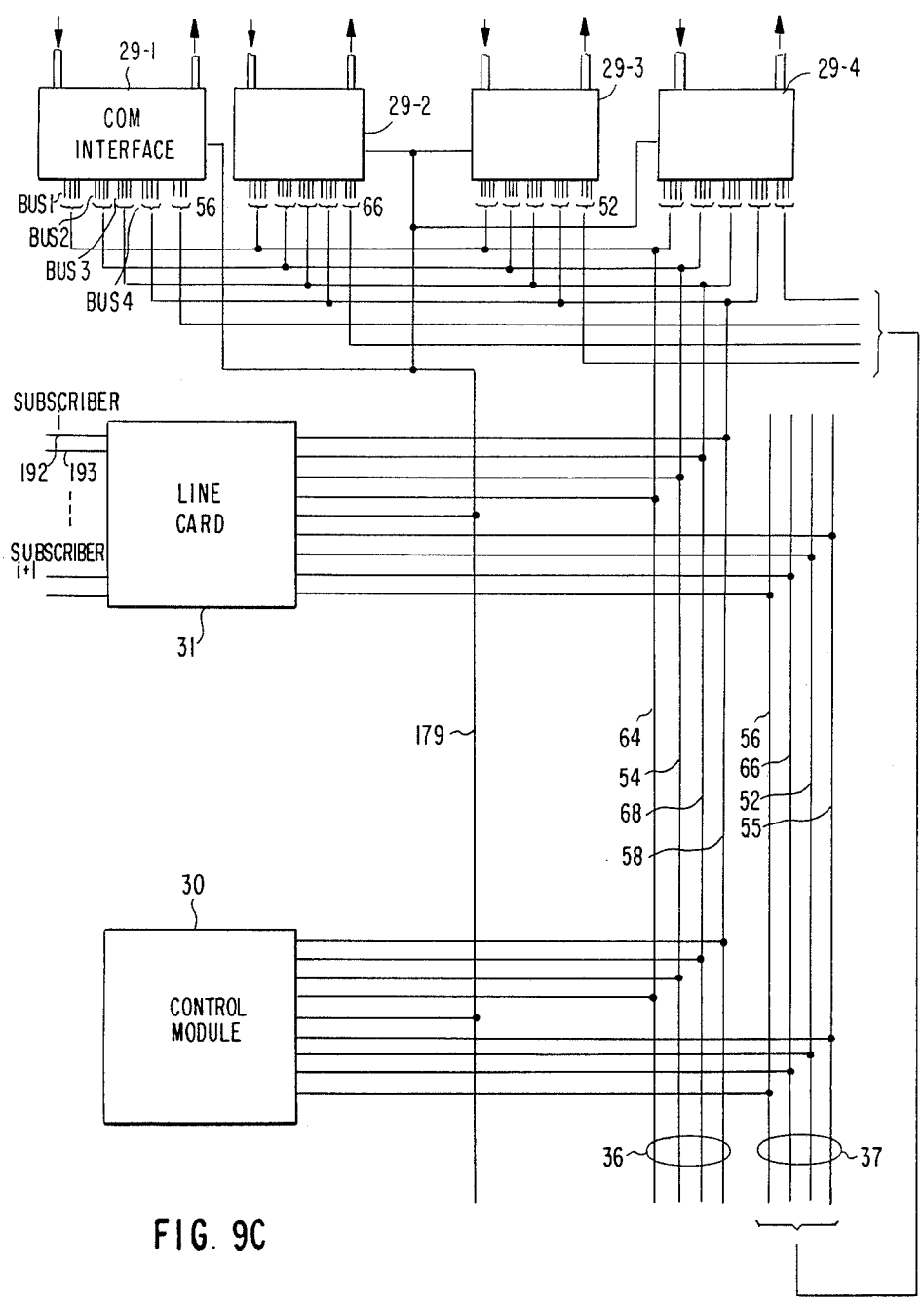
FIG. 9C illustrates the bus system 7 in an LNR and the relation to COM interface, line card 31 and control module 30.

FIG. 9C is a block diagram of a portion of LNR 28 particularly illustrating the bus system 7 and its relation to a typical line card 31 and control module 30, and the four typical COM interfaces 29-1 through 29-4 which comprise COM module 29, each with incoming and outgoing fiber links.

Bus system 7 consists of three sub-groups: (1) Forward bus 36 which carries the CLOCK, HFS, RXE and RXI signals from the selectable bus drives 157 of the COM module 29, (2) the return bus sub-system 37 which collects the TXD and TXE signals accumulated from the line cards 31 and control processor 30, and returns the CLOCK, TXD and TXE signals to the COM module 29; and (3) the control bus 179. CLOCK in the return subsystem 37 is identical to CLOCK in the forward subsystem 36.

Each COM interface (such as interface 29-1) has five bus subsystems connected thereto, four bus groups of the forward bus (BUS1, BUS2, BUS3, BUS4) from selectable bus driver 157 and a single bus group of the return bus subsystem. The four bus subsystems BUS1 (64), BUS2 (54), BUS3 (68) and BUS4 (58) are the forward subsystem 36, available at each line card 31 and the control module 30. The multiple conductors making up each subsystem are illustrated in FIG. 9A. The return bus system 37 comprises conductor groups 56, 66, 52 and 55 also available at each line card 31 and control module 30 but each conductor group returns to one COM interface. The return group 56 is available only at COM interface 29-1, return group 55 is available only at COM interface 29-4, etc. In this fashion there is a one-for-one correspondence between return bus group and the fiber link in which transmission will be effected since each COM interface is connected to only one outbound link.

Also illustrated is the low-speed control bus 179 by which the control module 30 monitors and commands the COM module 29 and the various line cards 31. The commands and replies on bus 179 are in serial format employing parallel CLOCK, SYNC and data lines.

Communications Module

FIG. 9A is a more detailed block diagram of a COM interface (such as COM interface 29-1) used at the remote units and at the network controller (LNC 22) for interfacing with two links of an optical fiber path. Each fiber path is coupled to a COM interface such as 29-1 at each LNR 28. For END LNR's or (some) LNC, each COM interface may be associated with two links of different paths. Thus for a cable with two pairs of fiber paths, each remote has four COM interfaces. Referring to FIG. 9A, optical receiver 150 converts the optical pulse signal on fiber link 91 to an electrical pulse signal, amplifies the electrical signal and feeds it to line decoder 154. The line decoder comprises a decoder which is arranged to extract clock (CLK), High-Speed Frame sync (HFS) and high speed data (RXE), from the high speed electrical signal, which signals are provided as Receive Frame outputs 151. In a Hub configuration, these are typically wired to the Receive Frame inputs 153. A Frame Selector circuit 155 selects these signals to be furnished to one of the four high speed busses via Selectable Bus Driver 157.

However, at the end LNR the Transmit Frame from Transmit Frame Generator 159 is selected instead. The LNC in a hub is an end location and an LNR may be an end for physical reasons, i.e. the last and furthest LNR in hub configuration; or for operational reasons, a break in the subsequent path (loop or hub), or for test purposes as in verifying reserve path operation.

At a physical end location the transmit and receive sections of a COM interface may be split, as they operate independently, to separately serve the upstream and downstream fiber links. At these locations, the Receive Frame outputs are wired directly to one of the high-speed busses to allow line modules to receive signals from the head end.

Selection of the Transmit Frame rather than the Receive Frame permits the COM interface to transmit in the upstream direction with a frame phase independent of the received frame, via the TX frame generator 159 and frame select 155. The transmitted frame phase can be adjusted by presetting the Transmit Frame Generator 159 by means of Preset circuit 161 which is controlled in a manner to be explained.

TX Frame Generator 159 is driven by a clock from Clock Selector 163. This circuit selects the clock from any one of the four high-speed busses, as directed by the system software via board controller 180. Normally, at the end LNR, the clock from the Receive Frame output 151 of the same module is selected. As mentioned above, this signal is available on one of the high-speed busses.

The various modes of COM module operation, including the TX frame preset, TX frame select, clock select, bus drive select, and RXI delay, are governed by a mode control driver 181. On initialization and in normal operation, the specific modes are set by wire jumpers as desired from the specific location and network topology. Should conditions warrant, the mode of operation may be changed via instructions to the LNR control module 30 which directs the COM module board controller 180 as to the proper mode. The board controller implements this by over-riding the preset jumpers of the mode control driver 181.

Thus, the apparatus of FIG. 9A corresponds to one interface (e.g. 29-1, see FIG. 2B) of the COM module 29. The bus system 7 comprises a forward and return subsystem. The forward subsystem 36 is available at each interface and itself includes conductor groups of a number typically equal to the number of interfaces. Each group has a conductor for each of RXE (received data), HFS (sync), CLOCK and RXI (internally generated data). The selectable bus drive 157 of any COM interface, of course, drives only one group of conductors in the forward bus subsystem 36. The return bus subsystem 37 similarly has a number of groups of conductors at least equal to the number of interfaces. Each group (such as 56, FIG. 9A) has provision for TXD (internally generated data), TXE (marker bit stream identifying TXD data which is to be placed on the fiber path) and CLOCK. Each return group is terminated at the associated COM interface. In the return subsystem, TXD and TXE are derived from a line card. CLOCK is simply jumpered to the end of the forward subsystem remote from the COM module 29. By this technique, time skew of signals on the bus 7 is avoided.

The bus system 7 interconnects with the control module 30 and line cards 31 as shown in FIG. 9C.

At the end of the bus, which can be extended to serve many line cards 31 by means of bus repeater cards, the output signals from the line cards 31 have been accumulated on leads TXD and TXE which connect to one of the Return Bus groups. Each COM module interface, e.g. 29-1, 29-2, etc. is wired to a separate Return Bus. The return Busses are physically part of the high-speed bus 7 which also carry RXE, HFS, CLOCK and RXI. All signals on the busses propagate in the same direction, which eliminates the problem of time skew between modules in different locations of the bus.

The TXD lead carries communications data, such as PCM voice, from line cards 31. Each voice or data channel is assigned a specific time slot in the high speed frame relative to the High-Speed Frame (HFS) marker in the Receive Frame Outputs 151, so that the TXD line is time division multiplexed by the individual line cards 31 into the high-speed frame format. Note, however, that only data generated locally occupies this frame. Received data is present on the RXE line.

The TXE lead carries marker bits which indicate whether the corresponding time slot on the TXD lead is assigned for transmission on the fiber path. A pulse on the TXE lead means that the time slot on the TXD lead is assigned for transmission on the fiber path. The TXD lead may at that time have a high or low logic level dependent on the content of the data stream generated by the module assigned that particular time slot. Both TXD and TXE signals are generated by line modules in time slots assigned by system software.

Active TXD slots do not always have a corresponding pulse on the TXE lead. The absence of a TXE pulse merely means that the data on the TXD lead is not transmitted on the fiber path. All TXD data is made available for reception by other line modules in the same LNR by feeding it back out from the COM module 29, after an adjustable delay (152) as RXI, Receive Internal. The RXI makes possible intra-LNR calls without using up bandwidth on the fiber path. That is, for intra-LNR connections, the calling line card 31 places digitized VF on a selected channel, as assigned by node processor 35, and is assigned to "listen" to another channel. The controls at the called card 31 are just the reverse. Transmitted digitized VF (or other data) is placed on the TXD bus (with no marker bits on the TXE bus). The absence of TXE bits prevents the signals from reaching any fiber link but the call participants are connected over the RXI bus.

TXD and TXE, plus the CLOCK at the end of the return bus, are fed to Retiming circuit 156 in a COM interface. The CLOCK is used to sample TXD and TXE to create a good waveform of these signals into the second reclocking stage, where timing jitter of the signals is reduced and their phase relative to other signals on the COM module is fixed, eliminating bus propagation time effects. The clock for the second stage of retiming is the clock from the Frame Select circuit 155.

After retiming, TXD is coupled to adjustable delay 152. On the output of delay 152 the signal is renamed RXI. Delay 152 is adjusted so that RXI has a specific frame position relative to RXE. This adjustment permits channel modules to be programmed for time slot assignment in the same way regardless of whether it receives an RXI time slot or an RXE time slot, even though these lines have a common frame marker HFS. A specific explanation of how this is achieved is given below.

RXI, in addition to being used for intranodal calls, can be used for test of channel modules by assigning the same time slot for both transmission and reception. This effectively places a channel in high speed digital loop-back through the COM module 29, thus checking 100 percent of the channel communications circuitry. This test also checks the high speed bus and the bus interfaces of the COM module 29.

After passing retiming circuit 156, TXD is also applied to Data Selector 160. Delay 165 supplies a delayed RXE as a second input to the Data Selector 160. Delay 165 is adjusted so that its delay matches the delay of the path of the signals along the high-speed bus 7 plus the Retiming circuit 156. RXE and TXD are therefore aligned at the inputs of Data Selector 160. Selection of RXE or TXD is done on a time slot by time slot basis, under the control of the pulses on the TXE line. These are applied to the Data Selector after having gone through Retiming circuit 156 in the same way as the data on the TXD line. A TXE pulse causes TXD to be selected at the expense of RXE. At times when no pulse is present on TXE, RXE is selected, and the COM module 29 in this case applies RXE to the Line Encoder 164 for transmission further down fiber path via Optical Transmitter 166. To the extent RXE is transmitted by transmitter 166, the LNR 28 represents a transparent path for data along the fiber route.

When a pulse is present on TXE, the COM interface replaces whatever data is present on RXE with the data on TXD. The COM interface thus functions as an add-/drop multiplexer which adds and drops TDM channels occupied by modules which have been given assignments for transmission over the fiber path, while remaining transparent for other TDM channels.

Line Encoder 164 reinserts the frame code and common overhead signaling channels shown in FIG. 7. Correct timing for performing this task is achieved by triggering the insertion with the HFS pulse delayed by Delay 165.

As mentioned, the synchronous processing of 16 Mbps data requires extremely accurate timing. At this rate a bit time is about 60 nanoseconds. Phase jitter of ±30 nanoseconds can prevent proper processing. Phase jitter in the microsecond range is expected on substantial transmission distances (i.e. 30 miles). Such jitter, referenced to the LNC is no problem at the remotes. However, since the end LNR uses the received clock for timing, it will turn around and transmit with this phase error. Additional jitter will accumulate as the data travels toward the LNC. This will prevent synchronous processing at the LNC. This problem is overcome by using downstream timing to retime upstream transmitted data. In this fashion, while jitter progressively increases in downstream transmission, it progressively decreases in upstream transmission.

To effect this retiming, the receive frame out 151 is connected to the receive frame in 153 via an elastic buffer module. The write clock for the elastic buffer is the receive clock obtained from receive frame in 151. However, the read clock for the elastic buffer is a PLL derived clock referenced to a received clock obtained from a selected forward bus. This results in the timing of the data traveling upstream at the output of the elastic buffer module being improved to that of the data flowing downstream. This output is applied to the COM interface receive frame in 153 and subsequently to the selected sub-system of bus system 36. This technque is applied at selected LNRs along the route. Thus, as the upstream signal progresses toward LNC, its phase error is progressively reduced. This is more particularly shown in FIG. 9B.

As described above, FIG. 9B illustrates equipment which is located between the receive frame out terminal 151 (of FIG. 9A) and the receive frame in terminal 153 (of FIG. 9A) at selected LNR's. The three signals HFS, RXE and CLOCK are coupled to a set of line receivers 1005 which provide for amplification and output. A write address counter 901 is clocked by the CLOCK output of the line receivers 1005. The write address counter 901 is synchronized by the HFS output of the line receivers 1005. The write address output of the write address counter 901 is provided as a write address input of a multiport memory 902, HFS is stored in one "track" of memory 902 while RXE is in another. The data input to the multiport memory 902 is the RXE from the line receivers 1005. From the foregoing, it should be apparent that the RXE data is recorded in the multiport memory 902, and that operation is controlled by the clock received along with it. Since this apparatus is arranged to improve the clock stability of data flowing toward the central (upstream), then it is this upstream clock which is used for writing. In order to improve the clock stability, however, the multiport memory is read with a PLL-derived clock based on a downstream flowing signal, i.e. one that is more closely tied to the central clock. The manner in which this is effected is now explained.

Terminal 1001 provides a plurality of clocking signals to a quartet of line receivers 1002 which provide for amplification thereof. The terminal 1001 can be, for example, identical to the input to clock selector 163 (of FIG. 9A). That is, more particularly, the inputs to the line receivers 1002 are the clocking signals from each of the forward bus groups. The line receivers 1002 also provide for an external reference if desired. Typically, however, one of the clocks from a downstream path is actually used, typically the downstream path of a working pair. The clock selector 1003 performs the clock selection, and it is controlled via the board controller 180 in the same manner that the clock select circuit 163 (of FIG. 9A) is controlled. The selected clock is output to a phase lock loop 1004 which provides a clocking input to a read address counter 903. The output of the read address counter 903 is the read addressing input to the multiport memory. The multiport memory provides two parallel outputs, one HFS and the other RXE. The clock component to the receive frame in terminal 153 is derived from the output of the phase lock loop 1004.

For synchronization purposes, the HFS signal is provided as the J input of a JK flip-flop 904; the clocking input to the flip-flop is provided by the output of the phase lock loop, and the K input is provided by the output of an AND gate 905. One input to the AND gate 905 is an output of the read address counter corresponding to a predetermined count (for example the length of a frame). The other input to the AND gate 905 is the Q output of flip-flop 904. When AND gate 905 is satisfied, one output presets the read address counter 903 to a predetermined count, for example 0. The net result of the apparatus shown in FIG. 9B is to maintain the upstream flowing data, that is the RXE input to line receivers 1005 is identical to the RXE output of the multiport memory 902. However, the jitter inherent in the clock input to line receivers 1005 is removed by use of the PLL 1004. In addition, since the PLL is driven by a downstream directed clock source, the phase difference (between the clock input to line receivers 1005 and the output of clock selector 1003) is reduced (that is the clock provided to the receive frame in terminal 153 is essentially in phase with the clock output of the clock selector 1003). In this fashion, phase jitter and phase differences between the upstream flowing data and the downstream clock is reduced. By providing the apparatus shown in FIG. 9B at several locations in a long path, the upstream directed clock is essentially synchronous with the central station clock, by the time it reaches the central station allowing for synchronous processing (i.e. add/drop).

Line Card Common Elements

Figure 10:
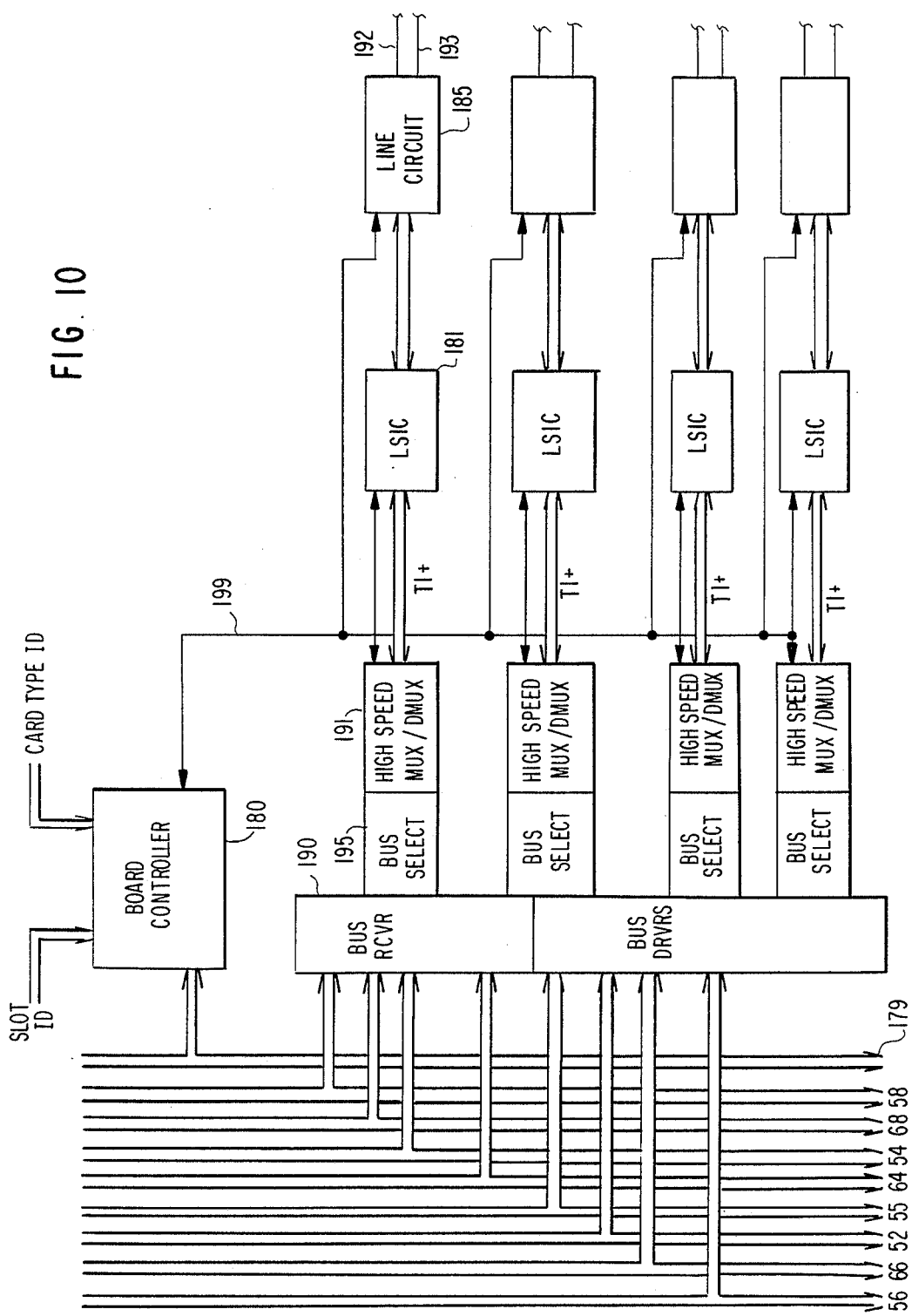
FIG. 10 is a block diagram of a typical subscriber line card which is used in the remote units.

All line cards have three elements in common: a bus selector 195, a high-speed Mux 191, and a board controller 180. The use of these elements is illustrated in FIG. 10, which is a block diagram of a remote unit line card 31 which interfaces the high speed signals provided by the communications module 29 to the individual telephones or other signal sources. The collective purpose of these three elements is to provide a T1+ (1.6 Mbps) interface for the subscriber line circuits which contains the data and timing for transmissions and reception of the designated channel for each line circuit, these being obtained from and delivered to selected high-speed bus 7 and having the required 16 Mbps data and timing; to provide for monitor and control of the line card operations; and to provide a uniform interface to bus subsystem 36 so as to minimize variations in timing and protocol.

The bus selector 195 selects which one of the four high-speed forward buses, (64, 54, 68, 58) an individual line circuit will obtain its 16 Mbps high-speed data from, and which 16 Mbps return bus (56, 66, 52, 55) it will transmit to. The high-speed mux 191 obtains from the selected 16 Mbps receive stream the T1+ stream (1.6 Mbps) in which the desired channel lies (demultiplex), and converts the T1+ transmit data to 16 Mbps with the desired high speed timing (multiplex). In addition, the high speed mux 191 also provides transmit timing, locked to the selected forward bus, for the lower speed timing circuits.

The board controller 180 provides the link on a given line card to the control bus 179 and thereby to the local control module 30 for monitor and control of all circuits on the line card.

The bus drivers and receivers 190 interface the four high-speed forward buses 64, 54, 68, 58 and the four return high speed buses 56, 66, 52, 55 with the bus selector 195. As the high-speed buses are differential, the interface employs high-impedance, differential bus receivers in order to minimize bus loading. The single-ended output of a bus receiver drives all bus selectors in common, one receiver for each of the buses. Thus, each bus selector has full access to each bus independently of the others. The embodiment in FIG. 10 illustrates the line card 31 as having circuits supporting four subscriber lines 192, 193; of course, design variations may provide more or fewer such circuits on a line card.

The bus selector also has four sets of high-speed outputs, one for each return bus. In normal operation only one of these outputs is activated and only at the bit timing for the channel(s) to which it has been assigned. This enables the outputs of each bus selector that is destined to a specific bus, 55 for example, to be "wired-OR'ed" together to form a single input to a bus driver. This is accomplished for each of the four return buses. The bus drivers are normally off which enables one line of the differential high-speed bus to be high and the other low. When data is to be transmitted, the bus driver pulls the high-line low and then pulls the low-line high for each "zero" to be transmitted. Thus, the high speed bus design combines the benefits of differential transmissions with "open collector"-type of operation resulting in the elimination of common-mode noise problems, improved accuracy of timing and multiple access operation.

The receive section of the bus selector 195, in addition to selecting the desired bus (one of 64, 54, 68, 58), also selects between RXI and RXE of the bus enabling the selection of an intra-unit call or an inter-unit call, respectively. Correspondingly, the transmit section has two modes; one where only TXD is activated wherein the data is looped back in the unit as RXI but not transmitted onto the fiber path, and the other where both TXD and TXE are activated so that the data representing TXD may also be transmitted onto a fiber link.

At the output of the bus select 195, the desired transmit and receive 16 MBPS streams are presented to the high-speed mux 191 for each line circuit. The high speed mux 191 provides 1.6 MBPS receive signals of clock (RCL), frame sync (FSR), multi-frame sync (RAB) and data (RDL) and the transmit signals of clock (TCL), frame sync (FST), multi-frame sync (TAB), data (TDL) and transmit enable (TEL). Independent transmit timing is provided so that transmission may be on a separate fiber link than reception (which, in general, will have a different phasing). All signals flow towards the low speed interface and control circuits 181 excepting TDL and TEL which flow towards the high-speed mux. In addition, the Gap clock (GCLK) 137 (see FIG. 9D) provides an exact 1.544 MHz average frequency reference for T1 line cards and other circuits which need this exact frequency. This collection of signals is termed the T1+ (1.6 MBPS) interface and is common to all line cards.

The low-speed interface and control circuit (LSIC) 181 using the frame and multi-frame timing references, extracts the desired channel(s) from the T1+ stream. In addition, status bits may be extracted and controlled, such as the A/B signalling function, Request-to-send and carrier-detect. The low-speed interface and control circuit provides the selected channel to the line interface circuit 185. This circuit transforms the digital stream to the format required to service the subscribers line connection. The function of these two circuits are more fully described in the line card section below.

Figure 9D:
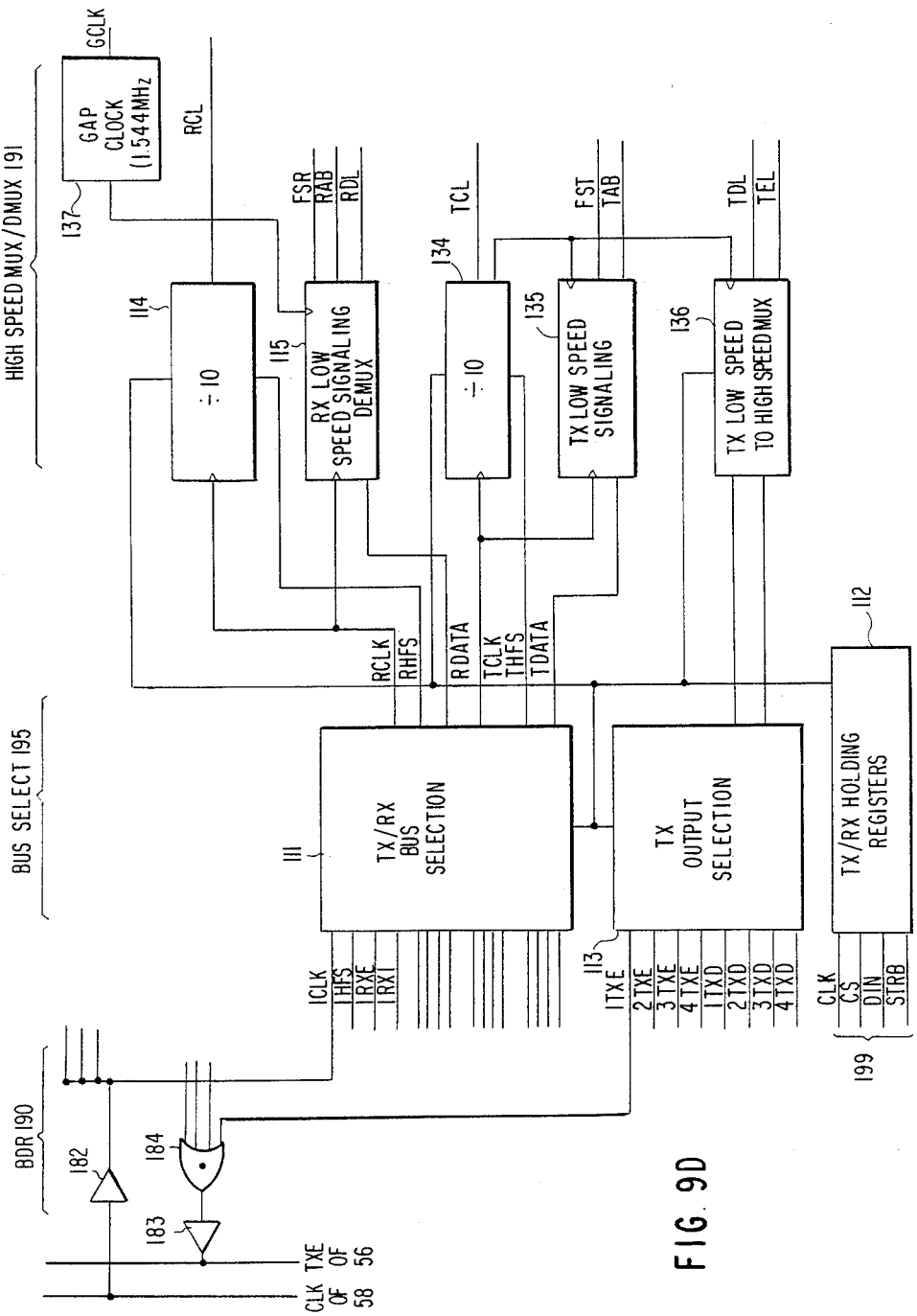
FIG. 9D is a block diagram of the bus selector and mux/demux of FIGS. 10, 11 or 13.

FIG. 9D shows a detailed block diagram of the bus selector 195 (FIG. 10), and the high-speed mux 191 (FIG. 10). In a preferred embodiment these two circuits are combined into one functional subsystem, using common control registers. This description applies as well to these same components of FIGS. 11 and 13. As seen in FIG. 9D, TX/RX Bus Selection 111 and TX Output Selection 113 couples the remaining circuits to the forward bus subsystem, via the bus drivers and receivers 190. The TX/RX bus selection 111 is a series of gates controlled by the TX/RX registers 112. Depending on the contents of the TX/RX registers 112, one of the four forward bus subsystems is selected (on two bits) and coupled to divide-by-ten divider 114 and demux 115. Four bits of the TX/RX registers 112 select one of ten T1 slots. A seventh bit selects either RXE or RXI for reception and an eighth bit specifies either the receive or transmit function. The demux 115 is a sampling function. Gap clock 137 divides the 1.6 Mbps low speed clock (RCL) by alternately 28/29 and gates the 1.6 Mbps with termial count to achieve an exact average 1.544 Mbps T1 rate. The TX/RX registers 112 also allow selection of the transmit function wherein the bus subsystem (2 bits) and T1 slot (4 bits) are specified. The transmit clock is derived in divider 134 which is phased to the selected T1 slot. The low-speed to high-speed mux 136 gates its inputs with TEL and in that event the TDL input is sampled at the 16 Mbps rate and coupled to the output selection gates 113. The output selection gates 113 effect the bus selection as well as selecting internal (no transmission) or external (transmit) modes, the latter is reflected in the TXE bit stream. Both selection are based on the contents of the TX/RX register 112.

The holding registers 112 are loaded serially with a four-line serial bus 199. When the chip select, CS, is active the data on DIN is clocked into the register and deposited upon receipt of a pulse on the STRB line. This approach enables the control of these circuits via the common serial board control bus 199, the circuits being differentiated by means of the chip select. The board control bus 199 also similarly controls the low-speed interface and control circuits 181, and the line interface circuits 185, these again being differentiated by respective chip selects. With refrence to FIG. 10, the board controller 180 interfaces the LNR control module 30 with the line card 31 and transmits instruction thereto via the board control bus 199. A specific board controller and the board which it controls is differentiated from other board controllers by means of the Slot ID. Typically, the first byte of message from the control module 30, on bus 179 contains an address code to which each board controller compares its Slot ID. The board controller which obtains a match then becomes active to the remainder of the message, thus performing a gateway function.

The slot ID code is furnished, in the preferred embodiment, by the motherboard, into which the line cards are placed. The motherboard is imprinted with a unique metallic code for each line-card connection. This code serves to selectively ground the Slot ID lines according to said code. Thus, a line-card is identified and controlled by virtue of the slot into which it is placed.

In order to identify and verify the type of line card placed in a given slot, a metallic pattern exists on each line card unique to each type of line card. This pattern, the card type ID, is also received by the board controller 180 and can be read by the LNR control module 30 via the board controller 180. This is used by board controller 180 for purpose of identifying to LNR control 30 the capacity required to support the attached subscriber(s). In this fashion, when an exemplary subscriber goes off-hook (or requests service) the capacity request message communicated by board controller 180 to LNR control 30 and back to LNC identifies the specific required bandwidth.

The card type ID is also used for determining, in conjunction with class mark that may be set for the assigned circuit, the type or class of call processing that is required.

As shown in FIG. 9D, a typical input to TX/RX bus selector 111 is provided via an amplifier 182. For the input shown in FIG. 9D, amplifier 182 is connected to the CLK line of forward bus group 58. The outpt of amplifier 182 is coupled to the one CLK input of TX/RX bus selection 111. The other three outputs of amplifier 182 shown in FIG. 9D are coupled to corresponding TX/RX bus selection circuits of the three other bus selectors on the card (see FIG. 10). There are four groups of inputs to each TX/RX bus selection circuits, such as the bus selection circuit 111 shown in FIG. 9D. The first group, labelled lCLK, lHFS, lRXE and lRXI are coupled to bus 1 (58) of the forward bus subsystem. The other three groups of inputs are coupled to bus 2, bus 3 and bus 4, respectively. Each group includes the four conductors mentioned above (see FIG. 9A).

In a like fashion, each bus selector 195 includes a TX output selection circuit 113. The output selection includes four pairs of outputs, each pair including TXE and TXD, one pair for each of the four buses in the return bus subsystem. As shown in FIG. 9D, the output lTXE is coupled as one input to an OR gate 184 which is actually a wired OR connection. The OR gate 184 includes inputs from three other TX output selections of other bus select circuits on the card. The output of OR gate 184 is coupled as an input to an amplifier 183 whose output is coupled to a single conductor (in this case TXE) of one of the return bus subsystems, in this case 56.

It should also be apparent from FIG. 9D how received data (T1+) and associated clocking signals are derived from the 16 Mbps stream. Furthermore, for the purpose of phasing transmit signals, the transmit clock of the selected bus group (and hence fiber link) is derived and made available to the low speed (T1+ and below) circuits via the divider 134 producing the T1+ clock and the low speed signalling information from TX low speed signalling circuit 135. The identity of the specific signals shown in FIG. 9D is described above in connection with FIG. 10.

The low speed interface and control 181 is responsive to a T1+ stream along with control signals from the internal bus 199 and in general provides for selection within the T1+ stream of one or more voice channels. The selected information is passed on to a line circuit 185 where it may be converted to analog form and placed on the subscriber conductors 192—193. In the other direction, subscriber information is received over the conductors 192—193 and converted into digital form by the line circuit 185. This digital information is coupled to the low speed interface and control 181 wherein it is inserted into a dummy T1+ stream whose timing is derived from the transmit timing on the fiber link in which the subscriber information is destined. This T1+ stream, coupled from the low speed interface and control 181 is then inserted by the high speed mux 191 into the 16 Mbps stream on the selected return bus.

While FIG. 10 is an embodiment of a line card 31 which can be used for subscriber information when that information corresponds to voice frequency, or otherwise, in an embodiment of the invention specifically implemented for voice frequency channels the low speed interface and control 181 and the digital portion of the line circuit 185, are actually implemented as a conventional CODEC. On the other hand, by modifying the line card 31 (of FIG. 10) by deleting LSIC 181 and line circuit 185, the basic T1+ stream is available. Adding the TAS or TFA modules instead of LSIC 181 and line circuit 185 allows direct asynchronous or synchronous interfacing, respectively, to a T1 stream. This is described in more detail with respect to FIGS. 14 and 15 under the heading TAS Module and TFA Module, below.

Figure 12:
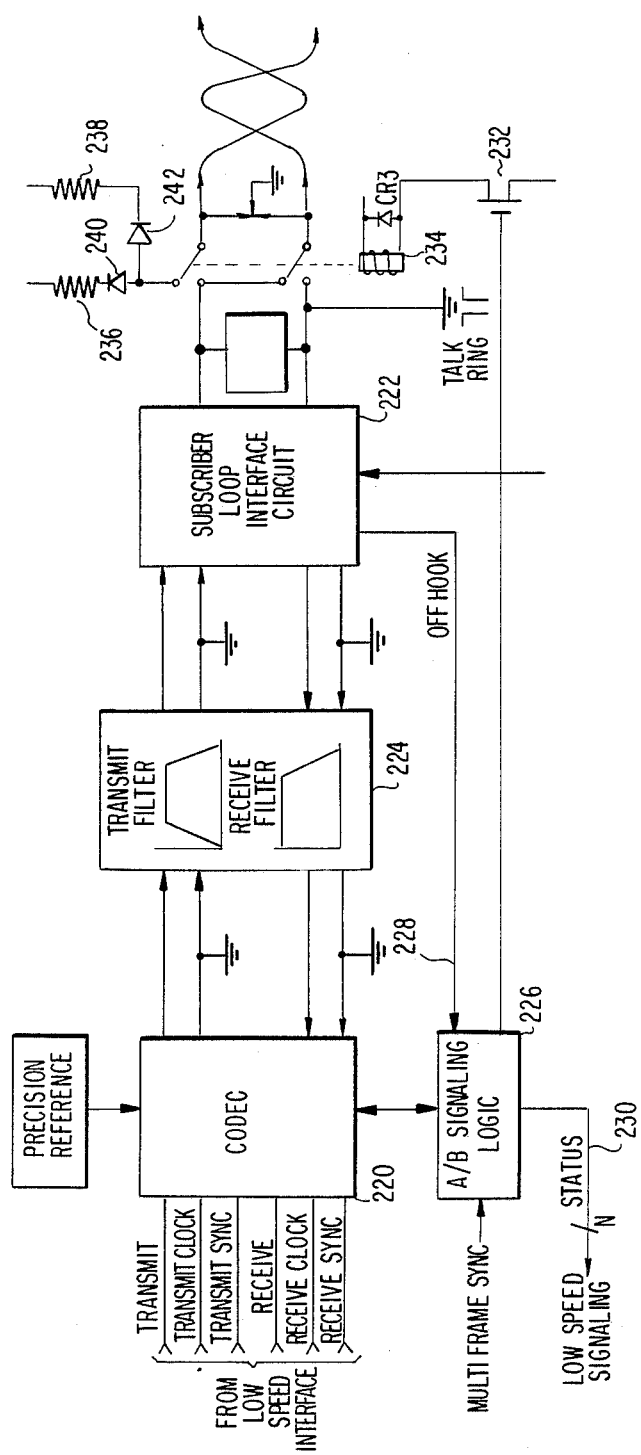
FIG. 12 is a block diagram of a line circuit, a part of a line card used at an LNR.

FIG. 12 is a block diagram of a VF line circuit (e.g. circuits 181 and 185) forming a part of the subscriber line line card shown in FIG. 10. The function of the line circuit is to translate the T1+ signals output by the high-speed mux 191 to intelligible voice communications for phone subscribers and to convert analog voice input to PCM.

The codec 220 communicates with the low speed T1+ interface, and converts received PCM signals to voice frequency and voice frequency signals to be transmitted to PCM format. The codec is interfaced to a subscriber loop interface circuit (SLIC) 222 which is capable of working directly with a two-wire phone interface, through analog filter 224. The SLIC 222 provides for the required battery-feed, loop supervision and 4-wire to 2-wire hybrid functions.

A/B signaling logic 226 is provided for detecting and indicating an off-hook condition and for causing ringing of the telephone. The off-hook condition present in the subscriber loop interface circuit is fed to the A/B logic on line 228, and the status output 230 of the logic is polled by the remote unit control module 30 (via board controller 180 and bus 199) to determine when off-hook and on-hook are present. Transistor 232 and relay 234 are controlled by the A/B logic to cause ringing of the telephone while resistors 236 and 238 and diodes 240 and 242 allow working and reserve ring buses to be ORed at the line circuit location.

As the receive output of codec 220 is analog sampled data, the receive filter is required to remove sampling products which are higher than half the sampling frequency. The transmit filter is required to prevent aliasing of the PCM encoding.

FIG. 10 also serves as a block diagram of the central line card 31 which is located at the (LNC) network controller disposed at the central office. This line card is complementary to the remote line card described in connection with FIGS. 10 and 12 and communicates therewith through the fiber path.

Figure 11:
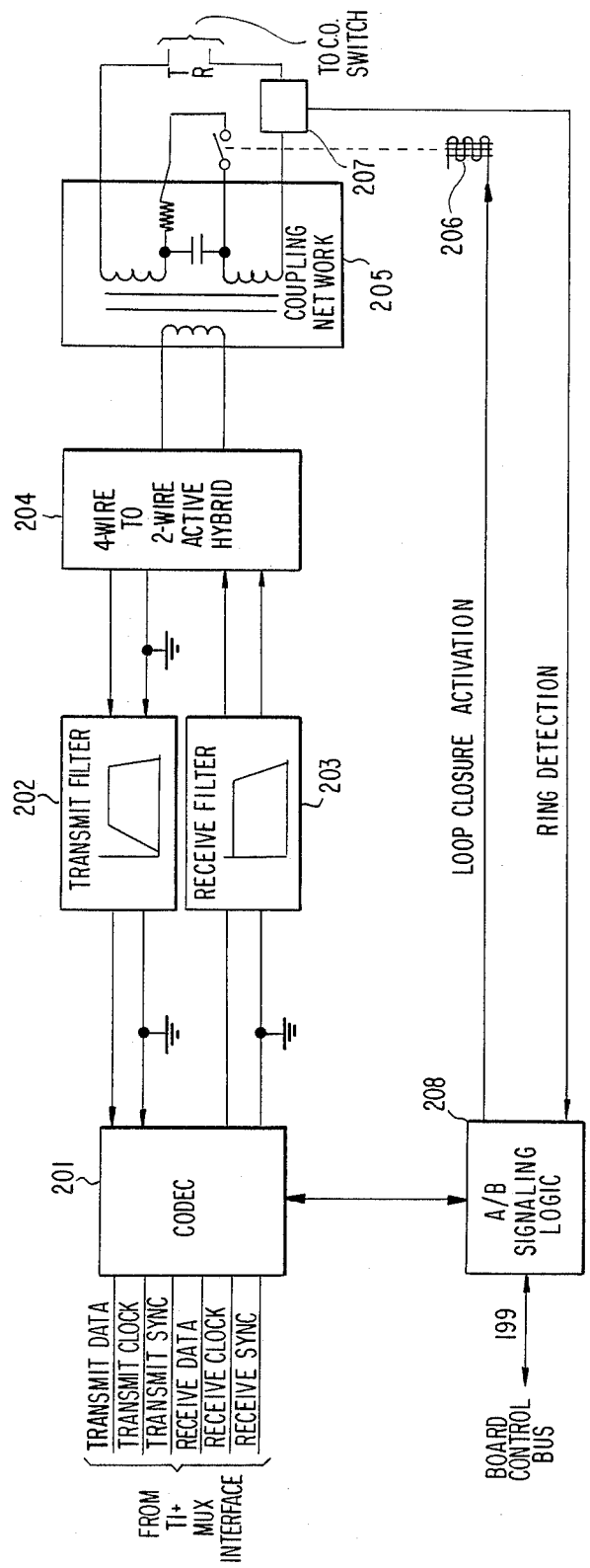
FIG. 11 is a block diagram of the subscriber line circuit which is used at the central office.

FIG. 11 is a block diagram of a line circuit used for the central card, said circuit connecting to a conventional C.O. switch. This design is complementary to the design for the subscriber line circuit (FIG. 12). The function of the codec 201, transmit filter 202 and receive filter 203 are as described for FIG. 12. An active hybrid 204 performs the 4 wire-to-2 wire conversion. Coupling network 205 provides dielectric isolation and loop current breakout while coupling the VF signal to the hybrid. An electrically isolated photocoupler 207 provides for ring detection and forwards the isolated ring detect signal to the A/B signalling logic 208. When loop closure is desired, relay 206 is activated which completes the DC path to the C.O. switch. Control and supervision is via the Board Control bus 199.

Of course, many other types of line circuits, such as data security and video, may be used with this invention; incorporating aspects of the invention within the line module as above.

Control Module

Figure 13:
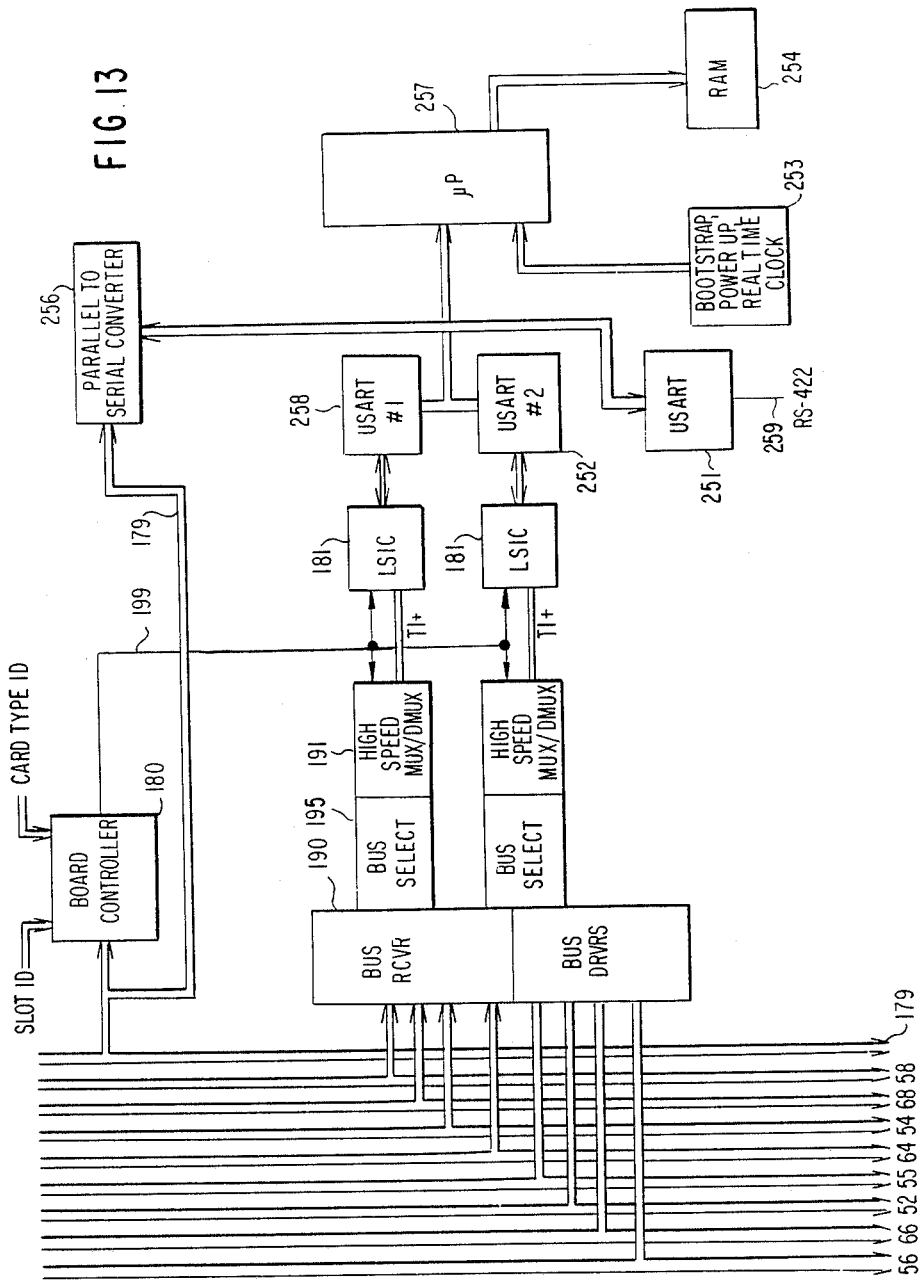
FIG. 13 is a block diagram of a control module 30 which is used at an LNR or central.

FIG. 13 is a block diagram of the control module 30 which is located at each of the remote access units. It is significant to note that the control module 30 includes dual communication channels through USARTs 258 and 252 which allows it to access to two VF channels simultaneously, specifically two control channels in either direction. Board controller 180 controls the HSM 191 and bus selectors 195 in the same way as described in connection with FIG. 10.

The processor 257 contains both a bootstrap ROM 253 and RAM 254 for storage of both program and data. On power-up, the processor 257 is arranged to bootstrap itself onto the control channel. The stored ROM program will use the parallel to serial converter 256 with the board controller 180 to control the LSIC 181, the HSM 191, and bus selector 195 to obtain the predetermined control channel. The low speed control channel data streams, one from each direction of transmission, are fed from the LSIC 181 to the USART 258 and 252 and the operating program is downloaded. The second high-speed interface may also be used for the opposite direction of transmission.

It is a feature of this invention that multidrop applications may be realized. The two USARTs 258, 252 are assigned to diverging directions, and messages may be simultaneously transmitted on different channels. Thus, a remote access unit may broadcast a message to all other remotes serving the common fiber path. Correspondingly, a remote access unit is ready to receive a message from another remote, independent of its location on the fiber path.

As discussed above, the control modules 30 are programmed to poll the line cards 31 at the remote units for monitoring and control, to communicate with the LNC processor and other remote processors on the control channel, e.g., to request a channel assignment after detecting an off-hook condition, and to perform first level call processing.

The node processor 35 at the LNC is physically identical to the remote processor shown in FIG. 13, with the exception of different ROM bootstrap programming. It communicates with the local processor at the LNC in the same manner as it communicates with the remote control modules 30. The RS-422 interface 259 associated with USART 251 is connected to the LSC (system controller) 20 by which it receives down-line loading and administration. As discussed above, the node processor 35 is programmed to coordinate communication among the remote control modules 30, providing fiber path systems controls such as assigning idle channels to telephones as they ring or go off-hook, obtain instructions from the LSC, 20 and serve as data concentrator from the remote units to the LSC 20. FIG. 13 also illustrates the local control module 25.

TAS Module

Figure 14:
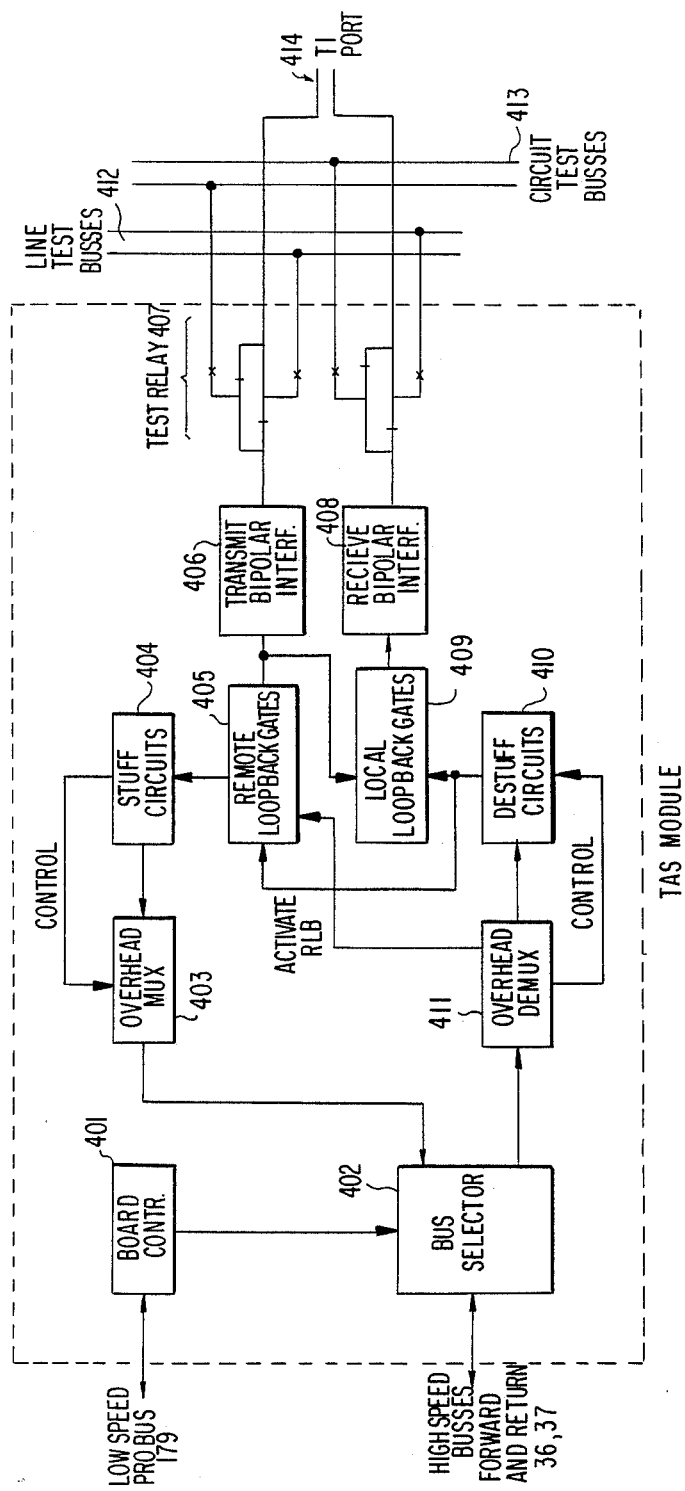
FIG. 14 is a block diagram of a T1 asynchronous module (TAS), used for interfacing external T1 lines.

The TAS Module is shown in FIG. 14 in block diagram form. The purpose of the TAS module is to provide the network with a T1 port 414 for the transmission of an asynchronous T1 circuit over the network from one TAS module to another, such transmission being without frame slips or other errors despite the potential differences in nominal T1 rates between the user T1 clock and the network derived T1 clock.

The TAS channel interfaces to the forward and return high-speed busses via Bus Selector 402, which is software programmed via Board Controller 401 to access any one of the ten 1.600 Mbps streams in any available high-speed frame. Bus selector 402 may be identical to bus selector 195 (and bus interface 190) while board controller 401 may be identical to board controller 180. The Bus Selector 402 delivers this signal, which has a format as shown in FIG. 7 above to Overhead Demux 411. This circuit extracts the overhead signaling data, and stuff command information. The latter is forwarded to Destuff Circuit 410, which, as a result, is able to extract from the 1.600 Mbps stream, only that data which was inserted from the T1 input stream at the remote end. It also contains a small elastic buffer and clock PLL to smooth the extracted T1 data to a nominal 1.544 Mpbs rate. It is then applied to Remote Loopback Gates 405 and Local Loopback Gates 409. Normally, Local Loopback Gates 409 route the signal to Receive Bipolar Interface 408 and through Test Relay 407 to the outgoing T1 line 414.

In the other direction, the incoming T1 signal at the T1 port 414 is routed through Test Relay 407 to Transmit Bipolar Interface 406 where the signal is converted to logic levels before it is applied to Remote Loopback Gates 405 and Local Loopback Gates 409. Normally, the Remote Loopback Gates route the signal to Stuff Circuit 404, which increases the rate to 1.600 Mbps. It contains a small elastic buffer, buffer fill status monitoring and control circuits. The buffer is maintained at approximately half filled status by utilizing the V1 and V2 slots of FIG. 7 to insert more or less T1 data bits in the outgoing 1.600 Mbps stream. The action taken for a specific V bit is signalled in advance in the S bits of the preceding five frames so that the receiving end can take corresponding action.

Overhead Mux 403 inserts the S bits and the other 1.600 Mbps channel overhead bits before the data stream is applied to Bus Selector 402. The Bus Selector is software programmed via Board Controller 401 to insert the 1.600 Mbps stream into a 16.000 Mbps stream of any available one of the high-speed busses. Which bus and which channels of the bus are used is controlled by board controller 401 with data received over the low speed bus 179 from the associated control module 30.

Several loopback modes exist for the TAS module to achieve rapid fault diagnosis for a link. A local digital loopback to test the bipolar interfaces can be activated by either software or a switch on the module. This causes the Local Loopback Gates 409 to select the output signal from Transmit Bipolar interface 406, rather than the output from the Destuff Circuits 410, for delivery to the Receive Bipolar Interface 408.

A remote digital loopback can be activated by either software or a switch on the TAS module at the remote location. The output of the switch is carried as overhead data and is extracted by Overhead Demux 411. It causes Remote Loopback Gates 405 to select the output signal from Destuff Circuit 410, rather than the Transmit Bipolar Interface 406, for delivery to the Stuff Circuits 404.

A complete check of the channel can be performed from either the remote or the local end. Locally, the channel can be assigned to receive RXI in the same time slot as that in which it transmits, and on the same high-speed bus. If the channel operates properly, the output signal should reproduce the input with only a few microseconds of delay between the two.

Remotely, the channel can be checked out by activating Test Relay 407. This disconnects the input and output T1 lines from the module and connects its Bipolar Interfaces 406 and 408 to the transmit and receive Circuit Test Busses 413. By connecting these two busses together, the module bipolar output is connected to its bipolar input, and the signal from the remote end is sent back to its originating point.

It should be noted that the Test Relay can serve also to achieve a 1-for-N redundancy of TAS modules. In this case, the backup module is not wired with its bipolar circuit test leads to the Circuit Test Busses 413, but to the Line Test Busses 412. Activating Test Relay 407 on both the faulty and the backup TAS module, transfers the incoming and outgoing T1 lines from the faulty to the backup module, which can be software programmed to access the time slot previously occupied by the faulty module. (It is assumed that the faulty module is successfully disconnected from the high-speed busses by removing power from its bus drivers via a software command, or it is assigned a free time slot).

TFA Module

Figure 15:
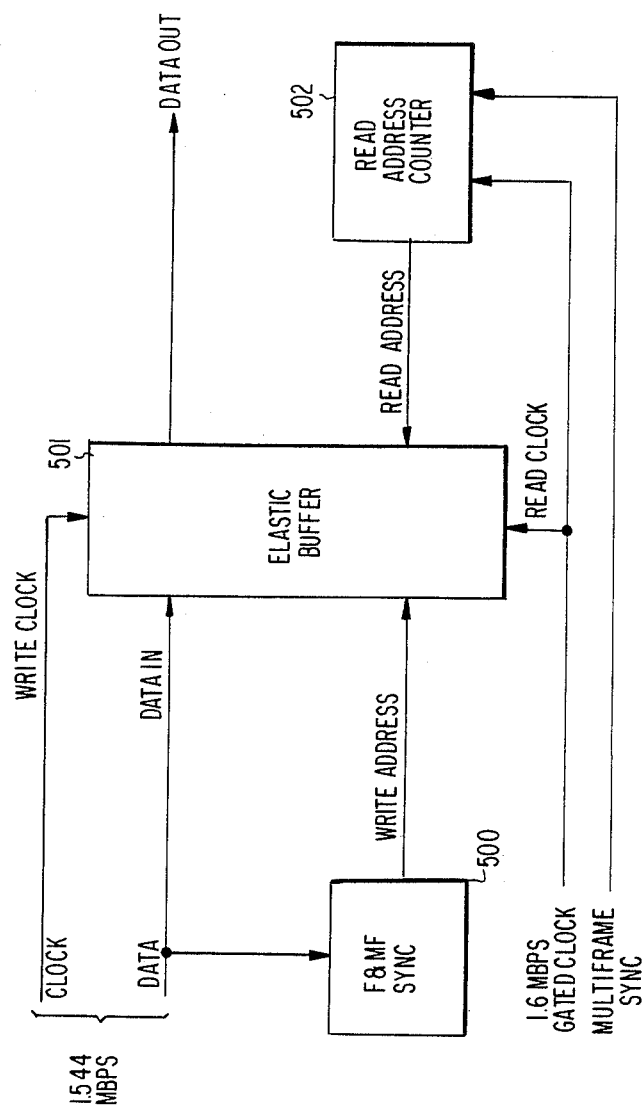
FIG. 15 is a block diagram of a frame alignment circuit for aligning the external T1 frame with the high speed data frame when used in connection with the TAS module of FIG. 14.

The TFA module permits direct voice or data channel access via voice or data modules along the fiber system, even though the channels enter and exit the system at some point as part of a T1 stream. The TFA module is similar to a TAS module in its block diagram form, but has an additional block inserted between its Remote Loopback Gates 405 and Stuff Circuits 404 as they are shown for the TAS module in FIG. 14. This block is a Frame and Multiframe Alignment circuit, which is shown in FIG. 15.

The 1.544 Mbps clock and data inputs of FIG. 14 are obtained from the Remote Loopback Gates 405 and represents data and recovered clock from the Transmit Bipolar interface or else, in loopback mode, data and recovered clock from the remote end via the TFA Destuff Circuits 410. Its data rate is normally exactly 193/200 of the 1.600 Mbps rate.

Frame and Multiframe Synchronization circuits 500 detect the frame and multiframe pattern of the 1.544 Mbps stream and generate an address to Elastic Buffer 501 in the format 193 x 12 x 2, where each T1 frame is entered into a 193-bit block of the buffer, its frame bit occupying the first address position of the block. The first frame of the T1 stream occupies the first block, with the twelfth frame in the twelfth block. The next T1 multiframe is entered into the second set of twelve 193-bit blocks. The following multiframe is entered into the first set, thus erasing the data written two multiframes earlier. The next T1 multiframe is entered into the second set of 12 193 bit blocks, and so on.

Data is read out of the elastic buffer independent of data entry. In other words, the buffer is capable of writing data into one address while simultaneously reading data from another address. The read address is supplied by Read Address Counter 502, which is driven by a gated 1.600 Mbps clock from the Stuff Circuits 404 of the TFA module. This clock has seven missing pulses at the beginning of each frame, and its count sequence is 193 x 12 x 2. The divide-by-193 and divide-by-12 sections are synchronized to the multiframe of the 1.600 Mbps stream by means of a Multiframe Sync pulse. The effect is that no T1 data is read out during the first seven bits of the 1.600 Mbps frame, but the remaining 193 bits contain a full T1 frame, with the frame bit in the eighth position of the 1.600 Mbps frame. Frame 1 of the T1 multiframe is contained in frame 1 of the 1.600 Mbps multiframe, and so on.

Because the T1 stream is normally frequency synchronized to the 1.600 Mbps stream in exactly a 193-to-200 ratio, the elastic buffer remains in a stable fill status. However, should the incoming T1 stream be faster or slower than the synchronized rate, Elastic Buffer 501 will, due to the way its addresses are formatted, maintain the alignment of the T1 frame in the 1.600 Mbps frame. When the buffer overflows or underflows, one complete T1 multiframe is skipped or read out twice in the 1.600 Mbps stream. This plesiochronous operation gives acceptable performance for voice channels but naturally causes errors in data channels.

In the receive direction, the TFA module functions similarly to the TAS module. However, a strap option is provided which permits the TFA module to generate the content of the T1 frame bits in the outgoing stream, rather than to operate fully transparent. The reason is that, if the system of the present invention uses TFA modules to interface to another system but adds and drops all voice channels in the T1 by means of Subscriber Line Cards, there are no overhead or frame bits in the 1.600 Mbps stream. The TFA then inserts a frame pattern identical to that of a D3 channel bank. Thus, the T1 output of a TFA is D3 compatible and the channel may be transported by T1 transmission and may be terminated by a D3 compatible channel bank or digital switch.

Branch (BCH) Module

The LNR/B 47 (of FIG. 2A) is used where a fiber path splits into two physically separate paths, but the traffic on the two branches does not exceed, in the aggregate, the capacity of a single fiber path. A functional block diagram is presented in FIG. 16 which shows the connection of the COM modules 601, 602 and the BCH module 628 at a branch point.

Figure 16:
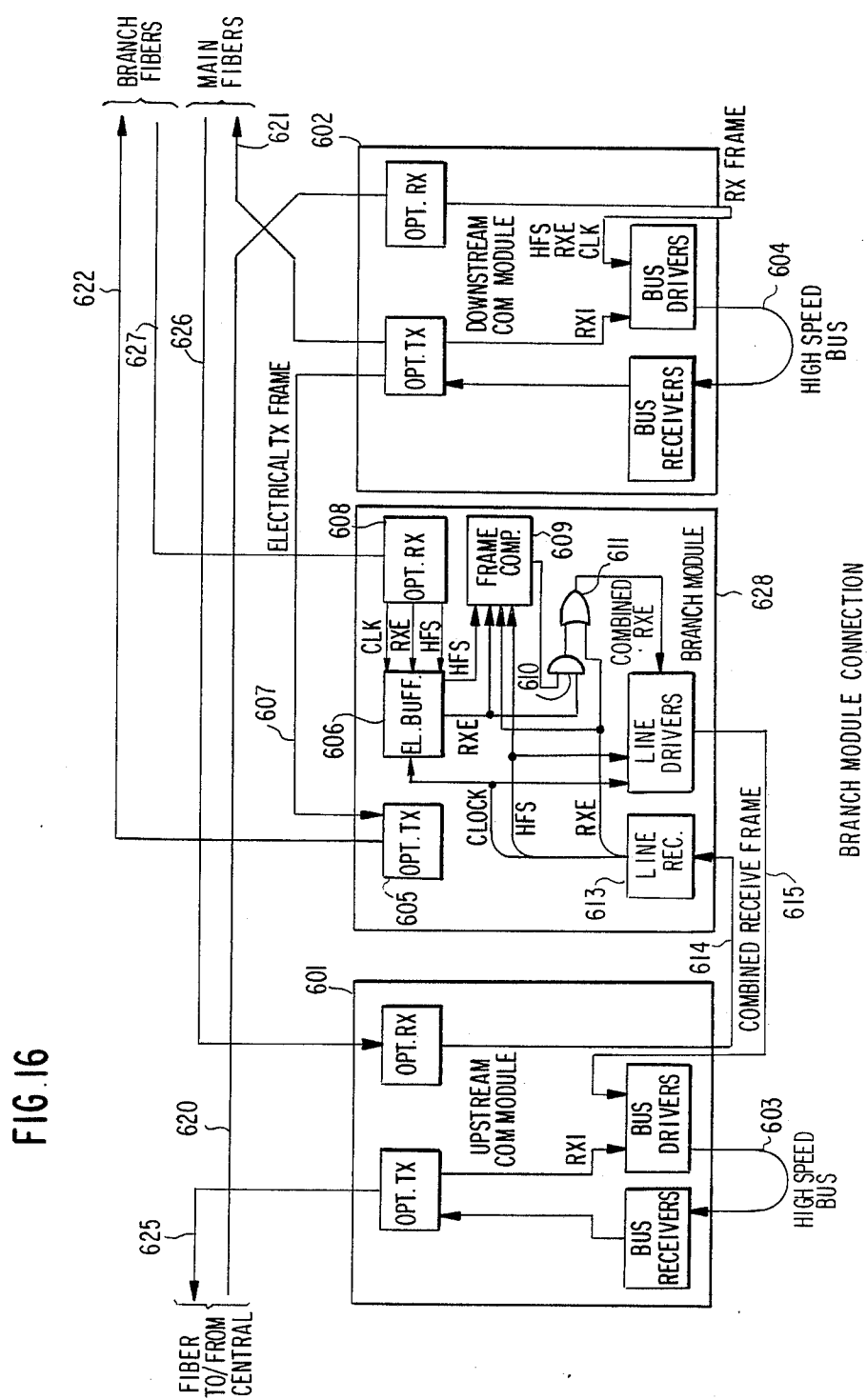
FIG. 16 is a block diagram of a branch module.

FIG. 16 shows fiber links comprising a single fiber pair. The single fiber pair comprises downstream fiber link 620 (away from the LNC) and upstream fiber link 625 (toward the LNC). At the branch shown in FIG. 16, the downstream fiber link 620 branches to a main downstream fiber link 621 and a branch downstream fiber link 622. On the other hand, the upstream fiber link 625 is fed by the main upstream fiber link 626 and branch upstream fiber link 627. For links employing two fiber pairs, the equipments and interconnects depicted in FIG. 16 are duplicated for the second fiber pair.

COM modules 601 and 602 are shown in simplified block diagram form, each is similar to COM interface such as 29-1. A comparison with FIG. 9A should suffice to make clear their function in this diagram. COM module 602 is connected as described above except that the electrical output is used to connect Electrical TX frame 607 (output of line encoder 164, FIG. 9A) to Optical Transmitter 605 of the BCH module 628. This causes the same data to be transmitted on the branch link 622 as on the main downstream fiber link 621. Upstream COM module 601 does not feed its Receive Frame 614 directly into its drivers for the High-Speed Bus 603. Instead, Receive Frame 614 (identical to RX Frame 151, FIG. 9A) from the main fiber link 626 is coupled over to the BCH module 628, received by Line Receivers 613, and combined with the received data from the branch fiber link 627. The result is sent over to COM module 601 as Combined Receive Frame 615 via Line Drivers 612.

The Clock and HFS signals of the Combined Receive Frame are derived from Receive Frame 614. The RXE signal is obtained by ORing RXE in Receive Frame 614 with RXE from Elastic Buffer 606. The latter signal is bit synchronous with the former by virtue of the fact that the Elastic Buffer 606 is read out with the Clock from Receive Frame 614. They are also, in normal operation, frame and multiframe synchronous to each other. The synchronization of the two streams is checked by Frame Comparator 609. If they are not properly synchronized, AND gate 610 is used to block RXE from the buffer 606 by applying a logic zero to its other input. OR gate 611 then passes only RXE from Receive Frame 614.

Care must be taken in time slot assignments on the branched fibers so that the same time slot is not active in both RXE signals to OR gate 611. The method used to achieve frame and multiframe synchronization of the two RXE signals is described in more detail below.

It should be noted that the BCH module 628 does not interface with the high-speed busses, and therefore does not affect the normal operation or redundancy selection of COM modules.

Note also that if desired the junction can also serve as a standard LNR location. The high speed bus 604 carries all the traffic in the downstream direction. Thus, any line cards interfaced to bus 604 can receive any downstream traffic and insert traffic for LNR's located downstream (either main or branch) of the LNR/B shown in FIG. 16. On the other hand, traffic destined for locations upstream of the LNR/B shown in FIG. 16 can be inserted on bus 603. For this purpose, the number of bus selectors 195 may need to be increased if a single circuit is simultaneously interfaced to busses 603 and 604.

Frame comparator 609 is shown in detailed block diagram form in FIG. 22. A pair of D flip-flops 636 and 638 receive RXE from upstream branch path 627 and upstream main path 626, these are termed RXE #1 and RXE #2. It is immaterial which is which since the comparator 609 only determines the relationship; if it is not correct, RXE from branch path 627 is blocked by gate 610. The flip-flops 636 and 638 are clocked via HFS #1 and HFS #2 (via inverters 634 and 637, respectively). If the two traffic signals RXE #1 and RXE #2 are frame aligned, the Q outputs of the flip-flops 636 and 638 (at points A and B, respectively) are identical, synchronous square waves of 1.5 millisecond period. Thus, the gate 639 normally produces a low level (at point C). Flip-flop 633 reclocks the signal at C with a clocking signal obtained from either fiber path, e.g. from receiver 608 or 613 in order to remove the effects of sub-bit timing variances. The ouput of flip-flop 633 is input to a re-triggerable one-shot 641 (with a 2 millisecond period). Normally, the one-shot 641 is timed out with a low level at point E. This is inverted at 642 and the output is the input to gate 610 (FIG. 16). Lack of alignment produces a high output at points C and D which triggers one-shot 641. For so long as the frames are mis-aligned, the output of inverter 642 is low, blocking RXE from upstream branch 627.

If the frames RXE #1 and RXE #2 are misaligned, then the output F of flip-flop 643 will indicate the timing of A relative to B, i.e. early or late. Based on the state of F and E (indicating A early, late or aligned, with B) the alignment status can be monitored by the board controller 180.

To adjust frame phase, the condition of frame comparator 609 is monitored at the board controller 180 (FIG. 9A) which is connected by control bus 179 to control module 30 (FIG. 9C) of the LNR/B 47 (FIG. 2A) at the junction. The control module 30 formats a message on the control channel to the control module 25 of the LNC 22 indicating lack of frame alignment. Based on the message, the control module 25 formats and sends a preset message to the control module 30 of the end LNR at the end of the branch. This end LNR has a COM interface with a block diagram such as that in FIG. 9A. The message, received at the control module 30, is passed on to board controller 180 where it is used to adjust the preset circuit 161. The preset circuit 161, in cooperation with the TX Frame Generator 159 can vary the relation between Receive Frame In 153 clock and the frame phase of the frame produced by TX Frame Generator 159. This phasing is adjusted until alignment is achieved. Alignment is detected at the board controller 180 of LNR/B 47, the board controller 180 communicates this via the control module 30 back to the control module 25 of LNC 22 which results in terminating the preset command. In a preferred embodiment, the LNC, with knowledge of the fact of misalignment and the direction, implements a binary search algorithm to search for that preset which will produce a synchronous condition at the junction. This leaves the frames in alignment at LNR/B 47 for synchronous processing. The same procedure can be followed any time mis-alignment is detected.

Figure 23:
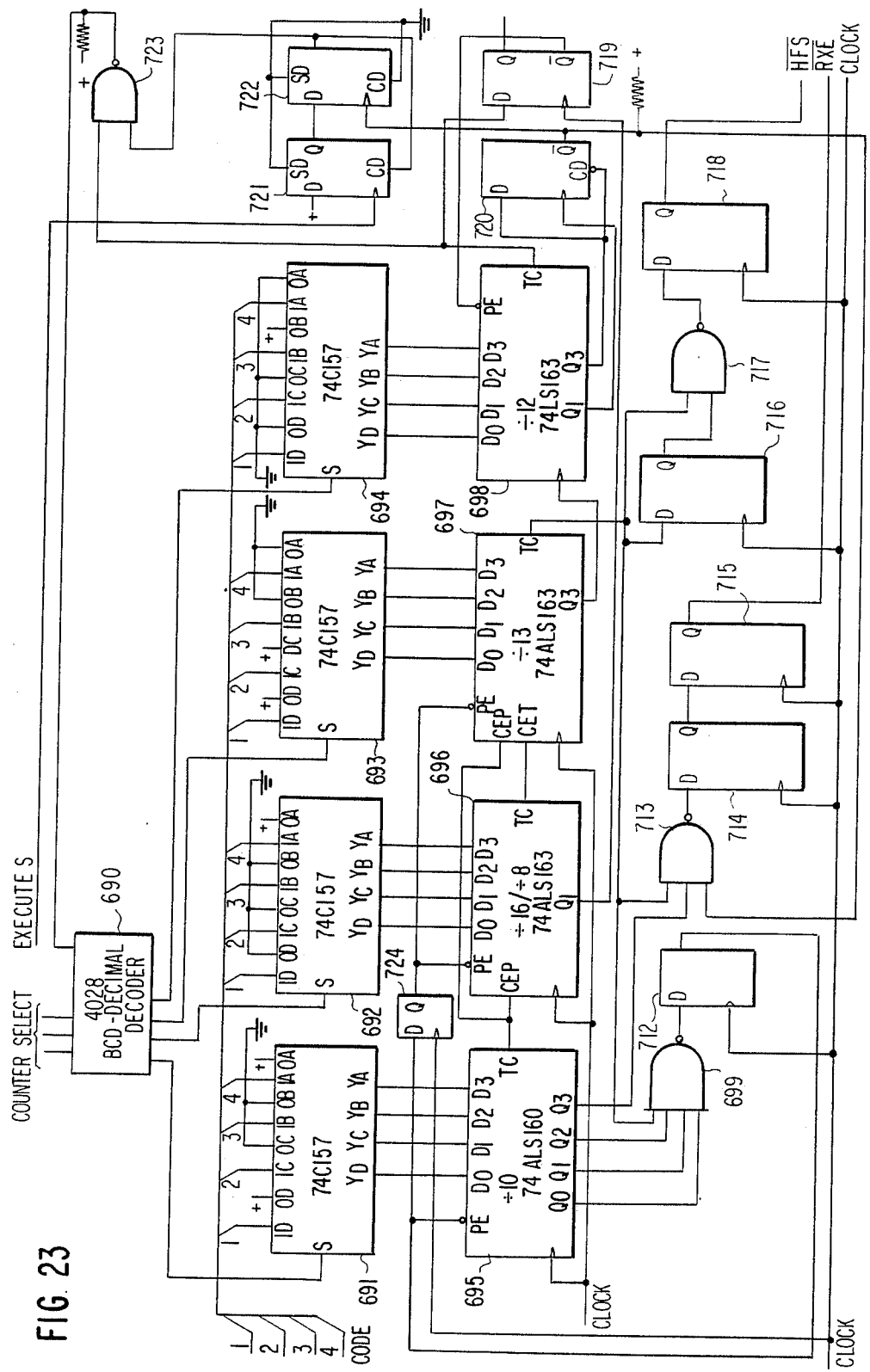
FIG. 23 is a block diagram of TX Frame Generator 159 (FIG. 9A).

The preset circuit 161 and TX Frame Generator 159 are shown in block diagram form in FIG. 23. The preset circuit 161 corresponds to the registers 691–694 and associated circuitry including BCD-decimal decoder 690, flip-flops 719–722 and gate 723. The TX Frame Generator 159 correspond to the remaining elements in FIG. 23 including counters 695–698 inclusive, gates 699, 713, 717 and flip-flops 714–716, 718 and 724, inclusive.

The message from the LNC 22 commands a specific preset, which can be measured in terms of translating the frame out of TX Frame Generator 159 so that it is offset from the frame received at the end LNR by a time measured in clock cycles, (each frame includes 2000 clock cycles or bit times). The information is, in the embodiment shown in FIG. 23, transmitted in the form of two quantities, first is a 3-bit counter select which is input to the BCD-decimal decoder 690, and a four-bit code which is input to registers 691–694, as shown in FIG. 23. The frame generator itself includes four counters 695–698. Counter 695 is arrranged as a divide-by-ten counter, so that it divides its clocking input by 10 and produces a terminal count (TC) output for every tenth clock cycle. The $Q_0$–$Q_3$ outputs indicate, at any time, the condition of the four stages of the counter 695. Counters 696–697 are arranged to operate as a divide-by-200 counter. Accordingly, the three counters together operate as a divide-by-2000 counter, indicating for each count cycle, one frame. Counter 698 is arranged as a divide-by-twelve counter, and thus its TC indicates multiframes, since there are twelve frames in a multiframe.

The presetting operation is effected by presetting one of the counters 695–698 to a specified count whereby it rolls over after a number of input pulses less than it would have rolled over had it not been preset. More specifically, the counter rolls over after a number of input pulses equal to the complement of the preset (module whatever the counter which is preset normally counts to). Theoretically, if one knew what the desired offset was, a single presetting should be sufficient. However, under the present circumstances, the misalignment is only measured at the junction point, and that does not necessarily reveal the amount of offset necessary at the end LNR to cancel out the mis-alignment at the junction. Accordingly, in a preferred embodiment of the invention, a binary search algorithm is employed at the LNC in which phase adjustments at the end LNR are made and the effect produced by that adjustment at the junction is determined before the next adjustment is made. As will be seen below, the presetting occassioned by setting one of the registers 691–694 is operative once.

In the course of any counting cycle, the NAND gate 699 decodes a particular bit time, particularly a count of seven from the counter 695 is gated with the terminal count output of counter 697. The output of NAND gate 699 is reclocked in flip-flop 712 and the Q output of flip-flop 712 is used to initate a preset at the counter 695. This same output, delayed one bit time at flip-flop 724 is used to preset the counters 696, 697.

All the counters 695–698 are preset via the selectors 691–694. Each of the selectors is four bits wide and includes two potential inputs for each stage. When the S input for the selector is at a logic low level, the "0" inputs are used. These inputs are arranged so that the counters they are used to preset, divide by the ratios specified at the counters. However, the selectors 691–694 can be set to select the other inputs (the "1" is used), for so long as the select (S) input is active. The "1" input to this selector is derived from the CODE input, which originates at the LNC. The S input can be activated by the BCD-decimal decoder 690, and which S input is activated depends on the counter select input to the decoder 690. Accordingly, the CODE input can be used to preset any one of the counters 695–698, depending on the counter select input to the BCD-decimal decoder 690. As will become clear hereinafter, the abnormal presetting is operative for only one cycle of the particular counter.

The lower half of FIG. 23 shows the generation of the frame including three components, HFS, RXE and CLOCK. The latter output is merely the input, i.e. the CLOCK is looped around at the end LNR. The RXE is the data or traffic portion of the frame. Since the downstream traffic terminates at the end LNR, the data portion of the frame is empty save for the multiframe marker. The multiframe marker is generated in NAND gate 713. One of the inputs to NAND gate 713 is the most significant bit position output of counter 695, this position is high for two clock cycles. Another input is the terminal count output of counter 697, i.e. once per frame. The third input is the output of the counter 698 ($Q_3$) clocked in flip-flop 720, this output is in one condition for six frames of the multiframe and in another condition for the other six frames of the multiframe. As a result, the output of NAND gate 713 is a two-bit wide pulse in six frames of the multiframe and continuously high for the other six frames. This output is delayed in flip-flops 714 and 715 and becomes the RXE signal for the "empty" frame.

The HFS component of the frame is merely the terminal count output of counter 697 (indicating the end of a frame) gated with itself, or more particularly gated with the output of flip-flops 716, whose input is the same terminal count output. As a result, the ten-bit wide terminal count output of counter 697 is shortened to nine bits in NAND gate 717. This is delayed one bit time by flip-flop 718 and forms the HFS component of the frame.

Note that the frame comparator 609 (FIG. 22) provides for a comparison of two RXE signals. The timing is such that the signal compared is the multiframe marker produced by the flip-flops 714, 715. This produces two results; firstly in addition to determining frame alignment, multiframe alignment is also detected. Secondly, the frame comparison can be effected with either one of the RXE signal inputs (or both) being virgin or empty traffic frames since because of the configuration of the frame generator 159, even virgin or empty frames will include the multiframe marker.

The flip-flops 719–722, NAND gate 723 and multiframe counter 698 cooperate to ensure that the output of BCD-decimal decoder 690 is effective for only a single frame, following the presence of an execute pulse which forms the clocking input to flip-flop 721. Because of the input arrangement to this flip-flop, on the presence of the execute pulse its Q output will go high. Flip-flop 722 will not respond until it is clocked. The clocking input to flip-flop 722 is derived from the Q output of flip-flop 720 which is set when counter 698 reaches a count of 8 (the $Q_3$ output). When flip-flop 722 becomes set, its output partially enables NAND gate 723 and also resets flipflop 721 through the clear direct (CD) input. When the terminal count output of counter 698 goes high, NAND gate 723 is fully enabled and the low-going output enables BCD-decimal decoder 690. The terminal count output of counter 698 is high for only a single frame and accordingly, at the end of that frame when the terminal count ouput goes low, the NAND gate 723 as well as the BCD-decimal decoder 690, are both disabled. Accordingly, the preset condition lasts for only a single frame.

Programmable Fiber Crossconnect (PFX) Module

In order to provide an interfiber communications capacity, the PFX module is able to selectively transfer data in specific 64 kbps channels from up to seven fiber paths to an eighth fiber path. A set of eight fiber paths, each fiber path having a PFX module, can achieve full interfiber communications capacity by this means, provided that time slot assignments for the fiber paths are made in a coordinated manner. In other words, time slot n in any of eight fiber paths can be inserted into time slot n of an output fiber path. Time slot n+1 of the output fiber path can be selected from any of the eight time slots n+1 available from the eight input fiber paths. The PFX module, since it has no memory or delay function cannot take time slot n and insert it into a time slot other than n.

Figure 17:
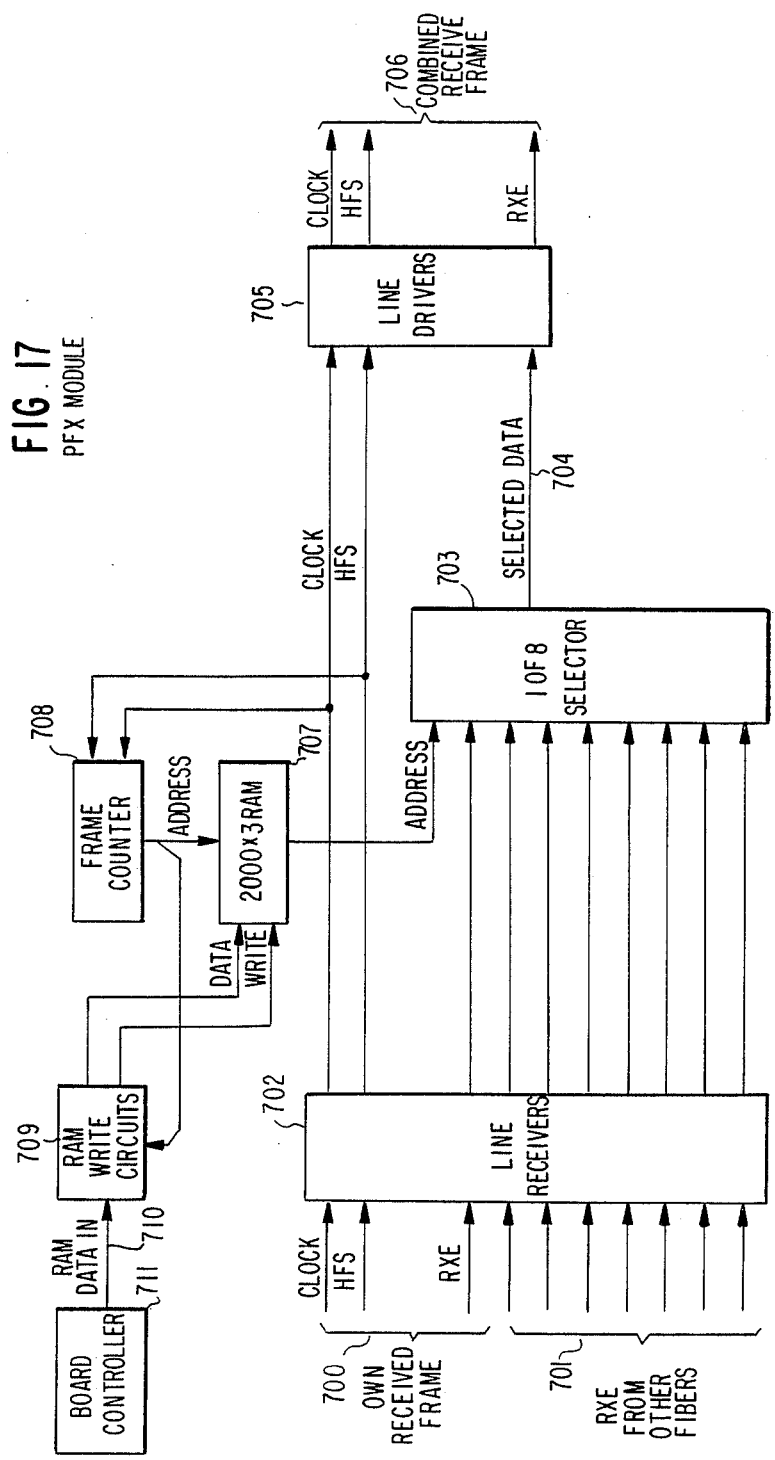
FIG. 17 is a block diagram of the programmable cross-connect module (PFX)

A block diagram of the PFX module is shown in FIG. 17. The PFX module as shown in FIG. 17 is connected between receive frame out 151 and receive frame in 153 (FIG. 9A). The Own Received Frame 700 from the receive section of the COM module associated with the PFX module is received by Line Receivers 702 together with the RXE from up to seven other COM modules 29, i.e., from other fiber paths. All RXE signals are applied to a one of eight selector 703 where only one RXE signal at a time is selected. Selection is by means of an address word from a 3-bit wide RAM 707. The RAM has 2000 words stored, one for every time slot in any 16.000 Mbps frame. The words are read out sequentially once per frame by means of Frame Counter 708, which is driven by the Clock signal from the Own Received Frame and synchronized by the HFS pulse from the same source. The content of RAM 707 determines which RXE is placed in a specific frame time slot of Selected Data 704. Clock and HFS from the Own Received Frame and Selected Data 704 are applied to Line Drivers 705, which supply Combined Receive Frame 706 to the Receive Frame Inputs of the associated COM module. (See FIG. 9A above.)

The content of the RAM can be changed by software via RAM Write Circuits 709. The RAM data in message is obtained from the local control module 30 via the board controller 711. This permits dynamic reallocation of interfiber time slots as traffic demands it. Note, however, that no time slot interchange takes place as RXE from one fiber is coupled over to another fiber. The function of the PFX module remains an add/drop on the high-speed stream.

Time Slot Interchange (TSI) Module

Figures 18A, 18B:
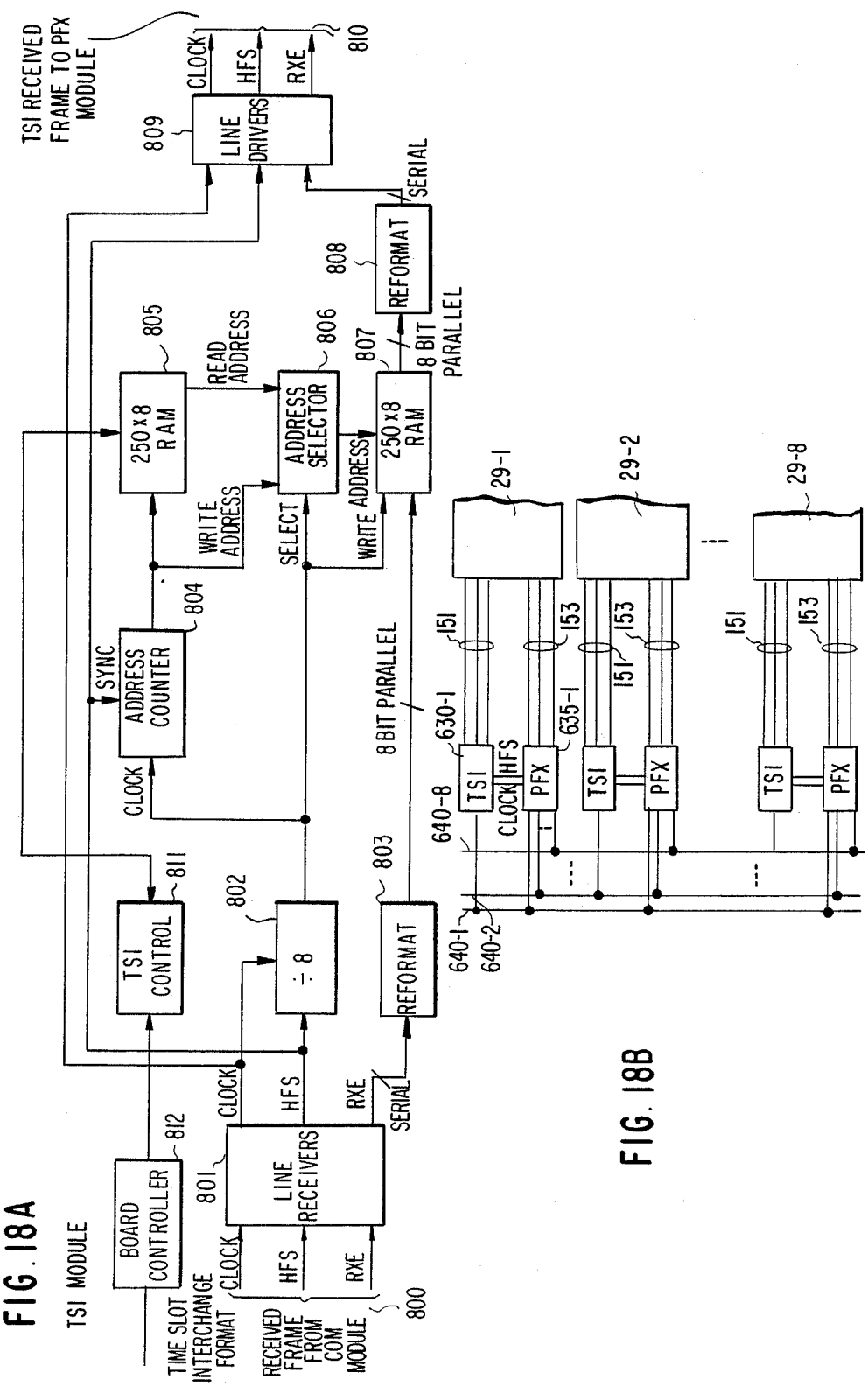
FIG. 18A is a block diagram of the time slot interchange module (TSI), which provides for full circuit switching between fibers.
FIG. 18B is a block diagram of an intercommunications system between 8 fiber sub-systems at a central node effected by employment of TSI and PFX modules.

The TSI module works in conjunction with a PFX module but enhances the capacity of the interfiber traffic handling mechanism by lifting the constraint that an interfiber call must have the same time slot available on both or several fibers into which the signal must be coupled. A block diagram of the TSI module is shown in FIG. 18A. The TSI module, with its memory, can take an input frame and rearrange the time slots in any desired order to produce a TSI frame at the output. With this capability, the PFX module then provides for the inter-frame selection. An overall block diagram is shown in FIG. 18B.

FIG. 18B shows a representative eight COM interfaces 29-1 through 29-8 connected via an eight line RXE bus 640, each with TSI modules 630 and PFX modules 635. Each COM intreface 29-x (where x is any integer) interfaces to a single fiber path (in and out fiber links). As shown in FIG. 18B, the receive frame 151 of each interface 29-x is the input to the associated TSI module 630. Each TSI module 630 has three outputs, clock and HFS to the associated PFX module 635 and an RXE output to the associated line in the bus 640. Each PFX module 635 receives clock and HFS from the associated TSI module 630 and an RXE input from each line in the bus 640. Each PFX module 635 provides clock, HFS and RXE to the associated COM interface 29-x at receive in terminal 153.

The TSI module is inserted between the COM interface Receive Frame Outputs 151 and the PFX module. It is able to transfer in any order the relative positions of the 64 kbps channels contained in the 16.000 Mbps RXE data stream. In this manner, an interfiber call can be assigned one time slot on one fiber path and another, or even several other, time slots on another fiber path, to which it is coupled with a pair of PFX modules.

Referring to FIG. 18A, the Received Frame 800 from the associated COM interface 29-x is received by Line Receivers 801. The Clock signal drives divide-by-8 circuit 802, which in turn provides a clock to Address Counter 804, an address select signal to Address Selector 806, and a write pulse to 250×8 RAM 807. Both divide-by-8 circuit 802 and Address Counter 804 are synchronized to the frame by means of the HFS signal in Received Frame 800.

Address Counter 804 generates 250 address outputs per frame in sequential order. These are applied directly to Address Selector 806, and also to 250×8 RAM 805. The latter produces an eight bit word for every address provided, thus functioning as an address translator. Its output is also applied to Address Selector 806.

Address Selector 806 multiplexes the two addresses so that for every Write-Modify-Read cycle of 250×8 RAM 807, the RAM is given the address from Address Counter 804 during the write portion of the cycle and the modified address from 250×8 RAM 805 during the read portion of the cycle. Since one complete sequence of addresses from the address counter corresponds to one frame, and the frame contains 250 words of 1.600 Mbps data, one full frame of data is stored in 250×8 RAM 807 at all times. Writing the RAM 807 and then reading in a different address sequence achieves a rearrangement of the relative order of the 250 words in the path through the memory. Any deisred rearrangement can be achieved by programming 250×8 RAM 805 with the desired address translation format.

This programming (writing) is controlled by TSI control 811. The node processor 35 commands the TSI, via board controller 812, with the desired translated address for a given write address when a change in time slots is desired. The TSI will subsequently write this translated address into the 250× 8 RAM 805 in the desired address location on a write cycle which is alternately phased to the read cycle.

To make the scheme work in the preferred implementation as described above, a reformatting of the 16.000 Mbps RXE is necessary before it is entered into RAM 807. The high-speed stream is arranged as 200 10-bit serial words, rather than 250 8-bit parallel words. Reformat circuit 803 achieves the necessary conversion in 80-bit blocks, and Reformat circuit 808 reverses the process.

The output of reformat circuit 808 is applied together with the HFS and Clock from Received Frame 800 to Line Drivers 809. The output of drivers 809 is the TSI Received Frame 810, which is coupled to a PFX module in the same way that the Received Frame 800 is connected when the TSI module is not present. The interconnectivity achieved by the embodiment of FIG. 18B allows completely free switching among the various fiber paths and is also non-blocking. Thus, by substituting the apparatus of FIG. 18B at a hub central, the office switch can be eliminated for those calls between subscribers located on any fiber path terminating at the hub central.

Remote End Frame Alignment

Interfiber communications, branches and loop configurations require that frames arriving from two or more different directions be aligned in frame and bit phase where the frames meet. One technique is to introduce frame alignment buffers at such points. However, in systems with multiple branches and/or fiber path interconnect points, this requires a considerable amount of buffer memory hardware, and introduces undesirable cumulative delay in the propagation of traffic through the system.

In the present invention, the need for alignment buffers has been avoided by means of a remotely controlled frame phase adjustment capability in the COM module 29. The COM module 29 at the end of a fiber path is commanded by software at the central location to generate a new frame, different from the received one, and the position in time of this frame is adjusted by remote control such that its frame phase is correct relative to the other frame(s) at the location where two or more frames are received. Although the clock is looped around at the end of a fiber path, the frame is not.

The frame preset capability permits adjustment in increments of one high speed bit as a minimum. This is not able to adjust the bit phase of the frames at the junction point. Bit alignment is achieved by means of an elastic buffer inserted in one of the received streams. The buffer is written into by the clock accompanying one data stream, but the data is read out by the clock from the other data stream. This aligns the bit timing of the second stream with that of the first stream (as explained with reference to FIG. 9D).

Normally, the two frames are fully synchronous, long term, thus the buffer only needs to be a few bits long to remove short term timing jitter of one stream relative to the other. Such short term jitter is mainly caused by bit pattern sensitivity in the clock recovery circuits in the receiving section of the COM module and by logic crosstalk between high speed busses. However, the elastic buffer used in the preferred embodiment of the present invention is designed to operate in an environment where one stream is not necessarily synchronous to the other stream, long term.

The uniqueness of this elastic buffer lies in its capability to work with "short" or "long" frames as well as normal length frames on its input and produce constant normal length frames on its output without requiring any advance notice of the length of the arriving frame. It is also capable of producing "short", normal or "long" frames on its output by external command, regardless of the length of the frame on its input. A short frame is defined as one having one bit less than a normal frame, a long frame has one bit more than normal. In the preferred embodiment of the invention, a normal frame contains 2,000 bits.

The capability of the buffer in conjunction with the remote preset capability of the COM module frame generation permits error free transmission of synchronous data through the system even though the high speed clocks of the transmitting and receiving ends differ by a small amount. The key to this feature is the fact that even though the high speed clocks differ, the frame rates for the two ends can be exactly the same if the remote end can occasionally be commanded to transmit a short or a long frame. Since synchronous data is transmitted with a fixed number of bits per frame, the data rate can be maintained identical at the two sites if their frame rates are identical, regardless of the high speed clock rate.

FIG. 19 shows a block diagram of the Elastic Buffer. Clock and HFS of Received Frame 900 are applied to Write Address Counter 901. In the preferred embodiment of the present invention this counter is a divide-by-8 circuit which supplies a 3-bit address to the Multiport Memory 902. This memory can be read out at an address supplied by Read Address Counter 903 simultaneously to being written into at the address supplied by 902. Write Address Counter 902 is synchronized to the Received Frame 900 by means of the HFS signal. The HFS Signal is latched by JK flipflop 904. Its output is applied to AND gate 905, which also is given a pulse from Read Address Counter 903 when it reaches a certain count. This produces Preset Command 907 to Read Address Counter 903. The same signal is also applied to the K input of JK flipflop 904, turning off its output at the next cycle of its clock.

Both Write Address Counter 901 and Read Address Counter 903 are thus preset once per frame. The former is always preset to the same count, while the latter can be given any one of three preset codes on Output Frame Length input 906.

As long as the incoming frame is 2,000 bits, Write Address Counter 901 keeps a steady divide-by-8 sequence. Normally, the preset code to Read Address Counter 903 allows it to also maintain a steady divide-by-8 sequence delayed relative to the former by a few bits plus and minus some timing jitter. A normal elastic buffer function is thus maintained, with HFS and RXE passing through Multiport Memory 902 transparently, except for the delay.

The presetting of Write Address Counter 901 is timed such that is normally occurs during the first bit of the received frame. At that time RXE contains the first of two bits of identical content, the polarity of which is derived from the content of the F2 bit in the received optical data. (RXE is delayed on the COM module to permit insertion of this information even though F2 is received after the first bit in the frame.) Multiport Memory 902 therefore gets written with the second of the two identical bits in the address to which Write Address Counter 901 is preset. All the subsequent bits in the frame will occupy known addresses in the memory.

If the incoming data rate is somewhat higher than the rate of retiming clock 909, the write address will tend to overtake the read address. This would cause buffer overflow and data error. To prevent this, the remote COM module can be commanded to perform a one bit incremental shift of its frame, causing it to contain 2001 rather than 2000 bits for one frame. The receiving COM module then detects frame sync one bit later, resulting in HFS being delayed by one bit. (It should be noted that the design of the COM module causes the extra bit to be inserted as the last bit in the frame, thus not changing the timing relationship between the data slots. Conversely, if the remote COM module is commanded to advance its frame by one bit, the first bit in the frame is omitted.)

Write Address Counter 901, in the absence of a sync pulse in its normal place, is clocked to the same count as if the preset had taken place. Bit 2001 of the received frame is thus written in the address normally occupied by the first bit of the next frame. However, HFS is only one clock pulse later than normal, and it causes Write Address Counter 901 to hold in the same count for one clock cycle. The first bit of the next frame is therefore written over the last bit of the previous frame. The content of the memory is therefore identical to what it would have been, had the incoming frame been of normal length. Read Address Counter 903 counts in its normal sequence and produces a normal length frame in Buffered Receive Frame 908. What has been achieved is a retardation by one count of Write Address Counter 901 relative to Read Address Counter 903, to counter a tendency towards buffer overflow. Since the extra bit inserted and discarded contained no information, the data flow in the path remains undisturbed.

If the remote high speed clock is slow rather than fast, the read address of the buffer tends to catch up with the write address. This would cause buffer underflow and data errors. Underflow can be prevented by giving a command to the remote COM module to produce a short frame. It then omits the first bit of one frame. The receiving COM module detects frame synch one clock cycle early and generates an early HFS. This causes the Write Address Counter 901 to be preset one clock cycle earlier than normal, in effect skipping one address count. The count being skipped is the address in which the first bit of the frame is normally written. This bit is not present in the frame being received, and the second bit is written into the same address as if the frame had contained the normal number of bits. From there on the data of the frame is written into addresses in a completely normal way. The Read Address Counter 903 goes through normal counting cycles without skipping any addresses, and it reads the content of the address skipped by the Write Address Counter. The data in that slot is obsolete, but that makes no difference, since it is the second bit in the frame that is used to signal multiframe count, and this bit is correct and in its normal address.

The Buffered Received Frame 908 thus again contains the normal number of bits in a completely normal sequence even through the frame on the buffer input was short. The skipping of one count by the Write Address Counter advances it with respect to the Read Address Counter, countering the tendency towards buffer underflow, with no loss of data.

Conversion of short or long frames to normal length frames is the function of the Elastic Buffer 606 in FIG. 16. It should be noted that COM modules themselves are transparent to short and long frames. A string of COM modules along a fiber path will transparently propagate a long or short frame generated by the COM module at the end location, with no loss of data anywhere.

The Elastic Buffer Modules (EBM) contains a buffer such as the one described above. The EBM is used at central locations for loop and hub configuration if inter-fiber communication is required and may also be used with PFX or TSI modules. It is also used for jitter reduction purposes in long chains of LNRs 28 where the accumulation of jitter otherwise could be a problem, particularly at the head end where the clock has travelled all the way to the far end, been looped around and retransmitted along the chain of LNRs in the reverse direction. In such a long string of LNRs an Elastic Buffer Module can be inserted between Received Frame outputs and Received Frame inputs of COM modules. A block diagram of an EBM is shown in FIG. 20.

The inputs for the EBM come from several possible sources. The data and write clock are obtained from the Received Frame outputs of a COM module (1008) via Line Receivers 1005. The read clock for the buffer is generated by a voltage controlled crystal oscillator in a phase lock loop (1004), referenced to a signal selected from one of six possible sources. The reference can be a high stability External Reference Clock 1000, one of the high speed bus clocks (1001) or the clock from Received Frame 1008. Selection is via software controlled Clock Selector 1003.

If Write Clock 1006 is selected, the narrow bandwidth of Crystal PLL 1004 significantly reduces phase jitter of the signals going through the buffer. Buffered Received Frame 1007 thus reduces system phase jitter when used in lieu of unbuffered Received Frame 1008.

The ability to choose any one of the high speed bus clocks 1001 gives the Elastic Buffer Module a unique capacity for jitter reduction. At each EBM location along the path, the EBM can choose the high speed clock received from the system master clock location to read out data in the return direction. Thus, instead of a continuously accumulating jitter of the signal as it travels to the remote end and back, the jitter in the return direction decreases at each EBM location as the reference clock to Crystal PLL 1004 becomes progressively less jittery the closer to the master clock location the EBM is.

The EBM can be software programmed to be transparent to short and long frames. It can also be programmed to automatically absorb such frame and produce normal frames on the output. In addition it can be commanded to produce a short or a long frame with a normal frame on the input. A long or short frame can be generated by giving the Read Address Counter 903 a preset code which causes it to read the first bit of the frame twice, or to skip it. This is useful where the local clock runs faster or slower than the incoming data rate but is also faster or slower than the clock of the station to which the EBM frame is transmitted. The local EBM can then be commanded to generate long or short frames at a rate sufficient to keep the buffer in the next location from over or underflowing, while the station from which the local EBM is receiving can be commanded to transmit long or short frames at a different rate to keep the buffer at the local EBM more or less centered. The use of EBMs can thus permit each remote node to run at a slightly different clock rate, as long as all nodes at junction points are driven by the same clock and a central reference exists to which the frame rate of the system is locked.

The circuitry to control the response to and generation of short and long frames by the EBM is the Buffer Monitor and Control 1009 of FIG. 20. It monitors the fill status of the buffer to determine the need to command the remote transmitting station to generate a short or a long frame. It also responds to software commands to generate short or long frames by applying different preset codes to the Read Address Counter (refer to FIG. 19).

Frame Synchronization By Means of EBM at Loop and Hub Central

A loop, as mentioned earlier, may function as two end-to-end connected fiber links at the Loop Central site, with one link unused. The two adjacent sites each loop back timing and traffic to the loop CENTRAL. For example, and referring to FIG. 21, a loop can include two paths (CW1 and CCW1) extending between the CENTRAL and site 7 (with links 70 and 76 unused). However, the CENTRAL need not be located at an end, thus the loop can extend between site 1 and site 2 with links 72 and 80 unused. If the CENTRAL is not an end, then the traffic input at the optical receiver may be output at the adjacent optical transmitter. The Loop Central site needs to be transparent for traffic between stations on opposite sides of the Loop Central site. This is functionally equivalent to interfiber communication between different fibers at a Hub Central site. In either case, the high speed frames need to be aligned in frame and bit phase for a transparent transfer of data from one fiber to the other. A normal length frame is used for this interfiber communications point. This site therefore becomes the master for the locking of frame rates for all stations, with EBMs programmed to convert all incoming long and short frames. The occasional use of long and short frames may be required to compensate for propagation variations from distant remotes. The use of occasional long or short frames effects compensation without error. The central site also becomes the reference for synchronous data rates. This is due to the fact that the frequency dividers which generate clocks of 128 kbps and less are preset by frame sync at all sites and thus generate clocks which are frequency locked to the frame rate rather than the local high speed clock rate. The asynchronism between data rate and high speed clock rate manifests itself merely as a slight phase jitter of the data clock in the amount of one high speed clock cycle, or 62.5 nanoseconds.

We claim:

1. A distributed, demand access local loop telephone system interconnecting a central office with a plurality of subscriber equipments, which permits a reduction in telephone company future planning, conserves available bandwidth, and permits a range of subscriber services without additional wiring, comprising:
   a plurality of remote access units located remotely from said central office near subscriber populations,
   each such remote access unit including a pair of interfacing means for interfacing with a subscriber dedicated link and with a multi-channel digital communications media, respectively,
   a multi-channel, digital communications media connecting said remote units to each other, and to said central office, said media including plural links, where different links directly connect adjacent remote access units to each other or connect a remote access unit and said central office, said media including an optical link extending between at least two of said remote access units,
   means for assigning channels in said multi-channel digital communications media to different subscribers on a demand basis as said subscriber equipments request service, wherein said means for assigning channels in said multi-channel digital communication media includes means for assigning different numbers of said channels to different subscriber equipments, depending on the bandwidth requirements of said subscriber equipment wherein said remote access units further include:
   a link interface with opto-electrical transducer means for producing first electrical signals from optical energy detected on connected optical links, said opto-electrical transducer means including, in some of said remote access units, an upstream and downstream transducer for producing upstream and downstream first electrical signals,
   electro-optic transducer means for producing optical signals from electrical pulse information, in some of said remote access units said electro-optic transducer means includes an upstream and downstream electro-optic transducer for producing upstream and downstream optical signals, and
   decoding means to produce data and sync pulse streams from said first electrical signals,
   said remote access units further comprising:
   data encoding means to encode electrical signals coupled thereto with an output coupled to upstream and downstream electro-optic transducer,
   a plurality of forward bus means for distrubuting electrical signals, and coupling means for selectively associating particular forward bus means with upstream or downstream first electrical signals, and
   a plurality of return bus means for coupling return electrical signals to said data encoding means,
   presettable transmit frame generator means for generating clock and frame sync signals with a controllable relation between said frame sync and other frame sync signals,
   frame select means responsive to output signals of said transmit frame generator means and to electrical signals provided by a receive in terminal for selectively providing one or another set of signals to said coupling means,
   clock select means responsive to plural clock signals from said plurality of forward bus means for coupling a one of said clock signals to said transmit frame generator means,
   delay means coupling an output of said frame select means to said encoder means, and
   data selector means responsive to signals on said return bus to selectively coupling signals to said encoder means.

2. The apparatus of claim 1 in which some of said remote access units include direct conductive connections between said receive in terminal and said decoding means and others of said remote access units include jitter reducing means coupled between said receive terminal and said decoding means for reducing jitter in upstream directed optical signals, said jitter reducing means comprising:

elastic buffer means with data input and output terminals and associated read and write address counters, means connecting data signals from said decoding means to said data input terminal, means coupling said data output terminal to said receive in terminal, means connecting clock and sync signals from said decoding means to control said write address counter to effect writing of data from said decoding means into said elastic buffer means, a phase locked loop with an output for providing clock signals to said receive in terminal and for clocking said read address counter, and clock selector means with inputs from plural clock signals on said forward bus means for providing a reference input to said phase locked loop, whereby jitter is reduced in upstream optical signals by retiming electrical signals couled from said receive in terminal through said frame select means and said delay means to said upstream electro-optic transducer by referencing said phase locked loop to a clock signal generated from a downstream optical signal.

3. A demand assigned TDMA local loop telephone system interconnecting a central office with a plurality of subscribers, comprising:

a plurality of remote access units located remotely from said central office, each located near different subscriber populations, each such remote access unit including a pair of interfacing means for interfacing with subscriber dedicated links and with an optical multi-channel signal transmission medium, respectively, said interfacing means producing multi-channel received electrical signals corresponding to multi-channel signals on said multi-channel signal transducer medium, said optical multi-channel signal transmission medium connecting each of said remote units to each other and to said central office, said medium including plural links, where different links directly connect adjacent remote access units to each other or connect a remote access unit to said central office, means included in said central office and said remote access units for providing a high speed PCM digital bit stream on said transmission medium which is comprised of bits from a plurality of PCM digital bit sub-streams, selected ones of said bits comprising communications channels for transmitting information in one of two directions between said central station and said remote access units, consecutive bits in said high speed PCM digital bit stream being from different ones of said PCM digital bit sub-streams, wherein said high speed PCM bit stream is comprised of bits from x number of bit sub-streams, and wherein any x consecutive high speed bits are from x different bit sub-streams, at least some of said PCM digital bit sub-streams comprising plural, time multiplexed communication channels, wherein each said remote access unit further includes:

first bus means responsive to said multi-channel received electrical signals for transporting said received electrical signals, second bus means for collecting and transporting output electrical signals to said interface means, at least one mux/demux means coupled to said first and second bus means and including:

first demultiplexing means for selecting a single one of said digital bit sub-streams from said received electrical signals for demultiplexing, second demultiplexing means for selecting a communication channel from said selected digital bit sub-stream, and multiplexing means responsive to said received electrical signals and to input signals form said subscriber dedicated links for creating said output electrical signals corresponding to said input signals and timed by said received electrical signals wherein:

said optical medium comprises optical path means supporting optical signals propagating in first and second, opposite directions, said optical path means comprising a plurality of optical links, each extending between different remote access unit pairs or between said central office and a remote access unit, said interfacing means for interfacing to said transmission medium comprising:

opto-electronic and electro-optic transducer means for converting optical signals to said received electrical signals and for converting said output electrical signals to optical signals, wherein interfacing means includes:

gate means coupled between said second bus means and said electro-optic transducer means for selectively passing signals to said electro-optic transducer means, said gate means including two inputs and a control input, a first input coupled to said second bus means and a second input responsive to said received electrical signals, said control input responsive to a control signal on said second bus means for passing said received electrical signals to said electro-optic transducer means unless said control signal is in a distinctive state and for then passing said output electrical signals to said electro-optic transducer means and blocking said received electrical signals, means coupling said second bus means to said first bus means so that at least some of the output signals on said second bus means are transported by said first bus means, and wherein said multiplexing means generates said control signal.

4. The system of claim 3 in which said interfacing means includes an opto-electronic transducer for each downstream link coupled to an upstream remote access unit and another opto-electronic transducer for each upstream link coupled to a downstream remote access unit, and in which said interfacing means includes an electro-optic transducer for each downstream link coupled to a downstream remote access unit and another electro-optic transducer for each upstream link coupled to an upstream remote access unit.

5. The system of claim 4 in which said remote access unit further includes:

control means coupled to said first bus means and responsive to selected portions of said received electrical signals for generating command signals corresponding thereto, third bus means for transporting said command signals, each said mux/dux means including command means responsive to said command signals for controlling said demultiplexing and multiplexing means for selecting which of said digital bit sub-streams to select for demultiplexing, which of said digital bit sub-streams to select for timing and for determining the form of said control signal.

6. A branched digital communication system comprising:

a first bidirectional communication medium extending from a first remote location to a common location, a second bidirectional communication medium extending from a second remote location to said common location, and a third bidirectional communication medium extending from said common location to another location, first remote access means at said first remote location transmitting on said first bidirectional communication medium toward said common location at a given bit rate, second remote access means at said second remote location transmitting on said second bidirectional communication medium toward said common location at said given bit rate, common remote access means at said common location including an OR gate responsive to both said first and second communication media and coupled to said third communication medium for transmitting toward said another location at said given bit rate signals derived directly from said first and second communication medium.

7. The apparatus of claim 6 in which all said access means include means to transmit in a nominally indentical frame format at said given bit rate, means for controlling timing of a frame format on said second communication medium relative to timing of a frame format on said first communication medium, said common access means including said OR gate with two inputs, each input responsive to signals derived from a different one of first and second communication media and an output coupled to said means to transmit of said common access means.

8. The apparatus of claim 7 in which said means for controlling includes, at said second remote access means, a plurality of counters for generating said identical frame format, preset means for presetting said counters for controlling an offset between a frame transmitted by said second remote access unit with respect to a frame received at said second remote access unit, whereby varying said presetting can align frames received at said common location from first and second remote access units.

9. An access unit for a bidirectional high speed multiplexed digital communication medium carrying an information signal in a repeating frame format, in each direction, at a first rate substantially in excess of 5 Mbps, said medium including two downstream and two upstream links, comprising:

an interface means for each upstream-downstream pair of said links for interfacing between said links and said access unit, each interface means including receiver means for repeating said information signal received from one of said pair of links and transmitter means responsive to said receiver means and to a further signal for selectively placing a signal on the other of said pair of links, at least one line card means directly connected to a subscriber information source/link for transmitting to and receiving from said subscriber signals at a rate lower than said first rate, bus means interconnecting each said interface means and said line card means including a forward bus coupled to each said interface means and carrying a repeated information signal and a return bus for each said interface means, each said return bus connected to the transmitter means of a different interface means, said line card means including:

a first bus selector means coupled to each forward bus with an output corresponding to an information signal on one only of said forward busses, a demultiplexer responsive to said first bus selector means output for selecting only a portion of plural consecutive frames of said information signal, said portion corresponding to standard information rate less than said first rate and means for coupling said selected portion to said subscriber, a multiplexer with an input coupled to said subscriber for multiplexing a subscriber-originated signal at an output to occupy a selected portion of the plural consecutive frames of an information signal at said first rate, a second bus selector means responsive to said multiplexer output for coupling said multiplexer output to a selected one of said return busses only, whereby said subscriber is connected to receive a selected bandwidth portion of said information signal selected from any of said links and may transmit onto a selected bandwidth channel on any of said links.

10. The access unit of claim 9 in which said standard information rate is 1.544 Mbps and in which said means for coupling includes a codec for converting a selected portion of said 1.544 Mbps to an output analog voice frequency and for connecting an input analog voice frequency to a selected portion of a 1.544 Mbps signal for coupling to said multiplexer.

11. The access unit of claim 9 or 10 in which said first rate is 16 Mbps.

12. The access unit of claim 9 or 10 in which said digital communication medium includes four downstream and four upstream links.

13. The access unit of claim 12 in which said digital communication medium is an optical fiber and each of said links is a different fiber.

14. The apparatus of claim 9 in which said upstream links are coupled to a first end access unit and said downstream links are coupled to a second end access unit, each end access unit coupled to single upstream and downstream links only.

15. The apparatus of claim 9 in which both upstream and downstream links are coupled to an access unit.

16. A physically distributed, functionally integrated information switching and transmission system for the interconnection of a plurality of access units, at least some of which are spaced from other of said access units, providing for the direct add/drop at any of said access units of channel capacity ranging from one voice frequency equivalent to plural voice frequency equivalents, comprising:

plural digital information transmission links connecting said access units into plural pairs of connected access units, each of said access units including:

first means for receiving information from at least one of said digital information transmission links and second means for transmitting information to at least one of said digital information transmission links, at least one subscriber interface, forward bus means for coupling said first means to said at least one subscriber interface and return bus means for coupling said at least one subscriber interface to said second means, said subscriber interface including third means for transmitting on said return bus means in a frame format identical to and time aligned with a frame format on a selected one of said digital information transmission links, said third means transmitting only during a predetermined portion of said frame, said third means also simultaneously transmitting a select signal of a given logic level only during said predetermined portion of said frame and also time aligned with a frame format on a selected one of said digital information transmission links, said second means including select means for selectively passing one of two signals, said select means with one input from said first means and another input from said return bus means and controlled by said select signal to pass a signal from said first means unless said select signal is at said given logic level and in that event to pass a signal from said third means, but only for a period of time during which said select signal is at said given logic level, whereby said direct add/drop function is executed in replacing a signal from said first means with said signal from said third means without intervening multiplexing steps.

17. The apparatus of claim 16 in which said predetermined portion of said frame comprises plural, time displaced, time slices of number, in any frame, directly proportional to channel capacity involved in said add/drop function.

18. The apparatus of claim 16 in which:

some of said first means receives signals from at least two of said digital information transmission links and in which some of said second means transmit information to at least two of said digital information transmission links, said subscriber interface includes fourth means for selecting among signals available on said forward bus means for coupling to said subscriber and fifth means for selecting clocking signals for coupling to said third means, whereby said add/drop function affects a digital information transmission link which is not necessarily a link coupled to said subscriber.

19. The apparatus of claim 16 in which each of said access units further includes:

second select means, and a time delay, coupled between said return bus and said forward bus and responsive to said select signal when not at said given logic level for coupling signals from said third means to said forward bus, through said time delay, whereby subscribers connected to a common access unit may be connected by said return and forward bus without connection to any of said digital information transmission links.

20. The apparatus of any of claims 16–19 in which some of said digital information transmission links comprise optical transmission media and wherein associated first and second means respectively include opto-electronic transducers and electro-optic transducers.

21. The apparatus of claim 16 in which said system has the topology of a hub, in which one of said access units comprises a central station including a master clock, and another of said access units comprises an end access unit, said plural digital information transmission links connected so as to form at least one downstream path from said central station to said end access unit, and another upstream path from said end access unit to said central station, wherein said system includes jitter reducing means, comprising:

an elastic buffer at one access unit intermediate said central station and end access units, said elastic buffer coupled between said first means and said forward bus means, said elastic buffer including a first clock for writing information received from said first means, and a second clock for reading information onto said forward bus means, said second clock including generating means responsive to timing signals derived from said upstream path and said first clock including generating means responsive to timing signals derived from said downstream path.

22. The system of claim 16 in which the plural digital information transmission links are associated with access units in a hub topology.

23. The system of claim 16 in which the plural digital information transmission links are associated with a plurality of access units in a ring topology.

24. An access unit for connection into a digital information switching and transmission system in which transmission occurs in a frame including plural, bit interleaved, subframes, each subframe including plural time multiplexed channels, said access unit capable of a direct add/drop function and including:

first means for receiving information from a link of said digital information transmission system and second means for transmitting information to a link of said digital information transmission system, at least one subscriber interface, forward bus means for coupling said first means to said at least one subscriber interface and return bus means for coupling said at least one subscriber interface to said second means, said subscriber interface including third means for transmitting on said return bus means in a frame format identical to and time aligned with a frame format on a selected link of said digital information transmission system, said third means transmitting only during a predetermined portion of said frame, said third means also simultaneously transmitting a select signal of a given logic level only during said predetermined portion of said frame and also time aligned with a frame format on said selected link of said digital information transmission system, said second means including select means for selectively passing one of two signals, said select means with one input from said first means and another input from said return bus means and controlled by said select signal to pass a signal from said first means unless said select signal is at said given logic level and in that event to pass a signal from said third means, but only for a period of time during which said select signal is at said given logic level, whereby said direct add/drop function is executed in replacing a signal from said first means with said signal from said third means without intervening multiplexing steps.

25. The apparatus of claim 24 in which said predetermined portion of said frame comprises plural, time displaced, time slices of number, in any frame, directly proportional to channel capacity involved in said add/-drop function.

26. The apparatus of claim 24 in which:

said first means receives signals from at least two links of said digital information transmission system and in which some of said second means transmit information to at least two links of said digital information transmission system, said subscriber interface includes fourth means for selecting among signals available on said forward bus means for coupling to said subscriber and fifth means for selecting clocking signals for coupling to said third means, whereby said add/drop function affects a digital information transmission link which is not necessarily a link coupled to said subscriber.

27. The apparatus of claim 24 in which said access unit further includes:

second select means, including a time delay, coupled between said return bus and said forward bus and responsive to said select signal when not at said given logic level for coupling signals from said third means to said forward bus, through said time delay, whereby subscribers connected to said access unit may be connected by said return bus and said forward bus without connection to any link of said digital information transmission system.

28. A distributed, demand access local loop telephone system distributed, demand access local loop telephone system interconnecting a central office with a plurality of subscriber equipments, which permits a reduction in telephone company future planning, conserves available bandwidth, and permits a range of subscriber services without additional wiring, comprising:

a plurality of remote access units located remotely from said central office near subscriber populations, each such remote access unit including a pair of interfacing means for interfacing with a subscriber dedicated link and with a multi-channel digital communications media, respectively, some of said remote access units further including:

subscriber interface means with timing information derived from said multi-channel digital communications media for generating subscriber information, time aligned with signals on said multi-channel digital communications media, a select circuit in one of said interfacing means with two inputs and an output, a first input coupled to signals derived from said multi-channel digital communications media, a second input responsive to said time aligned subscriber information, means for selectively coupling either said first input or said second input to said output, said interface means including means to couple said output to said multi-channel digital communications media to provide for a direct add/drop of at least a communications channel, a multi-channel, digital communications media connecting said remote units to each other, and to said central office, said media including plural links, where different links directly connect adjacent remote access units to each other or connect a remote access unit and said central office, and means for assigning channels in said multi-channel digital communications media to different subscribers on a demand basis as said subscriber equipments request service, wherein said means for assigning channels in said multi-channel digital communication media includes means for assigning different numbers of said channels to different subscriber equipments, depending on the bandwidth requirements of said subscriber equipment.

29. The system of claim 28 in which said subscriber interface means further generates a control signal for identifying those times at which said second input of said select circuit should be connected to said output of said select circuit, and wherein said select circuit includes a control input coupled to said subscriber interface means generated control signal.

* * * * *